US010878494B2

(12) United States Patent
Fidanza et al.

(10) Patent No.: US 10,878,494 B2
(45) Date of Patent: Dec. 29, 2020

(54) SYSTEM AND METHOD FOR ISSUING A LOAN TO A CONSUMER DETERMINED TO BE CREDITWORTHY AND WITH BAD DEBT FORECAST

(71) Applicant: MO TECNOLOGIAS, LLC, Bogota (CO)

(72) Inventors: Paolo Fidanza, Bogota (CO); Andrii Kurinnyi, Los Angeles, CA (US); Andres Rosso, Bogota (CO)

(73) Assignee: MO TECNOLOGIAS, LLC, Bogota (CO)

( * ) Notice: Subject to any disclaimer, the term of this patent is extended or adjusted under 35 U.S.C. 154(b) by 210 days.

(21) Appl. No.: 15/964,247

(22) Filed: Apr. 27, 2018

(65) Prior Publication Data

US 2018/0349986 A1 Dec. 6, 2018

Related U.S. Application Data

(63) Continuation-in-part of application No. 15/847,991, filed on Dec. 20, 2017.
(Continued)

(51) Int. Cl.
*G06Q 20/00* (2012.01)
*G06Q 40/02* (2012.01)
(Continued)

(52) U.S. Cl.
CPC ............. *G06Q 40/02* (2013.01); *G06N 20/00* (2019.01); *G06Q 20/36* (2013.01)

(58) Field of Classification Search
CPC ......... G06Q 20/00; G06Q 20/36; G06Q 40/02
(Continued)

(56) References Cited

U.S. PATENT DOCUMENTS 6,249,775 B1 6/2001 Freeman et al.
7,050,999 B1 5/2006 Ota
(Continued)

FOREIGN PATENT DOCUMENTS

WO 2016/126464 8/2016

OTHER PUBLICATIONS

Lang et al., "Understanding Consumer Behavior With Recurrent Neural Networks," International Workshop on Machine Learning Methods for Recommender Systems (MLRec@SDM); 2017; 8 pages.

*Primary Examiner* — Robert R Niquette
*Assistant Examiner* — Liz P Nguyen
(74) *Attorney, Agent, or Firm* — Allen, Dyer, Doppelt + Gilchrist, P.A.

(57) ABSTRACT

A system and method determines the creditworthiness of a consumer and issues a loan and generates a behavioral profile for that consumer. An initial set of data is acquired from the consumer that includes non-identification attributes without obtaining a full name, a credit card number, a passport number, or a government issued ID number that allows identification of the consumer. A user ID number matches the initial set of data to a physical user in a transaction database. A credit score based on the average credit among a plurality of user profiles is matched to determine a maximum credit for the consumer. A machine learning model may be applied to stored consumer loan data to determine when the consumer requires an increase in the maximum allowed credit and the risk involved with increasing the maximum allowed credit.

16 Claims, 55 Drawing Sheets

Related U.S. Application Data

(60) Provisional application No. 62/543,443, filed on Aug. 10, 2017, provisional application No. 62/515,053, filed on Jun. 5, 2017.

(51) Int. Cl.
  *G06Q 20/36* (2012.01)
  *G06N 20/00* (2019.01)

(58) Field of Classification Search
  USPC .......................................................... 705/38
  See application file for complete search history.

(56) References Cited

U.S. PATENT DOCUMENTS

| | | | |
|---|---|---|---|
| 8,099,356 B2 | 1/2012 | Feinstein et al. | |
| 8,181,867 B1 | 5/2012 | Bierbaum et al. | |
| 8,458,074 B2 | 6/2013 | Showalter | |
| 8,489,499 B2 | 7/2013 | Yan et al. | |
| 8,521,631 B2 | 8/2013 | Abrahams et al. | |
| 8,762,261 B2 | 6/2014 | Haggerty et al. | |
| 8,799,150 B2 * | 8/2014 | Annappindi | G06Q 40/00 705/38 |
| 9,070,088 B1 | 6/2015 | Baveja et al. | |
| 2008/0033869 A1 | 2/2008 | Steele et al. | |
| 2008/0120133 A1 | 5/2008 | Krishnaswami et al. | |
| 2008/0221972 A1 | 9/2008 | Megdal et al. | |
| 2008/0319895 A1 | 12/2008 | Lazerson | |
| 2009/0112744 A1 * | 4/2009 | Park | G06Q 40/025 705/34 |
| 2012/0116944 A1 | 5/2012 | Dicarlo | |
| 2012/0239553 A1 | 9/2012 | Gonen et al. | |
| 2013/0132360 A1 | 5/2013 | Kuznetsov et al. | |
| 2013/0159165 A1 | 6/2013 | Marlowe-Noren | |
| 2013/0185189 A1 * | 7/2013 | Stewart | G06Q 40/025 705/38 |
| 2013/0226777 A1 | 8/2013 | Hu et al. | |
| 2014/0067650 A1 | 3/2014 | Gardiner et al. | |
| 2015/0019290 A1 | 1/2015 | Downton | |
| 2015/0243138 A1 | 8/2015 | Arnone et al. | |
| 2016/0125528 A1 | 5/2016 | Brown | |
| 2016/0203551 A1 | 7/2016 | Tutte et al. | |
| 2016/0232546 A1 * | 8/2016 | Ranft | G06Q 40/025 |
| 2016/0232606 A1 | 8/2016 | Chauhan | |
| 2017/0032458 A1 * | 2/2017 | Dembo | G06Q 40/02 |
| 2017/0032460 A1 | 2/2017 | Szollar | |
| 2017/0061535 A1 | 3/2017 | Williams | |
| 2019/0073676 A1 | 3/2019 | Wang | |

* cited by examiner

CONSULT LOAN
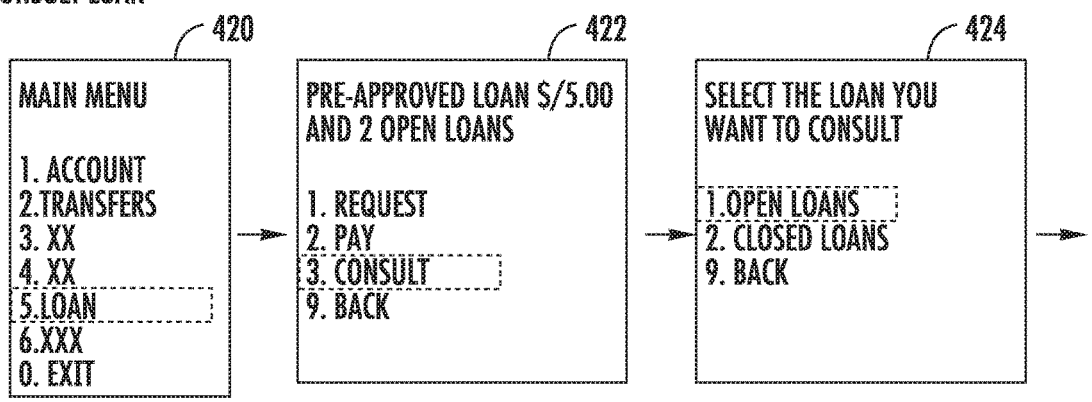
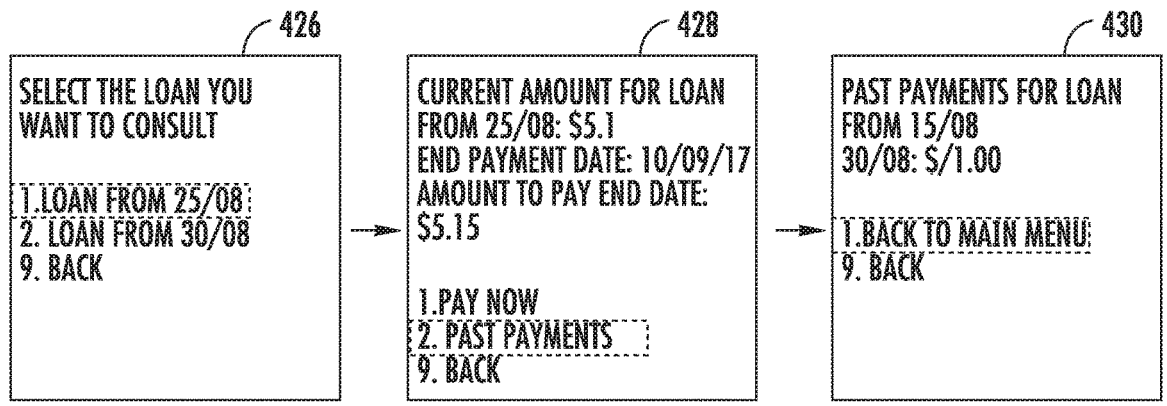
FIG. 15

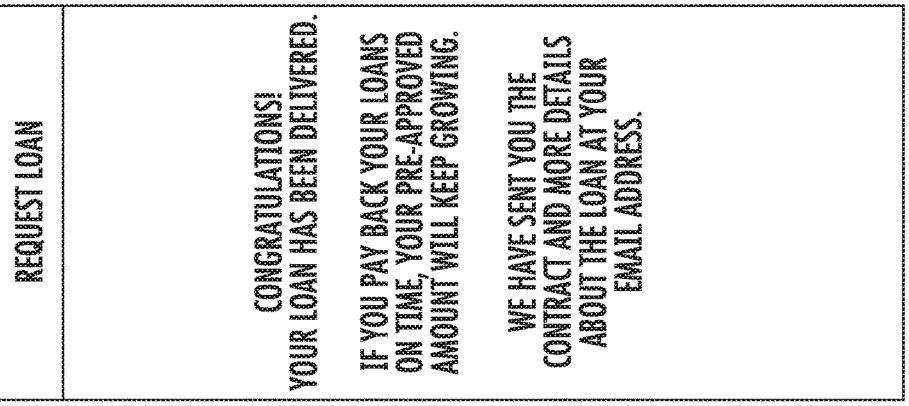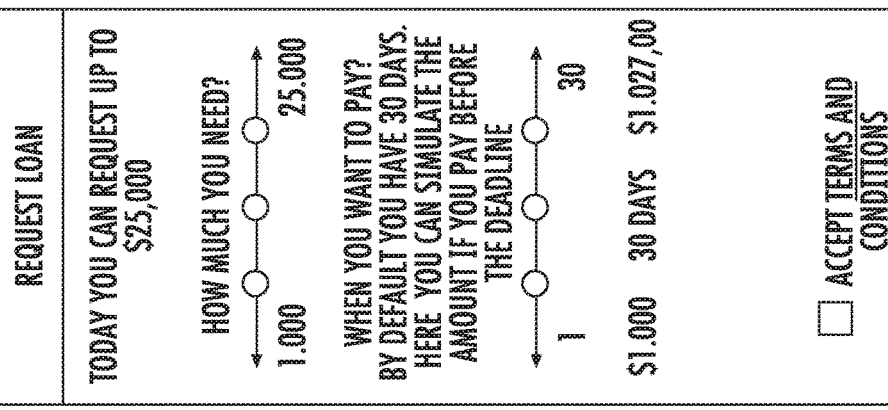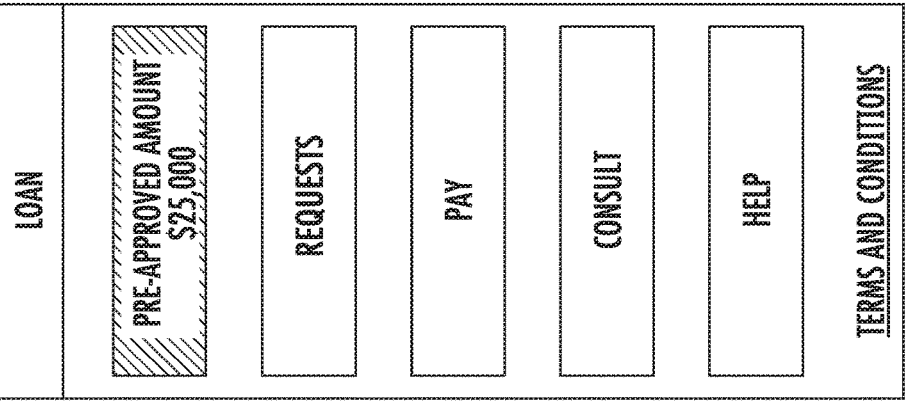
FIG. 16

CONSULT: ALL LOANS

REQUEST | CONSULT | PAY | HELP | HISTORY

STATUS OF YOUR OPEN LOANS

SELECT THE LOAN YOU WANT TO CONSULT
-ALL YOUR OPEN LOANS

S/40
REQUESTED AMOUNT

S/4
LOAN COSTS

S/8
PAYMENTS TO DATE

S/36
PENDING AMOUNT

15/12/2017
FINAL PAYMENT DATE

FIG. 29

CONSULT: SELECT A LOAN

REQUEST | CONSULT | PAY | HELP | HISTORY

STATUS OF YOUR OPEN LOANS

SELECT THE LOAN YOU WANT TO CONSULT
- ALL YOUR OPEN LOANS
- LOAN REQUESTED 15/11/17
- LOAN REQUESTED 30/10/2017

S/40 REQUESTED AMOUNT

S/4 LOAN COSTS

S/8 PAYMENTS TO DATE

S/36 PENDING AMOUNT

15/12/2017 FINAL PAYMENT DATE

FIG. 30

CONSULT: SELECTED LOAN

REQUEST | CONSULT | PAY | HELP | HISTORY

STATUS OF YOUR OPEN LOANS

LOAN REQUESTED 15/11/2017

S/30 REQUESTED AMOUNT

S/3 LOAN COSTS

S/8 PAYMENTS TO DATE

S/25 PENDING AMOUNT

15/12/2017 FINAL PAYMENT DATE

PAYMENT S/8

NEW PENDING AMOUNT S/25

DATE 20/11/2017

FIG. 31

HELP

REQUEST     CONSULT     PAY     HELP     HISTORY

PLEASE SEND US YOUR QUESTION AND WE WILL GET BACK TO YOU SHORTLY
SEND US YOUR QUESTION

YOUR NAME

YOUR E-MAIL

YOUR MESSAGE

CANCEL     SEND

FIG. 36

HISTORY

REQUEST       CONSULT       PAY       HELP       HISTORY

CLOSED LOANS
SELECT THE LOAN YOU WANT TO CONSULT

--ALL CLOSED LOANS--

HISTORY: SELECTED LOAN

REQUEST    CONSULT    PAY    HELP    HISTORY

CLOSED LOANS
SELECT THE LOAN YOU WANT TO CONSULT

LOAN REQUESTED 16/09/2017

S/30
REQUESTED AMOUNT

S/33
PAID AMOUNT

16/10/2017
PAYMENT DATE

DATE
16/10/2017

PAYMENT
S/33

NEW PENDING AMOUNT
S/0

REQUEST CLOSED LOAN CERTIFICATE

FIG. 38

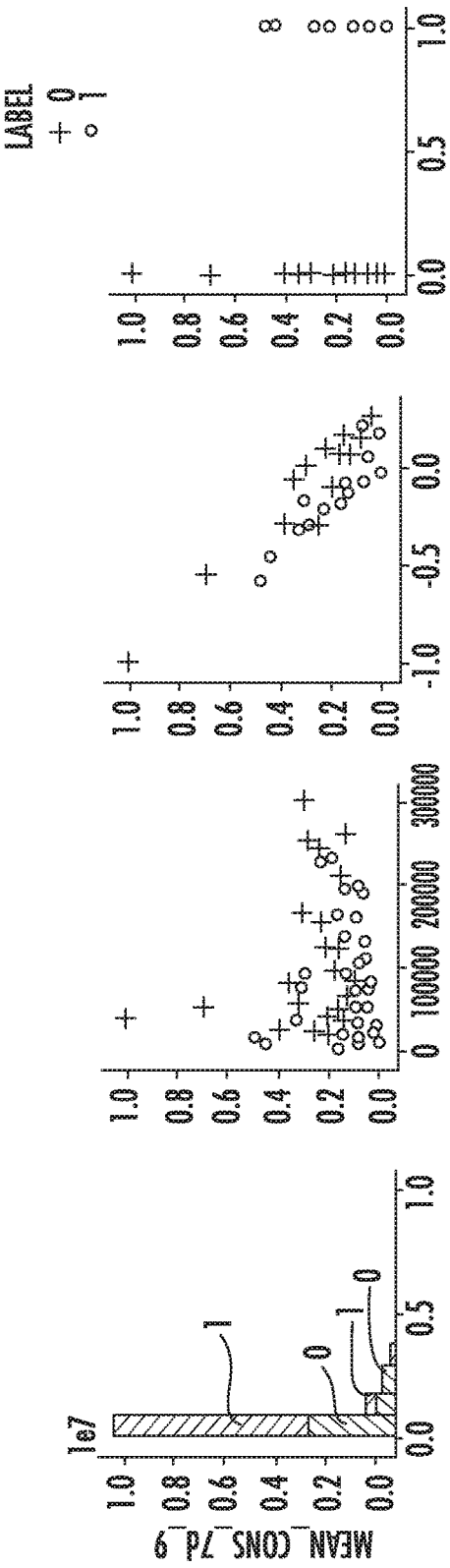
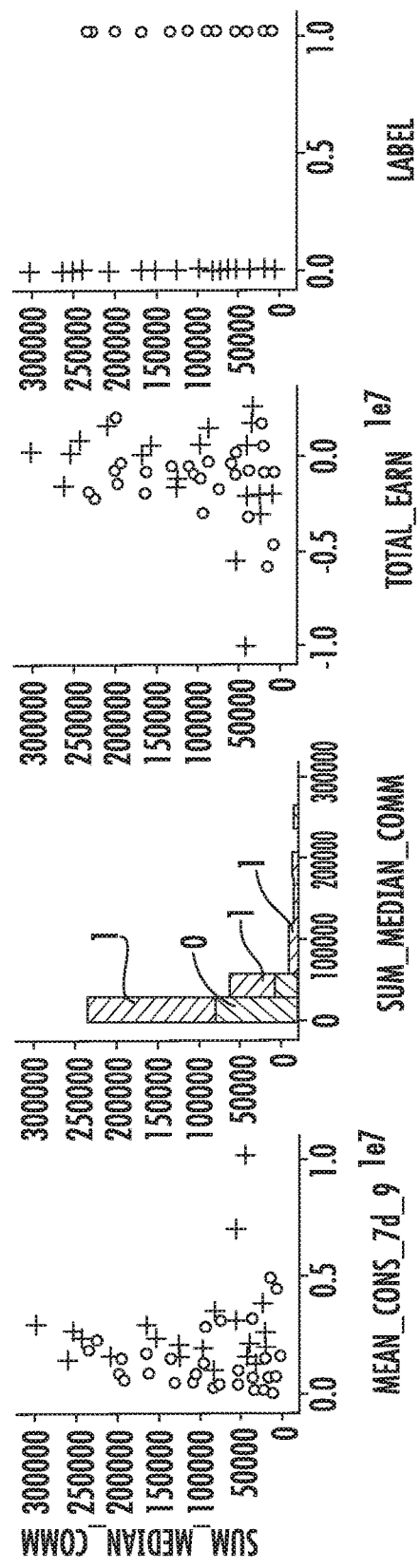

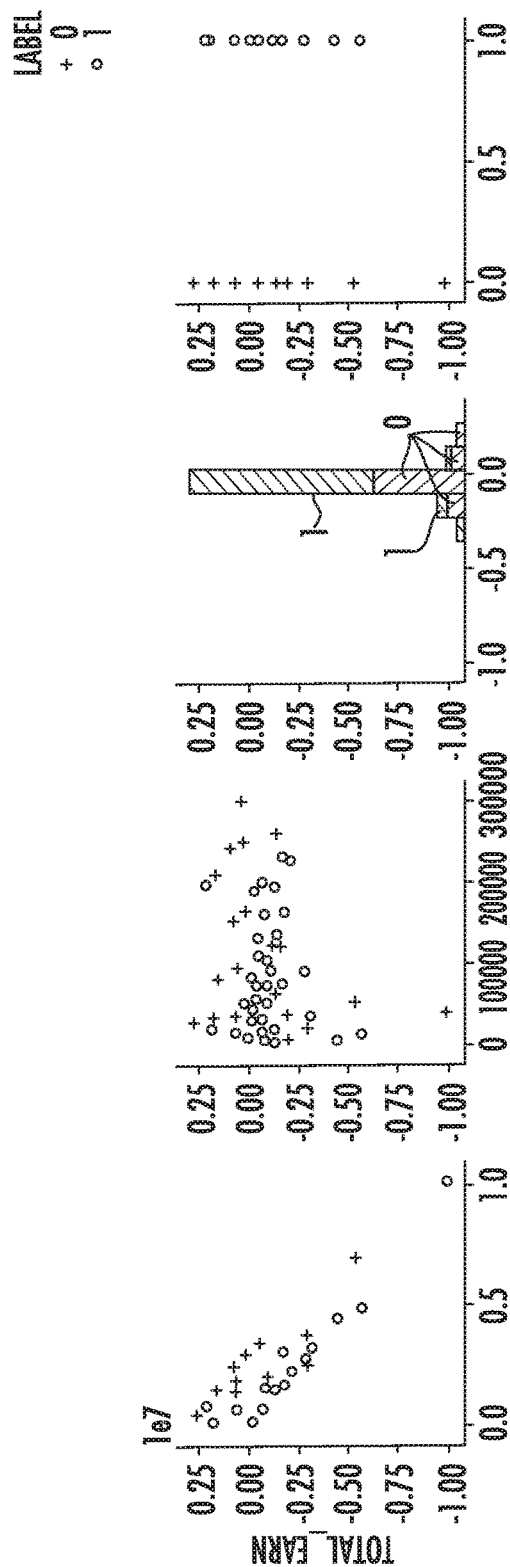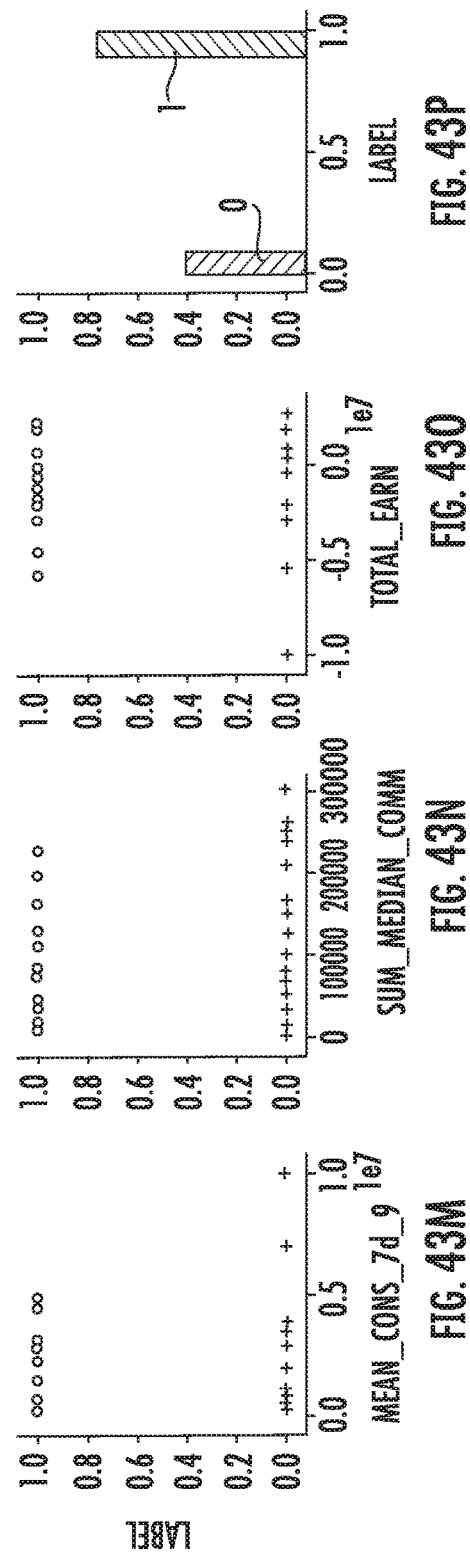

| METRIC | % |
|---|---|
| F1 SCORE | 96.55 |
| PRECISION | 97 |
| TRUE POSITIVE RATE | 95.14 |
| TRUE NEGATIVE RATE | 97 |

SYSTEM AND METHOD FOR ISSUING A LOAN TO A CONSUMER DETERMINED TO BE CREDITWORTHY AND WITH BAD DEBT FORECAST

PRIORITY APPLICATION(S)

This continuation-in-part application is based upon U.S. patent application Ser. No. 15/847,991 filed Dec. 20, 2017, which is based on U.S. provisional application Ser. No. 62/543,443 filed Aug. 10, 2017, and based upon U.S. provisional application Ser. No. 62/515,053 filed Jun. 5, 2017, the disclosures which are hereby incorporated by reference in their entirety.

FIELD OF THE INVENTION

The present invention relates to the field of mobile banking, and more particularly, this invention relates to a system and method for determining the creditworthiness of individuals or entities, issuing a loan, and generating a behavioral profile while enhancing computer processing and system operation and enhancing interoperation among databases.

BACKGROUND OF THE INVENTION

Mobile users may now use mobile devices, such as mobile wireless communications devices, i.e., mobile phones, pads, personal computers, and notebook computers, to receive funds, transfer funds, pay bills, and buy different goods using a platform such as an e-wallet or other hosting transactional application such as Uber, Facebook, eBay or other service. An e-wallet is also known as an electronic wallet, and in one aspect, it is a digital wallet that operates with different systems, including Windows®, Apple®, and other mobile platforms. The e-wallet may securely store passwords, credit card numbers, and other personal information using, for example, 256-bit AES encryption. Data is synchronized with an e-wallet desktop and selected mobile versions provided. Digital wallets allow an individual to make electronic transactions and an individual's bank account can be linked to the digital wallet. Other data pertinent to the e-wallet application may include a driver's license, health card, loyalty card, or other identification cards and documents stored on the mobile device. Sometimes the user's mobile telephone number serves as a unique identifier and short messaging service (SMS) may be used for mobile money transactions.

An example of such a loan processing system is disclosed in U.S. Patent Publication No. 2012/0239553 that provides a method to process and fund short-term loans for consumers. This loan system links a mobile credit storage facility amount to a mobile device associated with a user. An application for a short-term loan from the consumer is received through the mobile device and the entity grants or rejects approval of the short-term loan. Different identity information can be used such as the mobile device identification number associated with a user, a legal name and a social security number. The identification information may be used to record or establish a credit history and process transactions.

In this type of loan processing system, a user is not able to stay anonymous because identity information such as the name, social security number and the credit/debit card information of the user as a consumer are required to make a decision of whether a short-term or other loan should be granted or denied. Requiring such personal data and processing it may be time consuming and the processing at different servers and databases may add to the complexity and processing overhead. More efficient ways to enhance processing speed and efficiency without requiring the retrieval and processing of extensive personal data, especially for smaller nano and micro-loans, is desirable.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

A method of determining the creditworthiness and issuing loans to consumers and forecasting bad debt of the consumers comprises connecting a mobile wireless communications device of a consumer via a wireless communications network to a loan issuance server having a communications module, processor, and transaction database connected thereto. The method includes acquiring at the loan issuance server an initial set of data from at least one of an electronic wallet (e-wallet) of the consumer and public data sources containing data about the consumer. The initial set of data includes non-identification attributes of the consumer without obtaining a full name, a credit card number, a passport number, or a government issued ID number that allows identification of the consumer. The method includes randomly generating at the loan issuance server a user ID number that matches the initial set of data that had been acquired about the consumer and storing the initial set of data and user ID number corresponding to the consumer in the transaction database as a user profile. The method further includes generating at the loan issuance server a credit score based on the average credit among a plurality of user profiles stored within the transaction database and by matching a data attribute string based on the user ID number and the initial set of data to determine a maximum allowed credit for the consumer. A loan is approved based on the maximum allowed credit of the consumer and a loan approval code is transmitted from the loan issuance server to the wireless communications device of the consumer to initiate an application programming interface (API) on the mobile wireless communications device of the consumer to confirm or enter a value of a loan to be made. The method includes receiving back from the consumer the confirmation or value of the loan to be made and an indication of how it is to be dispersed and in response, crediting the e-wallet of the consumer or paying a bill associated with an account of the consumer in the value of the loan.

The method includes establishing a due date for repayment of the loan and storing within the transaction database consumer loan data about repeated loan transactions with the consumer that includes loan repayment data for each loan. Based on that stored consumer loan data, the method applies at the loan issuance server a machine learning model to the consumer loan data and determines when the consumer requires an increase in the maximum allowed credit and the risk involved with increasing the maximum allowed credit.

The machine learning model comprises a regression model may comprise a moving window that takes into account mean, standard deviation, median, kurtosis and skewness. The method may further comprise inputting past input/output data to the machine learning model, wherein the past input/output data comprises a vector for the input relating to past consumer loan data and an output relating to a probability between 0 and 1 that indicates whether a consumer will fall into bad debt.

A probability greater than 0.6 is indicative of a high risk that a consumer will fall into bad debt. A target variable outcome from the machine learning model may comprise a binary outcome that indicates whether a consumer will be a risk of bad debt within seven days. The method may further comprise collecting the consumer loan data over a period of six months and classifying consumers in two classes as 1) a bad client having a high risk probability of falling into bad debt, and 2) a good client having a low risk probability of falling into bad debt.

The method may further comprise generating a behavioral profile for the consumer based on the consumer location and check-ins to at least one of the e-wallet and the loan issuance server and further correlating periodic location patterns to loan and transactional activities and predicting by consumer profile and periodicity, loan disbursement patterns, use of loans, loan repayments, and transaction activities. The method may further comprise generating the behavioral profile based on consumer segmentation with consumer information provided via the contents of each transaction, and using affinity and purchase path analysis to identify products that sell in conjunction with each other depending on promotional and seasonal basis and linking between purchases over time.

The method may further comprise connecting the mobile wireless communications device of the consumer to the wireless communications network and the loan issuance server via the e-wallet and storing information in the transaction database about consumers that subscribe to an e-wallet and their transactions, displaying an application programming interface (API) on the mobile wireless communications device, wherein the consumer interacts with the e-wallet via the API on the mobile wireless communications device, and wherein the non-identification attributes comprise the gender, age, location, phone type, and cellular operator.

The method may further comprise transmitting the maximum credit via the API to the e-wallet that is tagged with the randomly generated user ID number, matching the user ID number to the actual consumer, and adding new attributes to the consumer and crediting a loan to the e-wallet for the consumer. In response to receiving the loan approval code, the consumer accesses at least one API screen on the mobile wireless communications device and enters data indicative of the value of the loan to be made and transmits that data to the loan issuance server to obtain the loan.

A system of determining the creditworthiness and issuing loans to consumers comprises a loan issuance server having a communications module, a processor, and transaction database connected thereto. A wireless communications network is connected to the loan issuance server. The processor and communications module are operative with each other to communicate with a consumer operating a wireless communications device via the wireless communications network and acquire an initial set of data from at least one of an electronic wallet (e-wallet) of the consumer and public data sources containing data about the consumer. The initial set of data includes non-identification attributes of the consumer without obtaining a full name, a credit card number, a passport number, or a government issued ID number that allows identification of the consumer. The controller is further configured to randomly generate a user ID number that matches the initial set of data that had been acquired about the consumer and store the initial set of data and user ID number corresponding to the consumer in the transaction database as a user profile. The processor generates a credit score based on the average credit among a plurality of user profiles stored within the transaction database and matches a data attribute string based on the user ID number and the initial set of data to determine a maximum allowed credit for the consumer. The controller approves a loan based on the maximum allowed credit of the consumer and configures the communications module to transmit a loan approval code to the wireless communications device of the consumer to initiate an application programming interface (API) on the mobile wireless communications device of the consumer to confirm or enter a value of a loan to be made and receive back from the consumer the confirmation or value of the loan to be made and an indication of how it is to be dispersed. In response, the processor credits the e-wallet of the consumer or pays a bill associated with an account of the consumer in the value of the loan.

The processor establishes a due date for repayment of the loan and stores within the transaction database consumer loan data about repeated loan transactions with the consumer that includes loan repayment data for each loan, and based on that stored consumer loan data, applies at the loan issuance server a machine learning model to the consumer loan data, and determines when the consumer requires an increase in the maximum allowed credit and the risk involved with increasing the maximum allowed credit.

The machine learning model may comprise a regression model having a moving window that takes into account mean, standard deviation, median, kurtosis and skewness and the processor is further configured to input past input/output data to the machine learning model, wherein the past input/output data comprises a vector for the input relating to past consumer loan data and an output relating to a probability between 0 and 1 that indicates whether a consumer will fall into bad debt. A probability greater than 0.6 is indicative of a high risk that a consumer will fall into bad debt. A target variable outcome from the machine learning model may comprise a binary outcome that indicates whether a consumer will be a risk of bad debt within seven days.

The processor may be configured to collect the consumer loan data over a period of six months and classify consumers in two classes as 1) a bad client having a high risk probability of falling into bad debt, and 2) a good client having a low risk probability of falling into bad debt. The processor may be configured to generate a behavioral profile for the consumer based on the consumer location and check-ins to at least one of the e-wallet and the loan issuance server and further correlate periodic location patterns to loan and transactional activities and predict by consumer profile and periodicity, loan disbursement patterns, use of loans, loan repayments, and transaction activities. The processor may be configured to generate the behavioral profile based on consumer segmentation with consumer information provided via the contents of each transaction and use affinity and purchase path analysis to identify products that sell in conjunction with each other depending on promotional and seasonal basis and linking between purchases over time.

The processor may be further configured to connect the mobile wireless communications device of the consumer to the wireless communications network and the loan issuance server via the e-wallet and store information in the transaction database about consumers that subscribe to an e-wallet and their transactions, display an application programming interface (API) on the mobile wireless communications device, wherein the consumer interacts with the e-wallet via the API on the mobile wireless communications device, and wherein the non-identification attributes may comprise the gender, age, location, phone type, and cellular operator. The processor may be configured to transmit the maximum credit via the API to the e-wallet that is tagged with the randomly generated user ID number, match the user ID number to the actual consumer, and add new attributes to the consumer and crediting a loan to the e-wallet for the consumer.

DESCRIPTION OF THE DRAWINGS

Other objects, features and advantages of the present invention will become apparent from the detailed description of the invention which follows, when considered in light of the accompanying drawings in which:

FIG. 15 are example wire frames of a USSD menu for consulting a loan.

FIG. 16 are example wire frames of an application menu on a mobile phone for requesting a pre-approved loan.

FIG. 29 is an example wire frame of the web portal for consulting all loans.

FIG. 30 is an example wire frame of the web portal for selecting a loan.

FIG. 31 is an example wire frame of the web portal for consulting a selected loan.

FIG. 36 is an example wire frame of the web portal for the help menu.

FIG. 38 is an example wire frame of the web portal for the history menu.

FIGS. 43A to 43P are graphs showing examples of different tendencies in the two classes.

DETAILED DESCRIPTION

Figure 1:
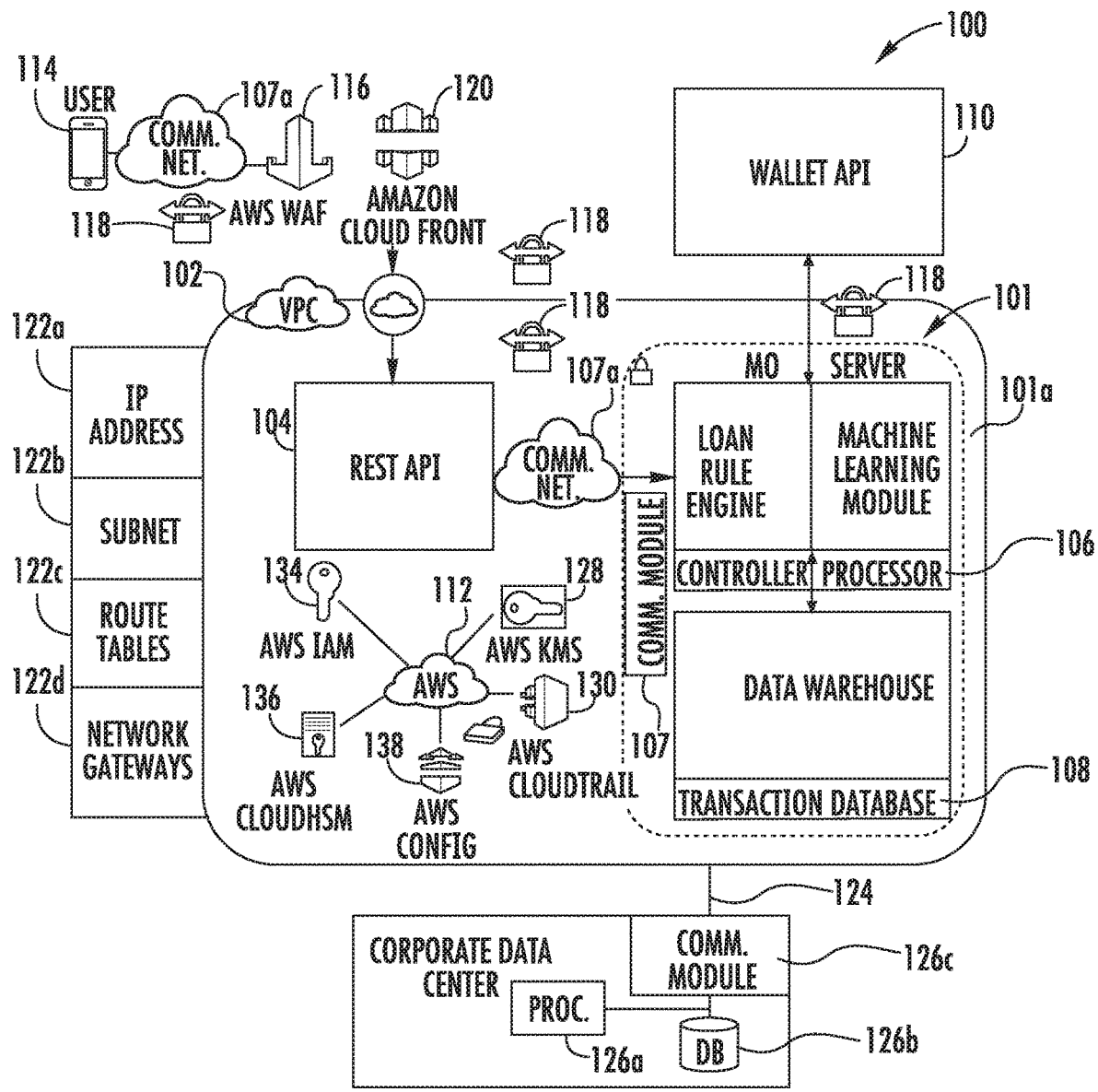
FIG. 1 is a fragmentary, block diagram showing components of the loan issuance system in accordance with a non-limiting example.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

The loan issuance system that is described in detail below includes a credit approval and loan issuance system or platform operating via a loan issuance server that allows nano and micro credit and pre-scoring anonymously for use at a user's mobile wireless communications device or at a user's web portal or related software platform. It is a new credit evaluation system that overcomes those disadvantages of existing systems that require personal and often confidential information such as names, surnames, social security numbers, credit and/or debit card information, and even a credit history of the user. Using the current loan issuance system, a person can be rated whose credit worthiness is difficult to understand, such as young people, renters and persons with smaller incomes. The pre-scoring may be accomplished anonymously based on user transaction data at a platform such as an e-wallet or other transactional platform, e.g., Uber, Facebook, eBay, or similar platforms. The data may be based on the user location, gender, age range, cellular operator and cellular phone model as non-limiting examples.

A loan rule engine as part of the system server and any associated processor includes a credit decision engine algorithm operative as a loan rule engine as part of the system architecture and may use machine learning data behavior analysis and predictive mathematical models. The credit scoring algorithm as part of the loan rule engine is dynamic and adjusts scoring continuously based on data correlation in order to optimize the value of the maximum loan issuance and the maximum number of loans that are issued to a user, for example, as a factor of a minimum bad debt value. The system architecture ensures security and speed in system response and scalability by hosting, for example, Amazon Web Services (AWS) and PCI compliant components, but also ensuring enhanced computer and system operation. Data may be managed to allow pre-scoring in order to optimize a user's experience and return loan and credit decisions in a few seconds, e.g., a maximum of 20 seconds. This time period could include any transmission delay in many examples. This anonymous analysis approach used by the loan issuance system removes any requirement for the user to input information and results in a more simple and efficient framework using, for example, UNIX based systems having different design patterns, such as a Model-View-Controller (MVC). It is platform independent and supports different client agents for an enhanced customer experience.

The loan issuance system as described is also referred to in this description as the MO system and sometimes explained by the designation "MO$" in the drawings and is a complete system architecture and platform that includes a MO server and processors operative as a loan rule engine and operative with databases that are integrated with the MO server or separate databases and operative as a data warehouse. Other system components may include an e-wallet associated with the user, an application API and application database. The loan rule engine operates as a credit decision engine. The MO system is innovative and does not use any of the traditional data and credit records that may be private and confidential to the user. The MO system pre-scores users anonymously. It is typically not necessary to incorporate personal information such as the name, surname, social security number, or credit/debit card information of a user in order to make a credit or loan decision. The MO system analyzes transactional data from an e-wallet or other hosting application and combines this information with data from external data sources to assign a maximum credit. This is usually a smaller amount such as useful with nano and micro-loans. The MO system as a credit and loan system is integrated with the e-wallet such as incorporated with mobile device applications or a hosting application in a web portal. The MO system is user friendly and intuitive, using in one example a maximum of three clicks or entries on a mobile device or other device to obtain a loan and disbursement. The user does not need to provide any additional detailed information. The credit decision is based on transactional data and the data from external sources that the MO system automatically collects. An advantage of the system is that in many cases, the user is already pre-approved. Once requested, the loan is credited to the e-wallet or hosting application in less than one minute.

As explained in further detail below, the MO system supports three credit types as proactive, reactive and corporate, and supports three disbursement types as unrestricted, restricted and direct bill payment. The MO system may include a Customer Communication Manager (CCM) as part of the MO server to manage the messaging to different users. It is available 24/7 so that a user can request a loan anytime and anywhere. The MO system would not store a user ID or personal information because data is processed via an anonymous identification code.

The system is operative to determine the creditworthiness and issue loans to consumers and generate a behavioral profile of the consumers. A mobile wireless communications device of a consumer is connected via a wireless communications network to a loan issuance server having a communications module, processor as a controller, and transaction database connected thereto. The method includes acquiring at the loan issuance server an initial set of data from at least one of an electronic wallet (e-wallet) of the consumer and public data sources containing data about the consumer. The initial set of data includes non-identification attributes of the consumer without obtaining a full name, a credit card number, a passport number, or a government issued ID number that allows identification of the consumer. The method includes randomly generating at the loan issuance server a user ID number that matches the initial set of data that had been acquired about the consumer and storing the initial set of data and user ID number corresponding to the consumer in the transaction database as a user profile.

The method further includes generating at the loan issuance server a credit score based on the average credit among a plurality of user profiles stored within the transaction database and by matching a data attribute string based on the user ID number and the initial set of data to determine a maximum allowed credit for the consumer. A loan is approved based on the maximum allowed credit of the consumer and a loan approval code is transmitted from the loan issuance server to the wireless communications device of the consumer to initiate an application programming interface (API) on the mobile wireless communications device of the consumer to confirm or enter a value of a loan to be made. The method includes receiving back from the consumer the confirmation or value of the loan to be made and an indication of how it is to be dispersed and in response, crediting the e-wallet of the consumer or paying a bill associated with an account of the consumer in the value of the loan. A behavioral profile for the consumer is generated based on the consumer location and check-ins to at least one of the e-wallet and the loan issuance server and further correlating periodic location patterns to loan and transactional activities.

The method may further include generating the behavioral profile using a customer conversation modeling or a multi-threaded analysis or any combination thereof. The method may further include generating the behavioral profile based on consumer segmentation with consumer information provided via the contents of each transaction and using affinity and purchase path analysis to identify products that sell in conjunction with each other depending on promotional and seasonal basis and linking between purchases over time.

The consumer check-ins and location for a consumer may be matched against a known-locations database that includes data regarding stores, private locations, public places and transaction data and correlating periodic location patterns to loan and transactional activities. The method may include predicting by consumer profile and periodicity, loan disbursement patterns, use of loans, loan repayments, and transaction activities. The method may include connecting the mobile wireless communications device of the consumer to the wireless communications network and the loan issuance server via the e-wallet and storing information in the transaction database about consumers that subscribe to an e-wallet and their transactions and displaying an application programming interface (API) on the mobile wireless communications device. The consumer interacts with the e-wallet via the API on the mobile wireless communications device.

The non-identification attributes may include the gender, age, location, phone type, and cellular operator. The method may include transmitting the maximum credit via the API to the e-wallet that is tagged with the randomly generated user ID number, matching the user ID number to the actual consumer, and adding new attributes to the consumer and crediting a loan to the e-wallet for the consumer. In response to receiving the loan approval code, the consumer accesses at least one API screen on the mobile wireless communications device and enters data indicative of the value of the loan to be made and transmits that data to the loan issuance server to obtain the loan.

A method of determining the creditworthiness and issuing loans to consumers includes connecting a mobile wireless communications device of a consumer via a wireless communications network to a loan issuance server having a communications module, processor as controller, and transaction database connected thereto. The method includes acquiring at the loan issuance server an initial set of data from at least one of an electronic wallet (e-wallet) of the consumer and public data sources containing data about the consumer, wherein the initial set of data includes non-identification attributes of the consumer without obtaining a full name, a credit card number, a passport number, or a government issued ID number that allows identification of the consumer. The method further includes randomly generating at the loan issuance server a user ID number that matches the initial set of data that had been acquired about the consumer and storing the initial set of data and user ID number corresponding to the consumer in the transaction database as a user profile. The method includes generating at the loan issuance server a credit score based on the average credit among a plurality of user profiles stored within the transaction database and by matching a data attribute string based on the user ID number and the initial set of data to determine a maximum allowed credit for the consumer. A loan is approved based on the maximum allowed credit of the consumer and transmitting a loan approval code from the loan issuance server to the wireless communications device of the consumer to initiate an application programming interface (API) on the mobile wireless communications device of the consumer to confirm or enter a value of a loan to be made and receiving back from the consumer the confirmation or value of the loan to be made and an indication of how it is to be dispersed. In response, the e-wallet of the consumer is credited or a bill associated with an account of the consumer is paid in the value of the loan.

A system of determining the creditworthiness and issuing loans to consumers may include a loan issuance server having a communications module, a processor or controller, and transaction database connected thereto. A wireless communications network is connected to the loan issuance server. The processor as a controller and communications module are operative with each other to communicate with a consumer operating a wireless communications device via the wireless communications network and acquire an initial set of data from at least one of an electronic wallet (e-wallet) of the consumer and public data sources containing data about the consumer. The initial set of data includes non-identification attributes of the consumer without obtaining a full name, a credit card number, a passport number, or a government issued ID number that allows identification of the consumer. The processor is further configured to randomly generate a user ID number that matches the initial set of data that had been acquired about the consumer and store the initial set of data and user ID number corresponding to the consumer in the transaction database as a user profile. The processor generates a credit score based on the average credit among a plurality of user profiles stored within the transaction database and matches a data attribute string based on the user ID number and the initial set of data to determine a maximum allowed credit for the consumer. The processor approves a loan based on the maximum allowed credit of the consumer and configures the communications module to transmit a loan approval code to the wireless communications device of the consumer to initiate an application programming interface (API) on the mobile wireless communications device of the consumer to confirm or enter a value of a loan to be made and receive back from the consumer the confirmation or value of the loan to be made and an indication of how it is to be dispersed. In response, the processor credits the e-wallet of the consumer or pays a bill associated with an account of the consumer in the value of the loan.

The processor is configured to generate a behavioral profile for the consumer based on the consumer location and check-ins to at least one of the e-wallet and the loan issuance server and further correlate periodic location patterns to loan and transactional activities. The processor is configured to generate the behavioral profile using a customer conversation modeling or a multi-threaded analysis or any combination thereof. The processor is configured to generate the behavioral profile based on consumer segmentation with consumer information provided via the contents of each transaction and using affinity and purchase path analysis to identify products that sell in conjunction with each other depending on promotional and seasonal basis and linking between purchases over time. The controller is configured to match the consumer check-ins to at least one of the e-wallet and the loan issuance server and the location for a consumer against a known-locations database that includes data regarding stores, private locations, public places and transaction data and correlating periodic location patterns to loan and transactional activities. The non-identification attributes comprises the gender, age, location, phone type, and cellular operator.

The system and method may determine when their consumer requires an increase in the maximum allowed credit and the risk involved with increasing the maximum allowed credit. A due date for repayment of the loan is established and the system will store within the transaction database consumer loan data about repeated loan transactions with the consumer that includes loan repayment data for each loan. Based on that stored consumer loan data, the system applies at the loan issuance server a machine learning model to the consumer loan data and determines when the consumer requires an increase in the maximum allowed credit and the risk involved with increasing the maximum allowed credit.

In an example, the machine the model may include a regression model having a moving window that takes into account mean, standard deviation, median, kurtosis and skewness. The system and method may further comprise inputting past input/output data to the machine learning model. This past input/output data comprises a vector for the input relating the past consumer loan data and an output relating to a probability between 0 and 1 that indicates whether a consumer will fall into bad debt. In yet another example, a probability greater than 0.6 is indicative of a high risk that a consumer will fall into bad debt. The target variable outcome from the machine learning model may comprise a bindery outcome that indicates whether it a consumer will be a risk of bad debt within seven days.

The system and method may include collecting the consumer loan data over a period of six months and classifying consumers in two classes as: (1) a bad client having a high risk probability of falling into bad debt, and (2) a good client having a low risk probability of falling into bad debt. The system and method may further generate a behavioral profile for the consumer based on the consumer location and check-ins to at least one of the e-wallet and the loan issuance server and further correlate periodic location patterns to loan and transactional activities and predict by consumer profile and periodicity the loan disbursement patterns, use of loans, loan repayments, and transaction activities.

The method may further include generating the behavioral profile based on consumer segmentation with consumer information provided via the contents of each transaction and using affinity and purchase path analysis to identify products that sell in conjunction with each other depending on promotional and seasonal basis and linking between purchases over time.

FIG. 1 is a high-level block diagram of an example credit decision and loan issuance system showing basic components of the entire networked system indicated generally at 100 and includes the MO System 101 that includes a MO server 101a also corresponding to the loan issuance server and may have components associated with a Virtual Private Cloud (VPC) 102, including a REST API 104 and provides interoperability between computer systems on the internet allowing systems to access and manipulate textual information. The MO server 101 includes a processor as a controller 106 with other circuit components, including software and/or firmware operative as a Local Rule Engine and an integrated or separate transactional database that may be a sub-component or include a Data Warehouse 108 that could be incorporated with or separate from the MO server 101a.

The MO server 101 includes the processor as a controller 106 that may also include a machine learning module that is operative to have the processor apply a machine learning model to any stored consumer loan data and determine when the consumer requires an increase in the maximum allowed credit and the risk involved with increasing the maximum allowed credit. Different transactions of the consumer as a client can be stored in the data warehouse and different transactions reflecting the different transactions performed by the consumer as a client and their past history. This information can be stored and later the machine learning model applied to that stored consumer loan data and determine when the consumer requires an increase in the maximum allowed credit and the risk involved with increasing the maximum allowed credit. Further aspects of the machine learning module that applies the machine learning model are explained below such as use of a regression model having the moving window that takes into account mean, standard deviation, median, kurtosis, and skewness.

A communications module 107 is operative with the controller 106 and communications with a communications network 107a, such as a wireless network. However, the module 107 could operate as a landline based, WiFi, or other communications protocol. The controller and Local Rule Engine 106 interfaces with a wallet API corresponding to an e-wallet application 110. The Amazon Web Services (AWS) 112 is described in a non-limiting example as integrated with the MO system 101, but other types of network systems could be implemented and used besides the AWS. The user as a consumer for the loan may operate their mobile device 114 and its application with an interface to the Amazon Web Services Web Application Firewall (AWS WAF) 116 to protect web applications from common web exploits and provide security as shown by the secure lock logo 118, which includes appropriate code and/or hardware components to protect against compromising security breaches and other occurrences or data breaches that consume excessive resources. The MO system 101 may control which data traffic to allow, may block web applications, and may define customizable web security rules. Custom rules for different time frames and applications may be created. The system operator of the MO system 101 will use an API such as associated with the MO server to automate any creation and deployment of improvements, system operation, and maintenance web security rules.

The AWS WAF 116 is integrated with an Amazon CloudFront 120, which typically includes an application load balancer (ALB). The CloudFront 120 operates as a web service to permit effective distribution of data with low latency and high data transfer speeds. Other types of web service systems may be used. The Amazon CloudFront 120 interoperates with the Virtual Private Cloud (VPC) 102 and provisions logically isolated sections of the CloudFront 120 in order to launch various resources in a virtual network that the MO system 101 defines. This allows control over the virtual networking environment, including IP address ranges 122a, subnets 122b and configurations for route tables 122c and network gateways 122d. A hardware VPN connection 124 could exist between a corporate data center 126 and the MO system's Virtual Private Cloud 102 and leverage the AWS CloudFront as an extension of a corporate data center. The corporate data center 126 includes appropriate servers or processors 126a, databases 126b, and communications modules 126c that communicate with the MO server corresponding to the MO system 101, which in a non-limiting example, could incorporate the corporate data center.

As part of the Virtual Private Cloud 102 is the Representational State Transfer (REST) Application Programming Interface (API) 104 that provides interoperability among computer systems on the internet and permits different data requesting systems to access and manipulate representations of web resources using a uniform and predefined set of stateless operations. The Amazon Web Services 112 interoperates with the AWS Key Management Service (KMS) 128 and manages encryption and provides key storage, management and auditing to encrypt data across the AWS services. The AWS CloudTrail 130 records API calls made on the account and delivers log files, for example, to an "S3" bucket or database as a cloud storage in one example with one or more databases such as could be part of the data warehouse 108 operative as the transaction database and provides visibility of the user activity since it records the API calls made on the account of the MO system 101. The CloudTrail 130 may record information about each API call, including the name of the API, the identity of the caller, the time and different parameters that may be requested or response elements returned by the service in order to track changes made to AWS resources and determine greater security and identity of users.

The AWS Identity and Access Management (IAM) 134 will permit the MO system 101 to control individual and group access in a secure manner and create and manage user identities and grant permissions for those users to access the different resources. The AWS Cloud HSM service 136 permits compliance with different requirements, including data security using a hardware security module appliance within the cloud. It may help manage cryptographic keys. The AWS CONFIG module 138 permits compliance auditing, security analysis, change management, and operational troubleshooting. The different resources may be inventoried with changes in configurations and reviewed relationships. The REST API 104 interoperates with the Loan Rule Engine as part of the controller 106 and Data Warehouse 108 of the MO system 101.

Figure 2:
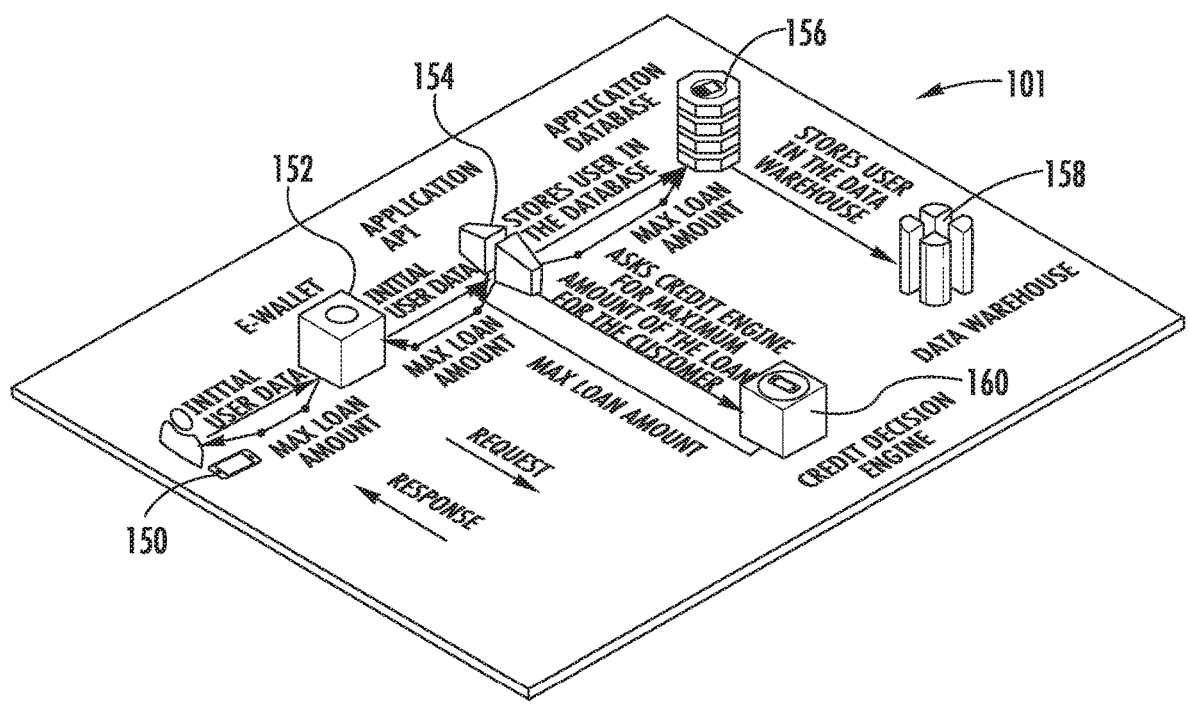
FIG. 2 is a fragmentary block flow diagram showing data flow for a pre-scoring process.
Figure 3:
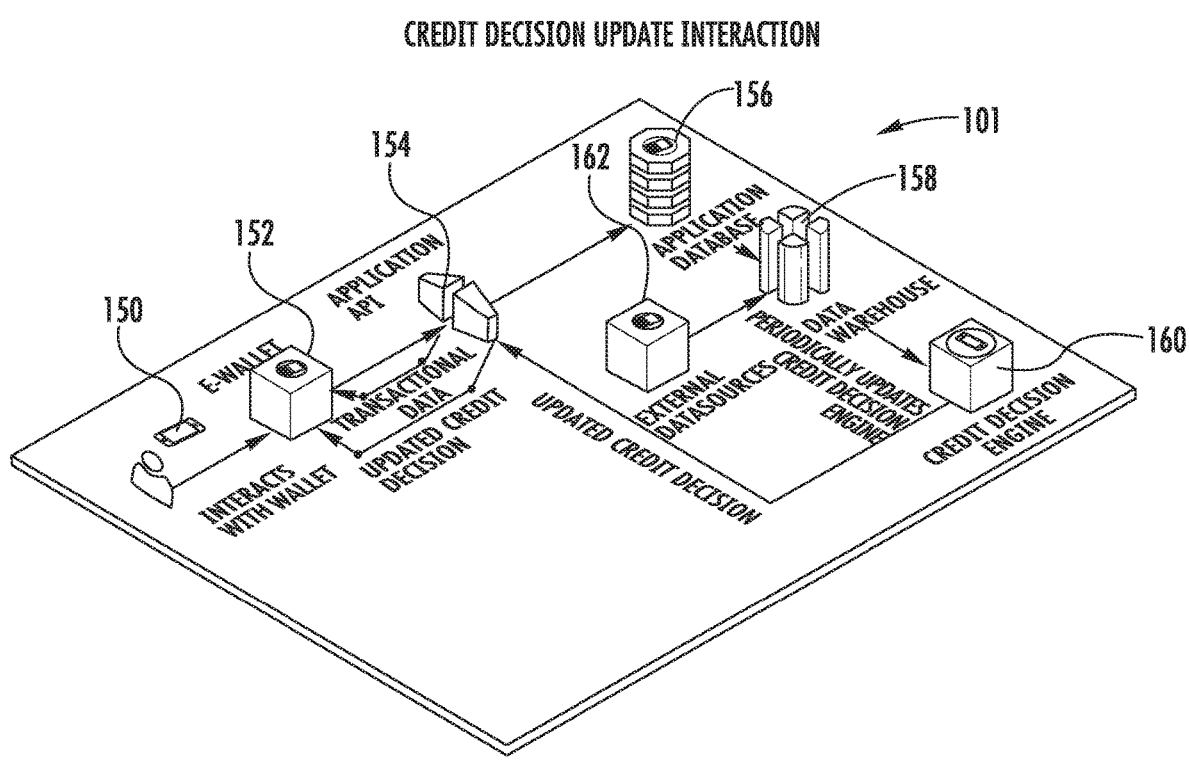
FIG. 3 is a fragmentary block flow diagram showing data flow among system components for a credit decision update.

The MO system 101 operates in one non-limiting example in a two-phase approach. FIGS. 2 and 3 show components used with a respective pre-scoring process (FIG. 2) and credit decision update interaction (FIG. 3). Basic components are described with new reference numerals and shown in FIG. 2 as the user device 150 interoperating with the e-wallet 152 and application API 154 as part of the application to interface with the MO system 101 and obtain a loan, and an application database 156, which interoperates with the data warehouse 158. The application API 154 interoperates with a credit decision engine 160 that may correspond to the loan rule engine 106 as shown in FIG. 1. Many of the modules/components could be incorporated within the same MO server or separate. The data warehouse 158 may correspond to the data warehouse 108 in FIG. 1. The application database 156 could be separate or integrated with the date warehouse and could include relational and non-relational components. Initial data from a consumer could be stored initially in the application database 156, and could even be a more dynamic and shorter term memory than the data warehouse. Other units in FIG. 1 may correspond respectively to various components such as the e-wallet 110 of FIG. 1 to the e-wallet 152 in FIG. 2 and the application database 156 may corresponds to a portion of the data warehouse 158 or be a separate database as part of the Virtual Private Cloud 102, but in some cases, still component parts of the MO system 101 and MO server.

Figure 4:
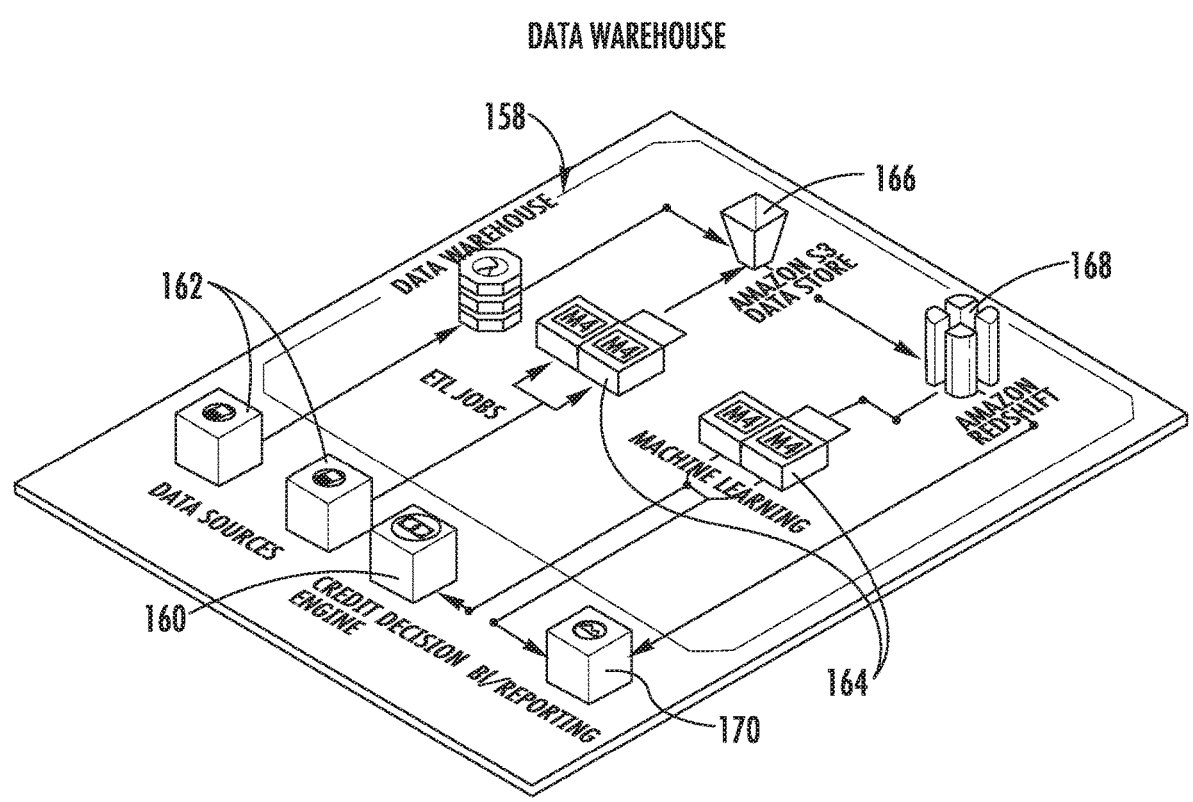
FIG. 4 is a fragmentary block flow diagram showing data flow among components in the data warehouse.

Referring now to FIG. 3, there is shown a similar view of the credit decision update interaction, but also showing the external data sources 162. Referring now to FIG. 4, the data warehouse 158 receives data from data sources 162 that interoperate with ETL (extract, transform, load) jobs and machine learning components 164 that in turn interoperate with a data store such as the Amazon simple cloud storage service (S3) 166, and in a non-limiting example, Amazon Redshift as an internet data warehouse service 168. These components via machine learning interoperate with the business intelligence reporting module 170. In this process, it is possible to analyze data using a SQL (Structural Query Language) and existing business intelligent tools to create tables and columns with the most accurate data types and detect schema changes and keep the tables up-to-date. Many dozens of data inputs can be connected and mash ups may be created to analyze transactional and user data. It is possible to use both relational and non-relational databases depending on the types of data.

In the first phase generally shown by the flow sequence in FIG. 2, when a user 150 initially signs-in to the e-wallet 152 or other transactional application platform connected to the MO system 101, the system via the processing of the engine 160 generates a first pre-approved maximum credit typically based on the initial set of data, and without acquiring any identification data for the users. This first anonymous credit decision may typically be made within 20 seconds from the user data being passed to the system.

In the second phase generally shown by the flow sequence in FIG. 3, after the user data is initially stored in the data warehouse 158 and is assigned an initial maximum credit, the MO system 101 starts acquiring transactional and external data to update the maximum credit periodically. The end user cannot never request a loan, but can only request a release of loan funds up to the maximum credit pre-approved and set by the MO system 101.

Phase 1: Initial User Profile Generation and Maximum Credit

The system credit scoring engine 160, which may be part of the controller 106 (FIG. 1) and data warehouse 158 acquire an initial set of user data via the application API 154 with the source e-wallet 152 or transactional application.

As illustrated in the flow sequence of FIG. 2, the user 150 communicates with the e-wallet 152 and communicates initial user data with the application API 154, such as implemented by the MO system 101 and could be the application brought up on the mobile device or accessed via a web portal. This data is stored in the application database 156 and in the data warehouse 158. Based on the initial user data, the user makes a request for credit and the application API 154 queries the credit (or loan) engine 160 for the maximum amount of the loan that may be made to the customer (user) and returns that data on the maximum loan amount. Based on this initial request, the response for the maximum loan amount is returned to the user mobile device 150, or as an example, web portal depending on how the user contacts the MO system. This maximum loan amount information is also transferred from the application API 154 to the application database 156 and stored in the data warehouse 158.

This initial set of data may be retrieved from the initial communications with the user data from external databases based on the external data sources and may include the gender, age, location, phone type, cellular operator, and a randomly generated user ID that uniquely matches this data set to a physical user in the e-wallet 152 and in the transactional application database 156. The MO system 101 does not acquire any information that allows identification of the user 150, such as full name, address, credit card number, passport number, or a government issued ID number.

An example of the initial data structure generated for each user is: user ID; Attribute 1; Attribute 2; Attribute 3; Attribute 4; . . . ; Attribute N. The system uses this initial attribute string to generate an immediate credit score for this user, by matching this user attribute string to the user's database and applying the maximum credit score for the user profile, calculated as the average credit among all user profiles matching the initial set of attributes.

Initial user ID: N attributes
a) Users Database Match:
Filter by users that match the same N attributes values: X user profile with N+Y to Z attributes;
b) Maximum Credit Calculation:
Average value of Maximum Credit for user profiles with N+Y to Z attributes;
Correlation and probability of repay loan prediction for user profiles with N+Y to Z attributes; and
Apply business rules.

The maximum credit calculated for that user is then sent via the MO system API 154 to the e-wallet 152 and then the transactional or application API 154 is tagged with the randomly generated User ID number. The e-wallet 152 and "transactional" API application 154 then matches the user ID to the actual physical user operating with the MO system 101 and to this user the maximum credit value is a Pre-Approved Credit.

The above process, from initial acquisition of user data, to communication of the maximum credit for the user, may take approximately 20 seconds in typical cases.

Phase 2: User Profile Data Expansion

Once the new user is recorded in the Data Warehouse 158, and the initial Maximum Credit score generated, the MO system 101 initiates the process of adding and computing new attributes to the user profile using the loan activities and acquiring all transactional data from the e-wallet 152 and transactional application API 154. In this example, the user transactional data may be imported from the e-wallet 152 and transactional application API 154 once every X hours.

The MO system 101 will also match relevant external attributes to the user profile. The MO system 101 may generate a database of external data that are imported from a variety of public domain sources as the external data sources 162 in an example. This external data is continuously updated and correlated to the users linking to their initial generic attributes, e.g., location linked attributes; gender linked attributes; age linked attributes; cellular operator linked attributes; and cell phone type linked attributes.

The new data attributes are stored in the data warehouse 158 and associated to the unique user ID as a user ID and attributes as N (initial)+X (transactional)+Y (external)+Z (loan/repayments).

Loan Activities

These activities include loan transactions (loan taken, use of loan, amount, date and time) and repayment activities (repayments, amount, date and time).

Transactional Data

The transactional data may include all data from the transactional activities on the e-wallet 152 and application platform such as occurs at the MO system 101 on its MO server, for example, which profile the digital behavior of the users, such as:
Cash-in transactions (amounts, type of cash-in, location of cash-in, date and time);
Cash-out transactions (amounts, type of cash-out, location of cash-out, date and time);
Bill payment transactions (type of bill, status of bill [expired, early payment, on-time], amounts, date and time);
Purchase transactions (amounts, type of purchase, location of purchase, date and time);
Cellular phone top ups (amounts, location of top-ups, date and time);
Log-in activities (log-in date and time, duration of session, session flow, time spent on each screen);
Sales transactions (sales value, type of product sold, location of sale, date and time);
Commission transactions (commission value, type of commission, date and time);
The money transfer transactions (sent/received, sent by/received by, value, location, date and time); and
Any other transactional or activity recorded in the e-wallet/platform.

External Data

The external data may be received from the external data sources 162 such as shown in FIGS. 3 and 4 and include data collected from public domain sources, paid for data sources, and historical data archives of the mobile operators, such as:
Criminal records by geo-location;
The value of any homes by geo-location;
The value of any rental homes by geo-location;
Average income by geo-location, gender and age groups;
Education data by geo-location and gender;
Public transport options by geo-location;
Social media activities by geo-location, gender and age groups;
Infrastructure and services available by geo-location (hospitals, dentists, clinics, supermarkets, hardware stores, furniture stores, shopping malls, etc.); and
Mobile usage data (age of account, number of outgoing calls, number of incoming calls, number of mobile numbers called, average monthly spending, number of monthly top ups, etc.).

Figure 5:
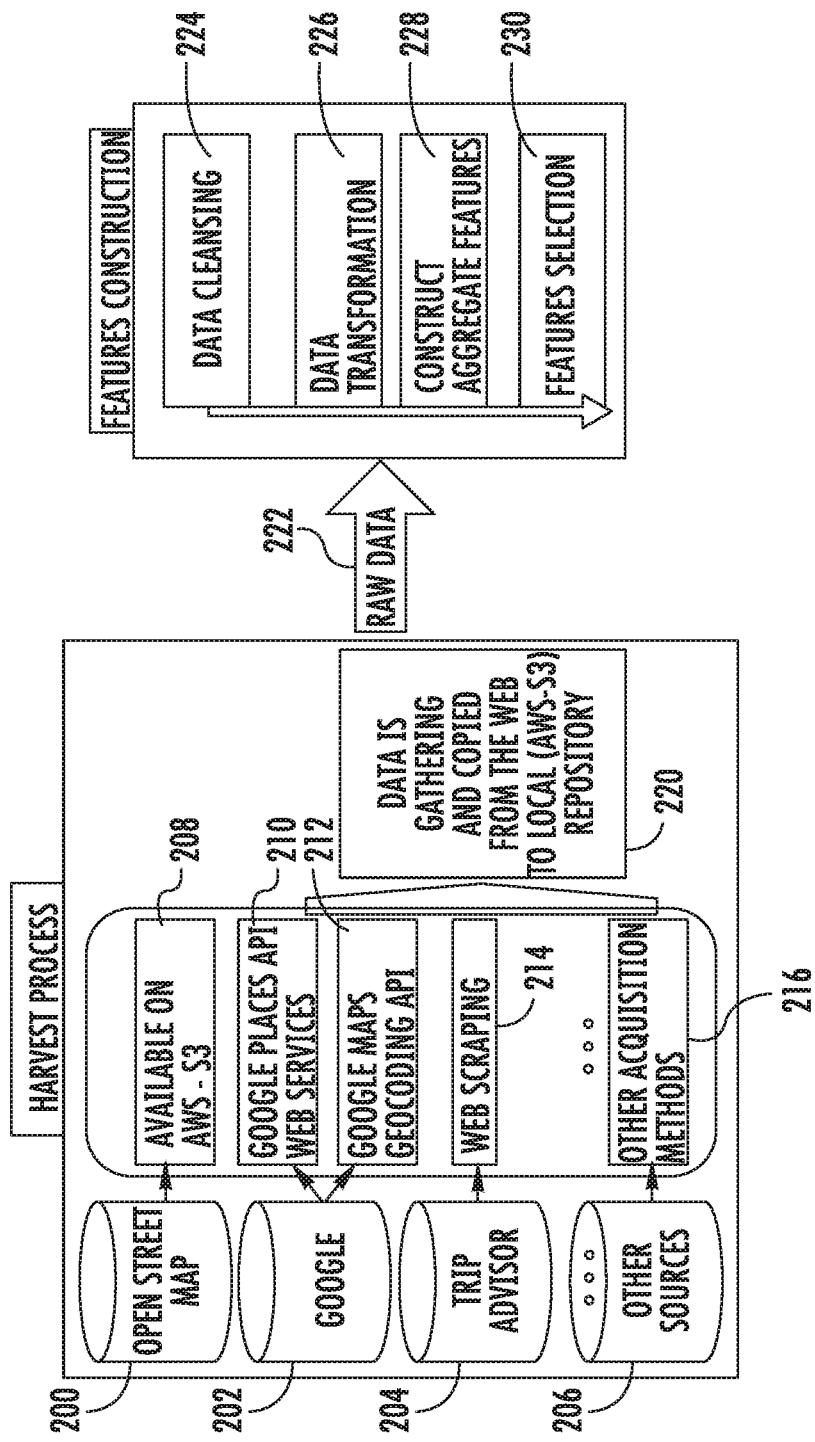
FIG. 5 is a block diagram of acquiring external data using the system of FIG. 1.

Referring now to FIG. 5, there are shown further details of the process to collect external variables used to determine the creditworthiness and risk of a user as a potential customer. The external variables are considered as all public information and may be collected through geo-location information such as public and private infrastructure, weather, ratings, and public evaluations of surrounding establishments. Common data sources include web mapping services such as Google Maps and Open Street Maps, web services, web pages, and public data repositories. The various data sources as non-limiting examples are illustrated such as an Open Street Map 200, Google 202, Trip Advisor 204, and other sources 206.

For example, the Open Street Map application may be available via the Amazon web services cloud storage 208 (S3) and the Google Places API and Web Services 210 may interoperate with Google, including Google Maps and a Geocoding API 212. Web scraping 214 may be used together with other acquisition methods 216. There are many other possible data acquisition methods to be taken advantage of. Data is gathered and copied from the web to a local repository 220 and raw data 222 is then cleansed 224, transformed 226, aggregate features constructed 228, and final features selected 230. It should be understood that the harvest process is determined by the data source types and some sources could be available for direct download as tables. Other sources may require additional methods to access data. For example, Google Maps data and information may be obtained by querying and request data available on various Google application programming interfaces. The web scraping techniques are a useful tool for accessing information contained in documents such as web pages. A data parser program could be used to parse and capture relevant information. Once raw data is gathered and copied from a source to the local repository, the system performs a pre-processing stage where data is cleaned and transformed in order to construct and select new features that may be used for predictive models.

Using the features selection 230, the MO processor as part of a MO server, i.e., MO system 101, and rule engine 106 may infer which variables contribute more to explain some customer characteristics such as socio-economic status, purchasing power, economic dynamics, and land-use. Different methods may establish the relation between external variables and the target characteristics.

Different processing methods and algorithms as non-limiting learning methods may be used. For example, the correlation coefficient may be used to infer the association between each external variable and the target. Variables at the highest correlation are considered as better target descriptors. For example, a rank correlation could study the relationships between rankings of different variables or different rankings of the same variable while the measure of the strength and direction of a linear relationship between two variables may be defined as a (sample) covariance of the variables divided by the product of their (sample) standard deviations.

An information gain method may be used where the method calculates the relevance of the attributes based on information gain and assigns weights to them accordingly. The higher the weight of an attribute, the more relevant it is considered. Although information gain is usually a good measure for deciding the relevance of an attribute, it may have some drawbacks and a notable problem occurs when information gain is applied to attributes that can take on a large number of distinct values. This issue may be tackled with a gain ratio. In any decision tree learning, the information gain ratio is a ratio of information gain to intrinsic information and may reduce a bias towards multi-valued attributes by taking the number and size of branches into account when choosing an attribute. A random force with gain ratio methodology trains random force with gain ratio as an attribute selector. Information may be considered as a gain ratio for generating attribute weights. This decision methodology is also known as random decision force and operates in one example by constructing a multitude of decision trees at training time and outputting the class that is the mode of the classes as classification or mean prediction as a regression of the individual trees.

It is also possible to use a weight by Gini index that calculates the relevance of the attributes of the given external variables set based on the Gini impurity index. The weight by Gini index operator calculates the weight of attributes with respect to the target attribute by computing the Gini index of the class distribution. The higher the weight of an attribute, the more relevant it is considered. This operates as a measure of statistical dispersion in the Gini coefficient making equality among values of a frequency distribution.

It is possible to use a weight by Support Vector Machine (SVM) that computes the relevance of the external variables by computing for each variable of the input set the weight with respect to the target. This weight represents the coefficients of a hyper plain calculated by the SVM. They operate as a supervised learning model that analyzes data used for classification and regression analysis.

Figure 6:
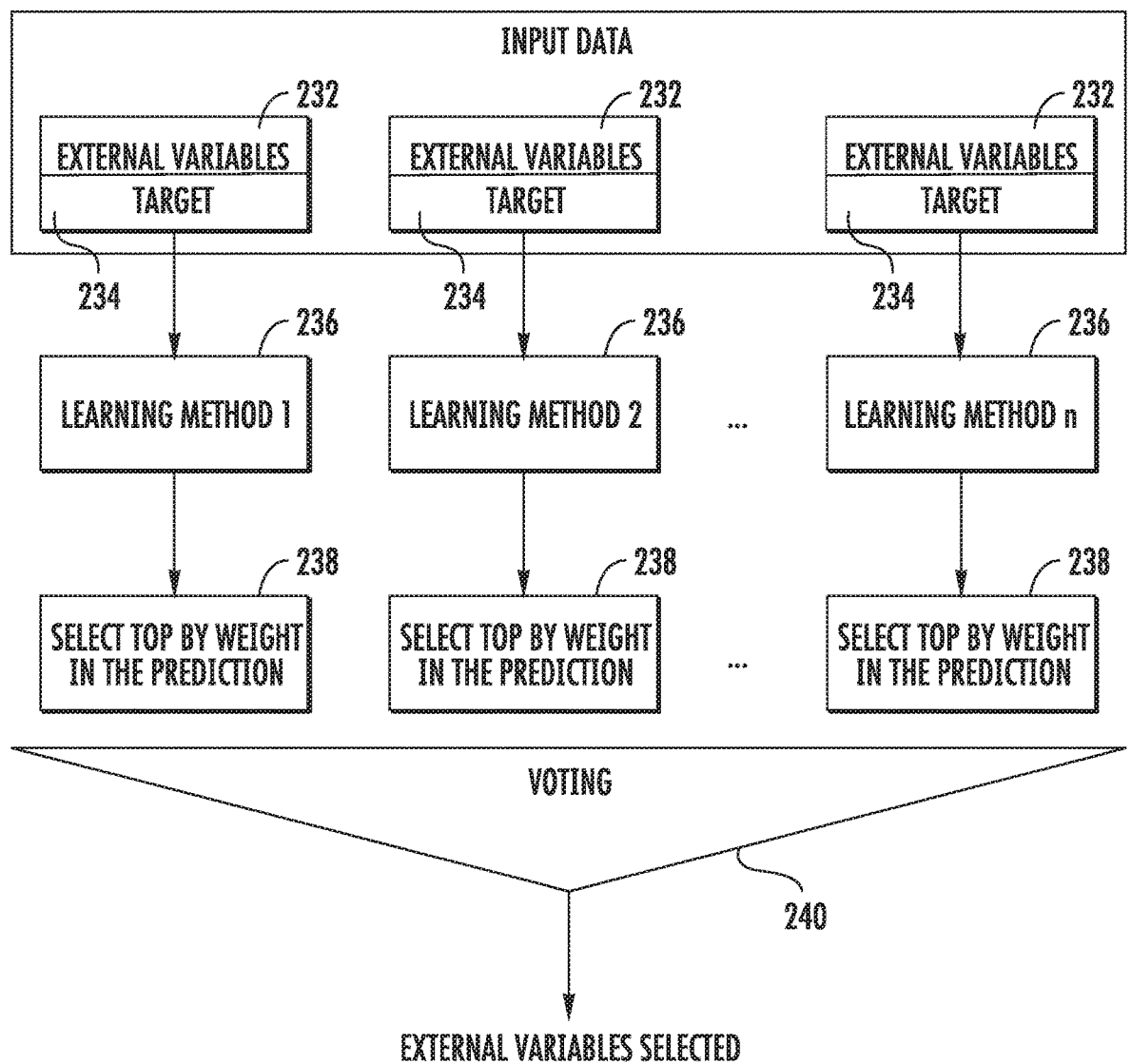
FIG. 6 is a flowchart showing attribute selection using the system of FIG. 1.

Referring now to FIG. 6, there is illustrated a non-limiting assembly strategy to select the features with voting used to select between the top attributes employed by each method to compute the prediction that previously was carried out separately. The input data has external variables 232 and a target 234 with the learning methods 236 that select the top by weight in the prediction 238 with the voting 240 to establish the selected external variables.

Figure 7:
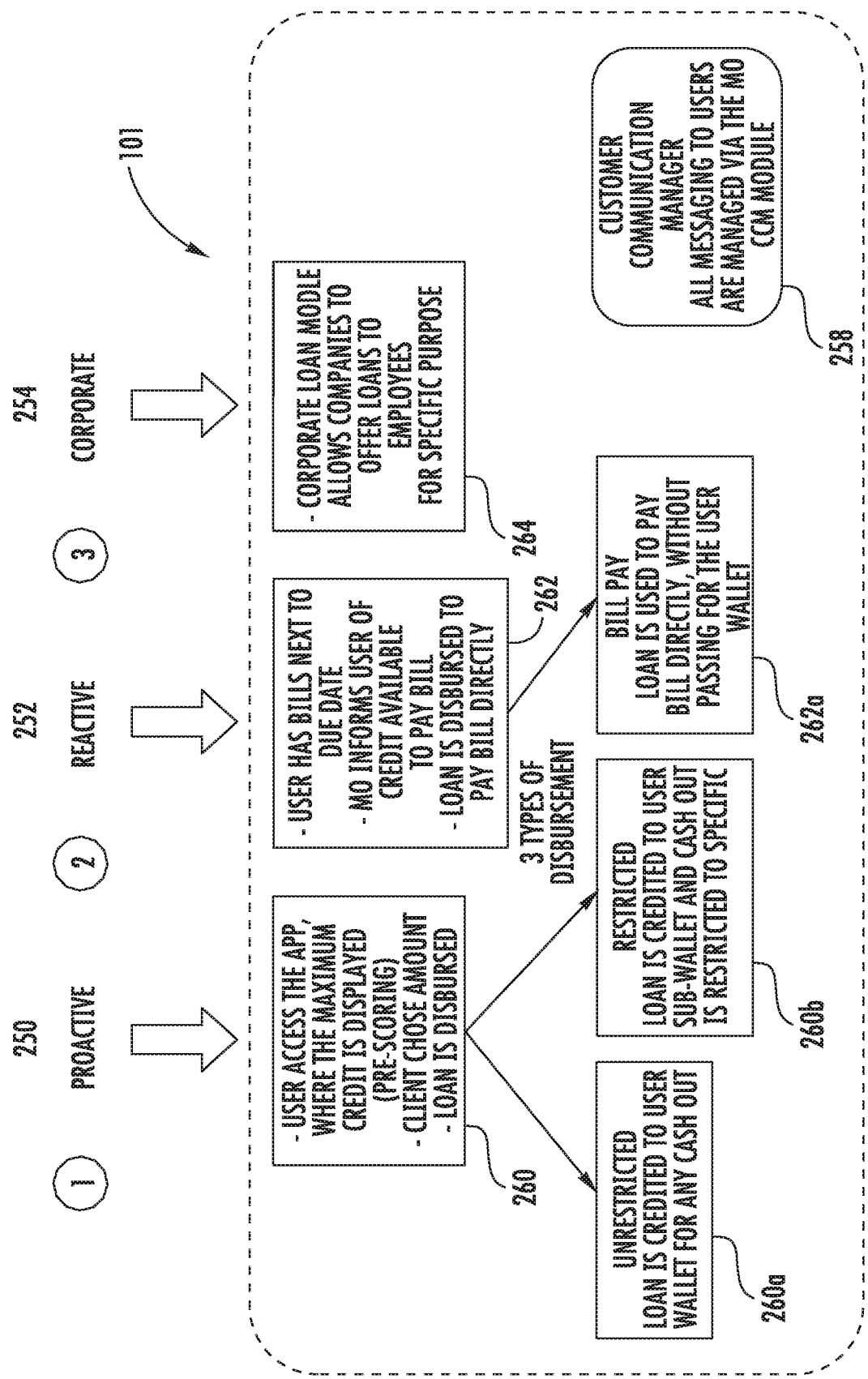
FIG. 7 is a block diagram showing the types of loans and disbursements using the system of FIG. 1.

Referring now to FIG. 7, there are shown examples of the loan and disbursement types to maximize product offerings supported by the MO system. Proactive 250, reactive 252 and corporate 254 loans are supported and unrestricted 260a, restricted 260b, and bill pay disbursements 262a are supported. As illustrated, a customer communication manager 258 functions with the user through their mobile application typically and all messaging to users are managed via the MO system 101 via customer communications manager module 258. This module 258 manages all messaging. The customer communication manager module 258 will manage the recipient's user accounts, including passwords and access modifications. As shown with the proactive system 250, the user accesses the application with the maximum credit displayed with pre-scoring and the client chooses the amount and the loan is disbursed (Block 260) and is either unrestricted where the loan is credited to the user for any cash out (Block 260a) or restricted with the loan is credited to the user sub-wallet and cash out is restricted to specific uses (Block 260b). In a reactive type system 252, the user has bills next to a due date and the MO system 101 informs the user of the credit available to pay the bill. The loan may be disbursed to pay the bill directly (Block 262) without passing for the e-wallet (Block 262a). The third type of disbursement as a bill pay occurs and the loan is used to pay the bill directly without passing through (or for) the user wallet (Block 262). In a corporate loan 254, the corporate loan module may allow companies to offer loans to employees for specific purposes.

Figure 9:
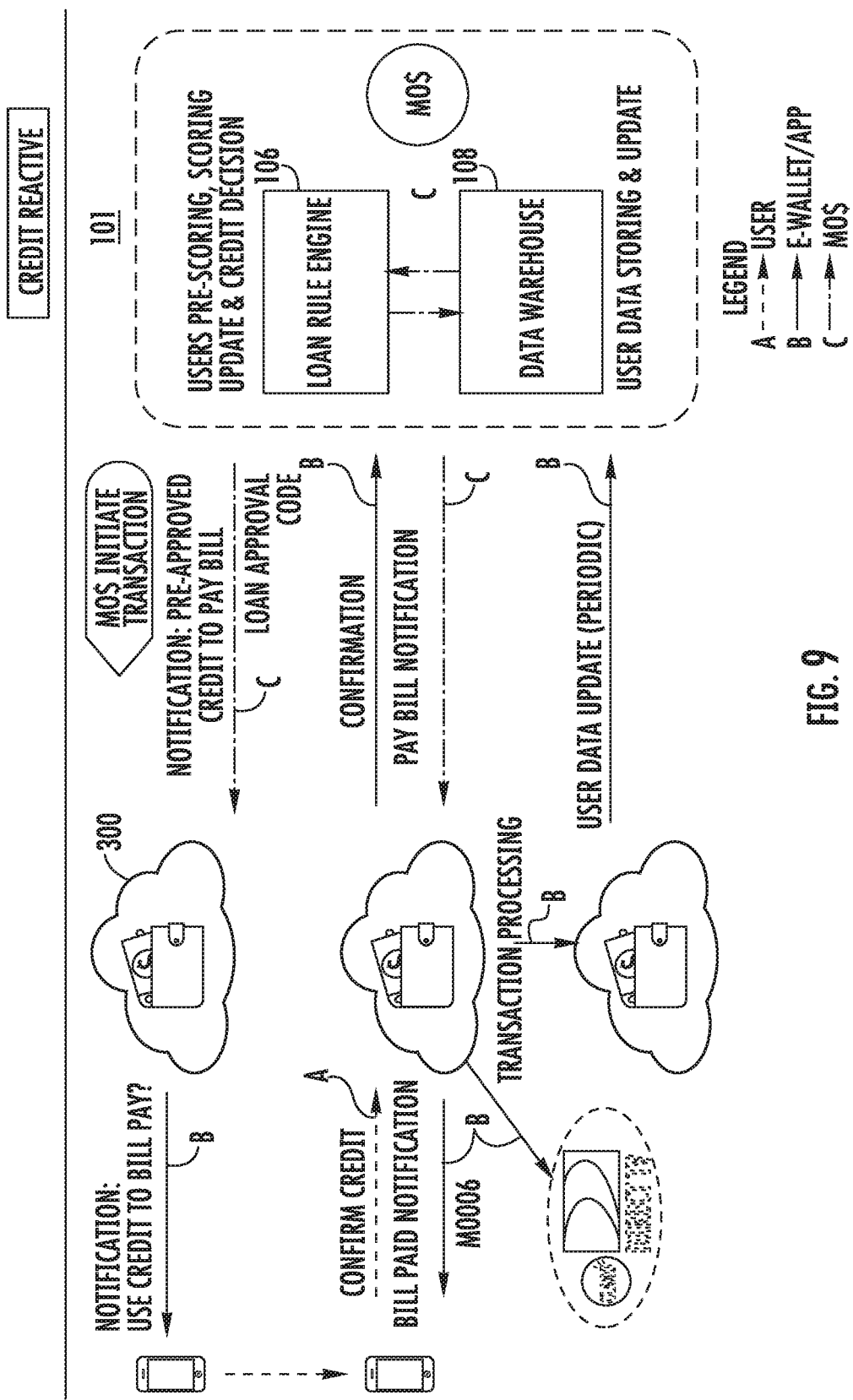
FIG. 9 is a flow sequence of paying a bill and receiving notification.
Figure 10:
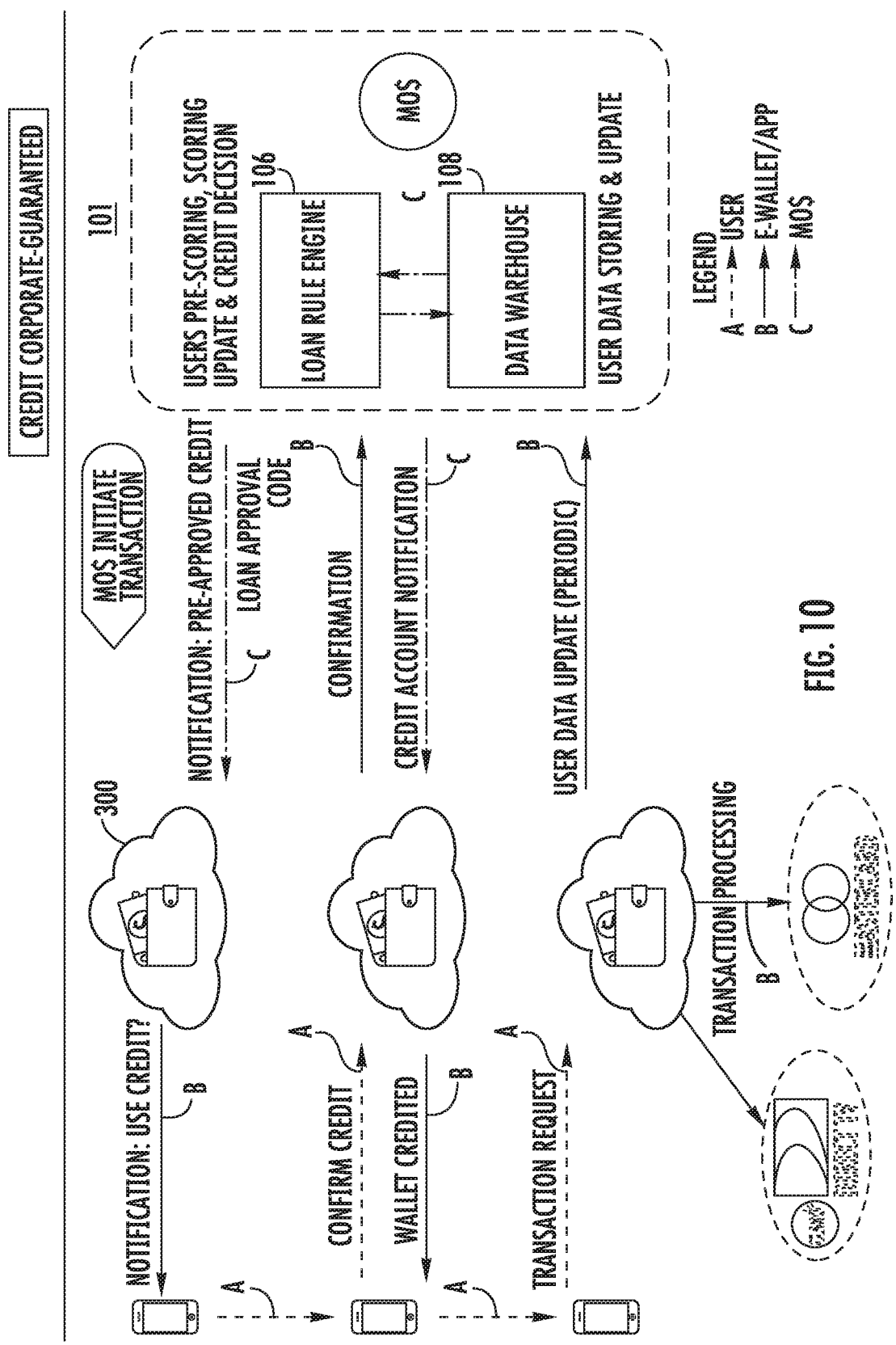
FIG. 10 is a flow sequence of guaranteed credit.
Figure 11:
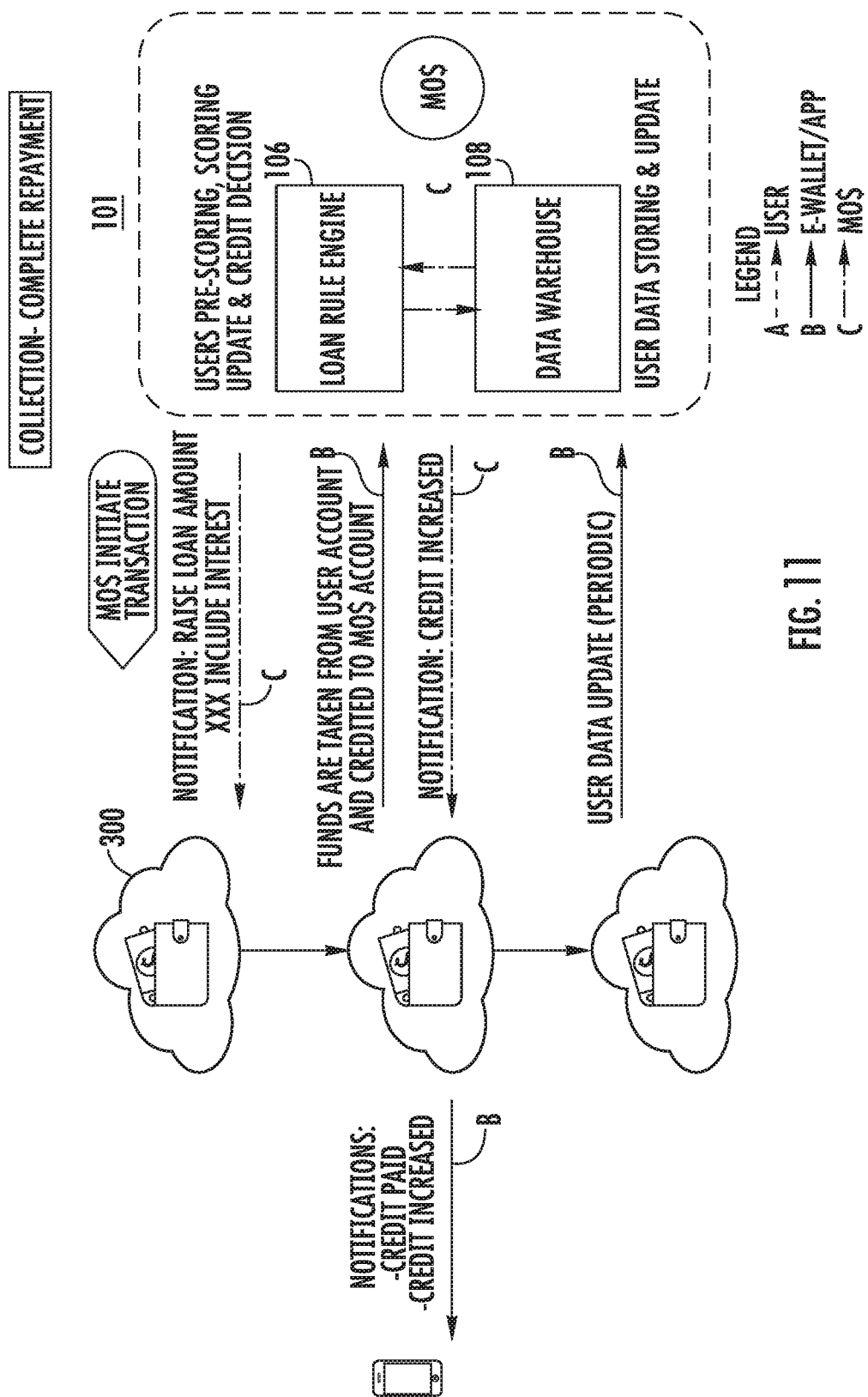
FIG. 11 is a flow sequence of a complete repayment.
Figure 12:
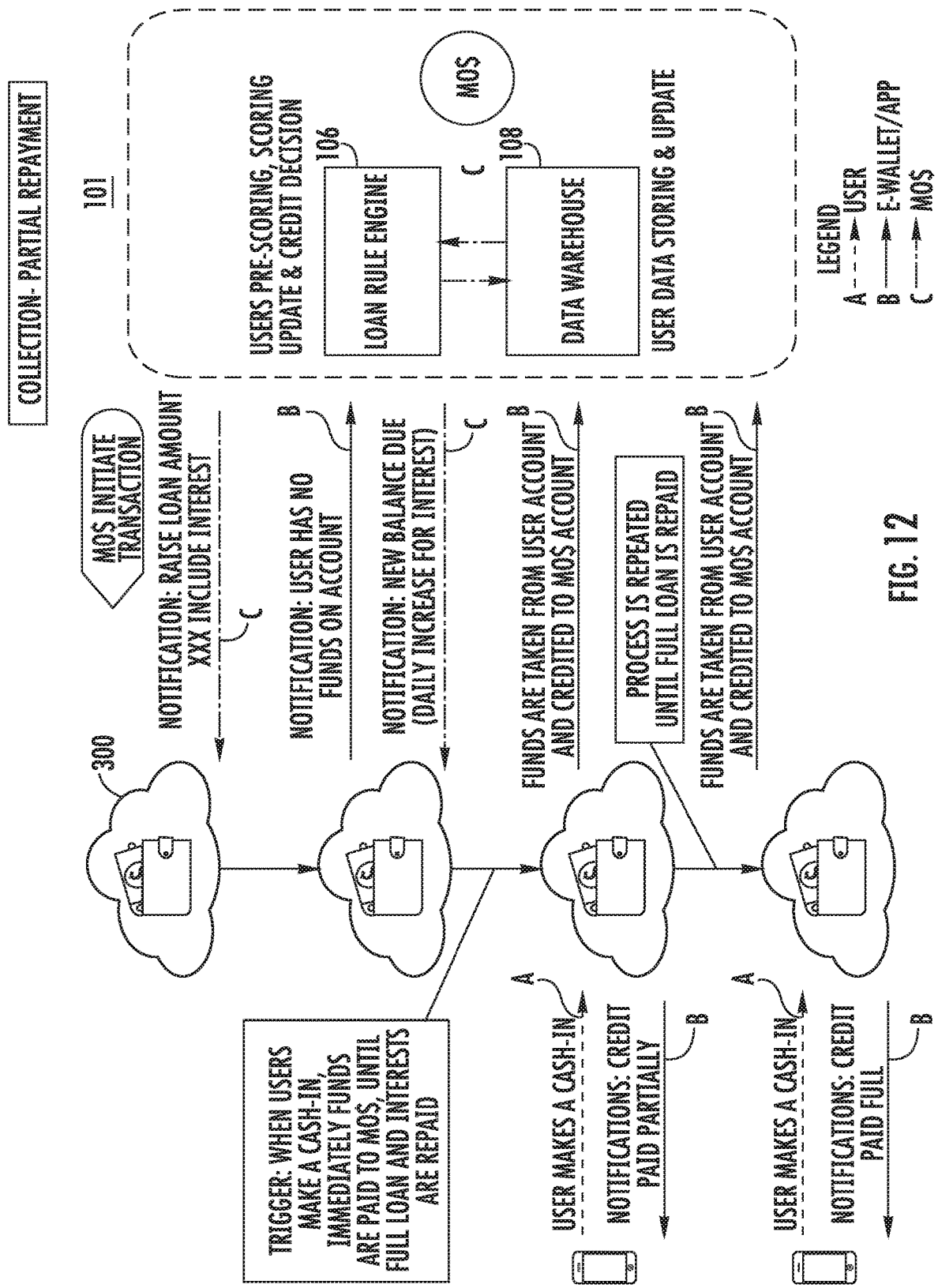
FIG. 12 is a flow sequence of partial repayment.

Referring now to FIGS. 8-12, there are illustrated flow sequences for the various processes shown in FIG. 7 such as the proactive, reactive, and corporate credit that is guaranteed and showing in FIG. 11 a collection as a complete repayment or partial repayment (FIG. 12). Each of the figures shows the user device 150 and operating with the application shown by the cloud 300 and interoperating with the system that includes the loan rule engine 106 and data warehouse 108 with the errors corresponding to A as the user and the e-wallet application as B and the system rule engine as C.

Figure 8:
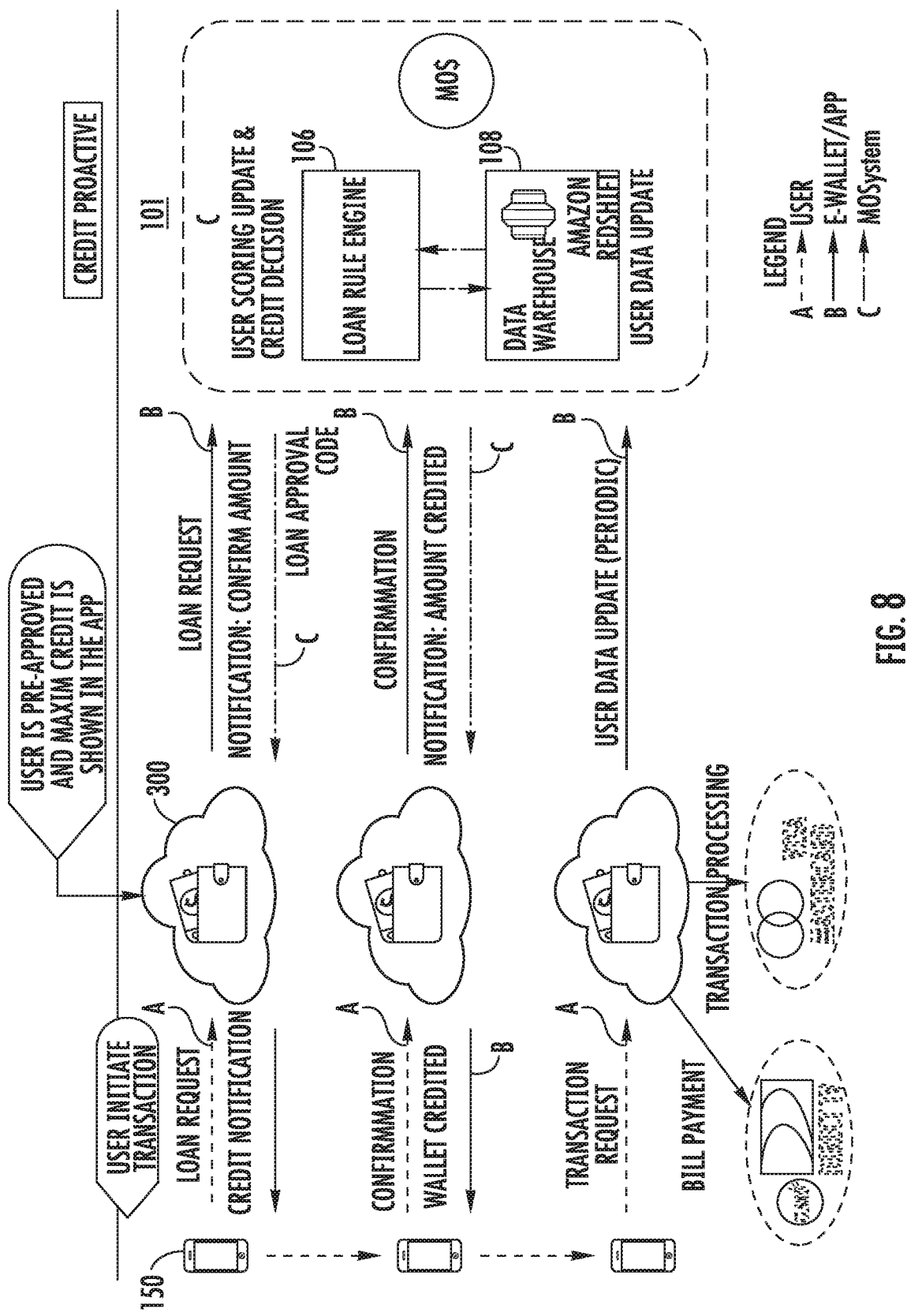
FIG. 8 is a flow sequence of confirming a loan request using the system of FIG. 1.

Referring now to FIG. 8, there is illustrated a flow sequence for a proactive credit with the various steps of a loan request and confirming the account in the credit notification followed by confirmation where the account is credited and notified and the e-wallet credited. The transaction request is made with the user data update that is periodic and the bill payment with the transaction processing. This accomplished with the user interaction with the loan rule engine 106 and data warehouse 108 of the MO system 100. In this process, the server 101 may generate and transmit to the mobile wireless communications device a loan approval code as part of the approval, which initiates the API on the consumer device to allow the consumer to confirm or enter a total amount to be loaned and even how it can be dispersed. Other variations may occur.

Referring now to FIG. 9, the flow sequence is shown for the reactive credit with the various steps and notifications and in FIG. 10, the flow sequence is shown for the corporate credit as a guaranteed amount.

Referring now to FIG. 11, there is illustrated a collection as in a complete repayment and in FIG. 12, the collection is shown as a partial repayment with the sequence of flow.

Referring again to FIG. 8, there are details shown of the proactive credit where the user at their device 150 initiates a transaction for a loan request and the user is pre-approved and a maximum credit is shown in the application API such as on the mobile device the user is using. The MO system 101 confirms the amount with a notification and the user confirms and the amount is credited and the wallet credited. Also with the transaction request, the user data is updated periodically and data stored in the data warehouse with the user data updated. Transaction processing may occur via a credit card processor such as the example MasterCard or VISA or a bill payment made such as to a cable company or Direct TV as in the illustrated non-limiting example. The loan approval code could be as simple as the notification to confirm the loan request so that the user API may confirm to allow the e-wallet to be credited.

Referring now to FIG. 9, the reactive credit process is shown where the MO system 101 initiates a transaction with a notification for pre-approved credit to pay a bill with a notification to the user's mobile phone in this example. The credit is confirmed and the paid bill notification made with the transaction processing in the user data update that occurs periodically.

In a corporate guaranteed credit shown in FIG. 10, the notification is made for the pre-approved credit that is confirmed and the credit account notification is made with the e-wallet credited and followed with the transaction request in the user data update that is periodic.

A complete repayment for collection is shown in FIG. 11 where a notification is made to raise the loan amount and that includes interest and the funds are taken from the user account and credited to the MO system 101. The notification is made that credit is increased and the notification then made to the device and the application that the credit is paid and credit increased. User data is updated periodically.

A partial repayment is shown for collections in FIG. 12 and a similar notification indicates that the loan amount is raised, but a notification is made from the application that the user has no funds on account and the notification is made that the new balance is due with the daily increase for interest. This triggers when the users make a cash-in and immediately funds are paid to the MO system until full loan and interest are repaid. The user then makes a cash-in via the application and funds are taken from the user account and credited to the MO account. The application makes a notification that the credit is paid partially and at this time, the process is repeated until the full loan is repaid. The user may make a cash-in and the funds are taken from the user account and credited to the MO system account and then the notifications are made that the credit is paid in full. That user data storing and update occurs. In all these examples, a loan approval code can be generated to initiate an API or other function and allow further entering of data such as a value of a loan or confirmation.

Figure 13:
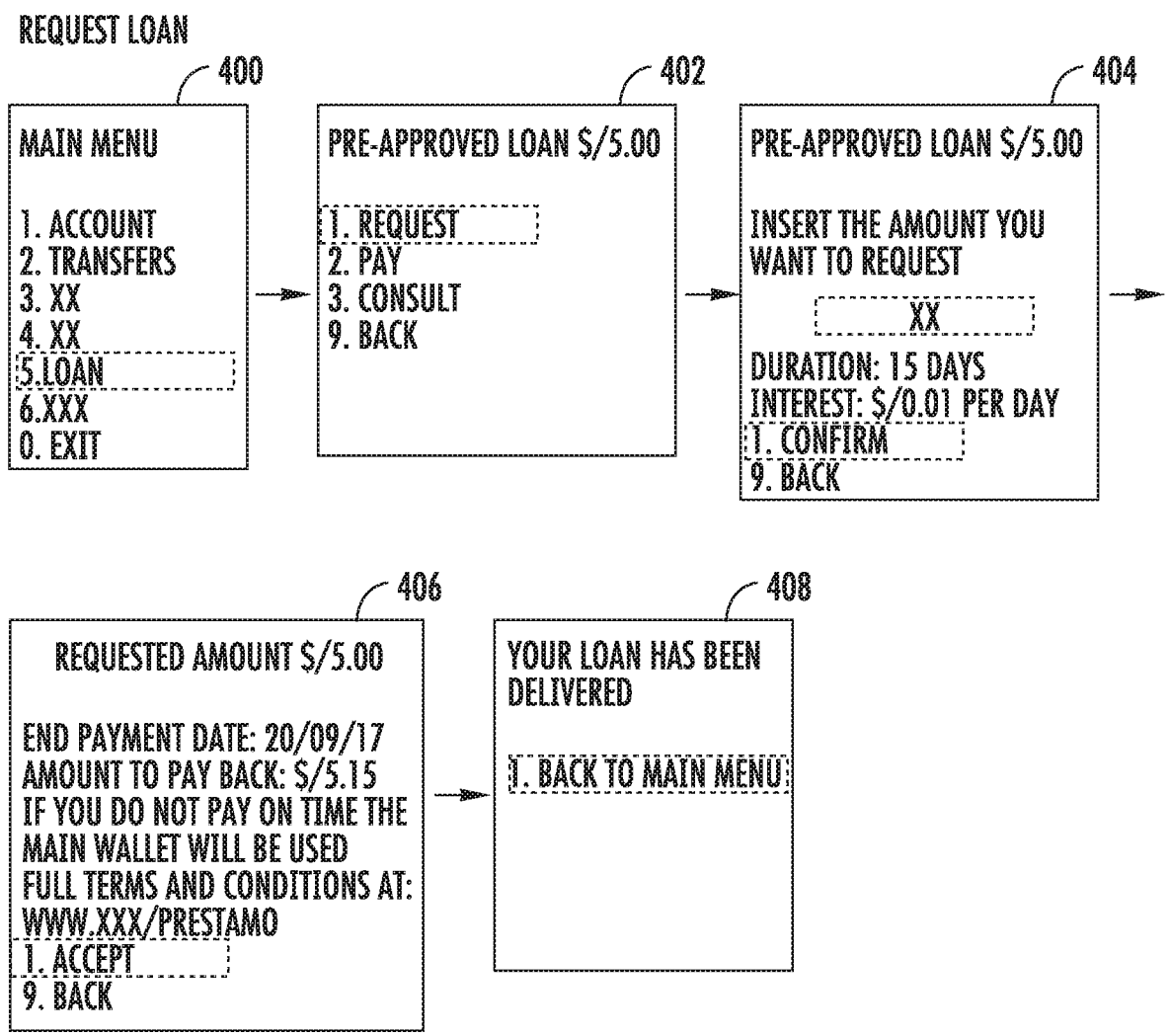
FIG. 13 are example wire frames of a USSD menu for requesting a loan.
Figure 14:
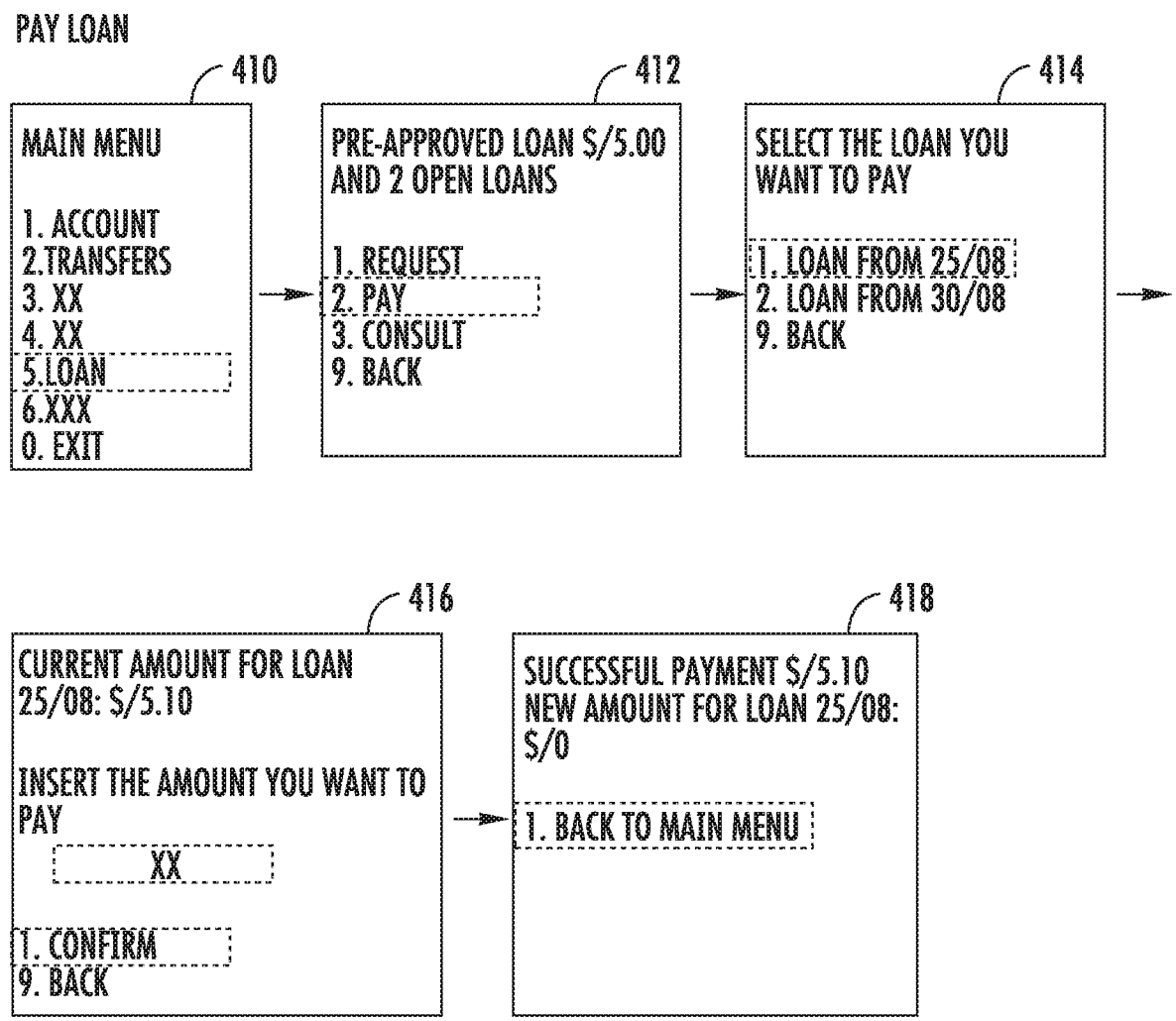
FIG. 14 are example wire frames of a USSD menu for paying a loan.

Referring now to FIGS. 13-15, there are shown wire frames as potential screen shots for the USSD menu that can be used on a mobile device, including a GSM phone. Messages sent over USSD are not defined by a standardization body and thus the MO system 101 and its network operator can implement the menu that is most suitable as illustrated.

As shown in FIG. 13, the wire frames indicate the user requesting a loan and showing the main menu and the selected loan (Block 400). The pre-approved loan is requested (Block 402) followed by the pre-approved loan with the amount that can be entered for the request (Block 404). The user may accept (Block 406) and the loan delivered (Block 408) with an indication for the main menu. The wire frames for paying a loan are shown at FIG. 14 with the loan amount shown in the main menu (Block 410) and the pre-approved loan for the payment (Block 412) followed by showing the loan selected to pay and its date (Block 414), the current amount of the loan (Block 416), and where information may be inserted and confirmed followed by successful payment (Block 418).

The wire frames for consulting a loan using the USSD menu as an example are shown in FIG. 15. The main menu is shown with the loan selected (Block 420) and the consulting for the pre-approved loan (Block 422). The menu is used for selecting the loan the user wants to consult with an open loan (Block 424). The user selects the loan to consult with the specific date (Block 426), followed by the current amount for the loan for that date and the particulars such as the end payment date (Block 428), and showing the selection for past payments with the past payments shown (Block 430).

Referring now to FIGS. 16-25, there are illustrated the wire frames as potential screen shots for an application menu that can be used on many conventional mobile devices. It should be understood that what appears to be large dollar amounts may correspond to monetary denominations of only a few dollars since the examples could be in a foreign currency where very large numbers correspond in conversion to only a few U.S. dollars, and thus, indicating nano and micro-loans. For example, FIG. 16 shows a request for a pre-approved loan with the pre-approved amount shown of $25,000 (Block 450) followed by a request for the loan (Block 452) and the amounts that can be entered such as $1,000 and an amount repaid in 30 days, with an accepting of terms and conditions (Block 452). A notification is made that the loan has been delivered (Block 454). If the loans are paid back on time, the pre-approved amount will keep growing. At this time, a contract may be sent and more details about the loan at the email addressed of the user. At Block 452, the terms and conditions would be accepted that explain the contract and other terms and conditions.

Figure 17:
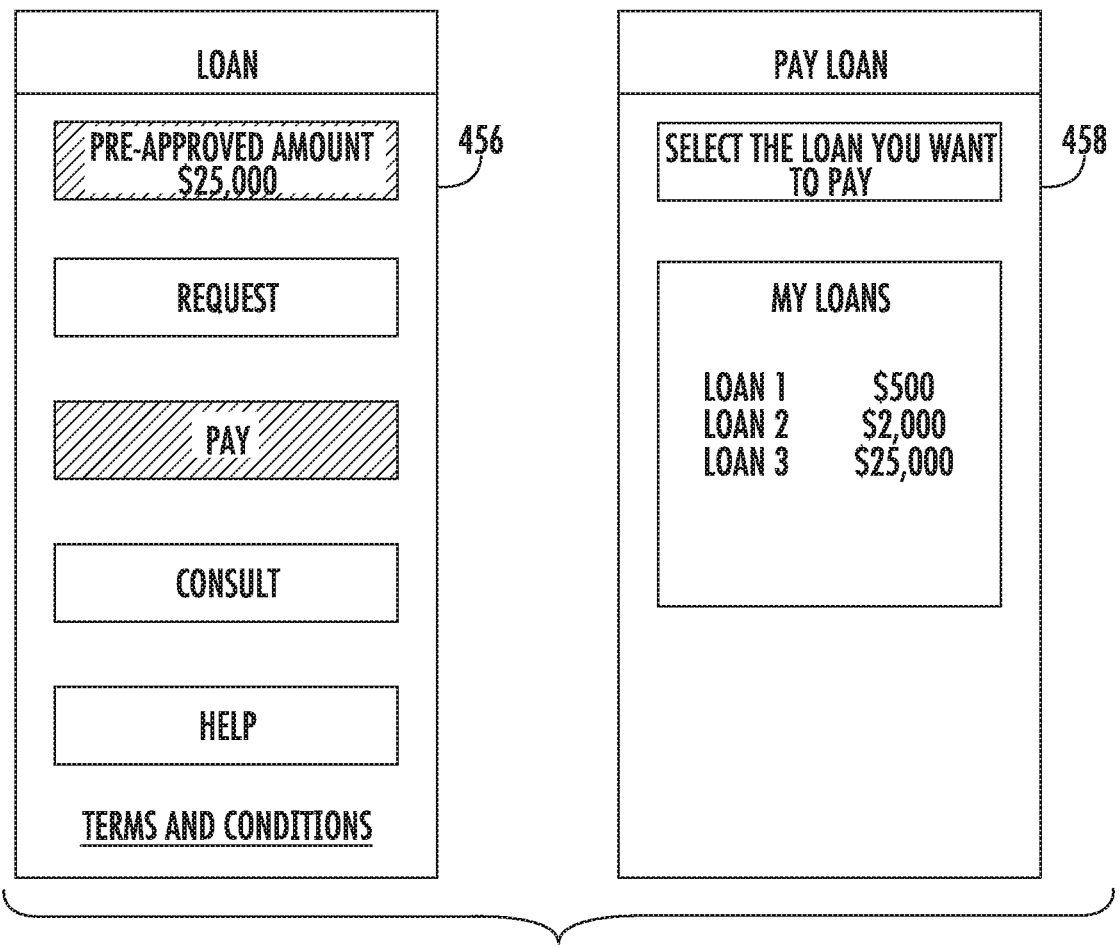
FIG. 17 are example wire frames of the application menu of FIG. 16 for paying a loan.
Figure 18:
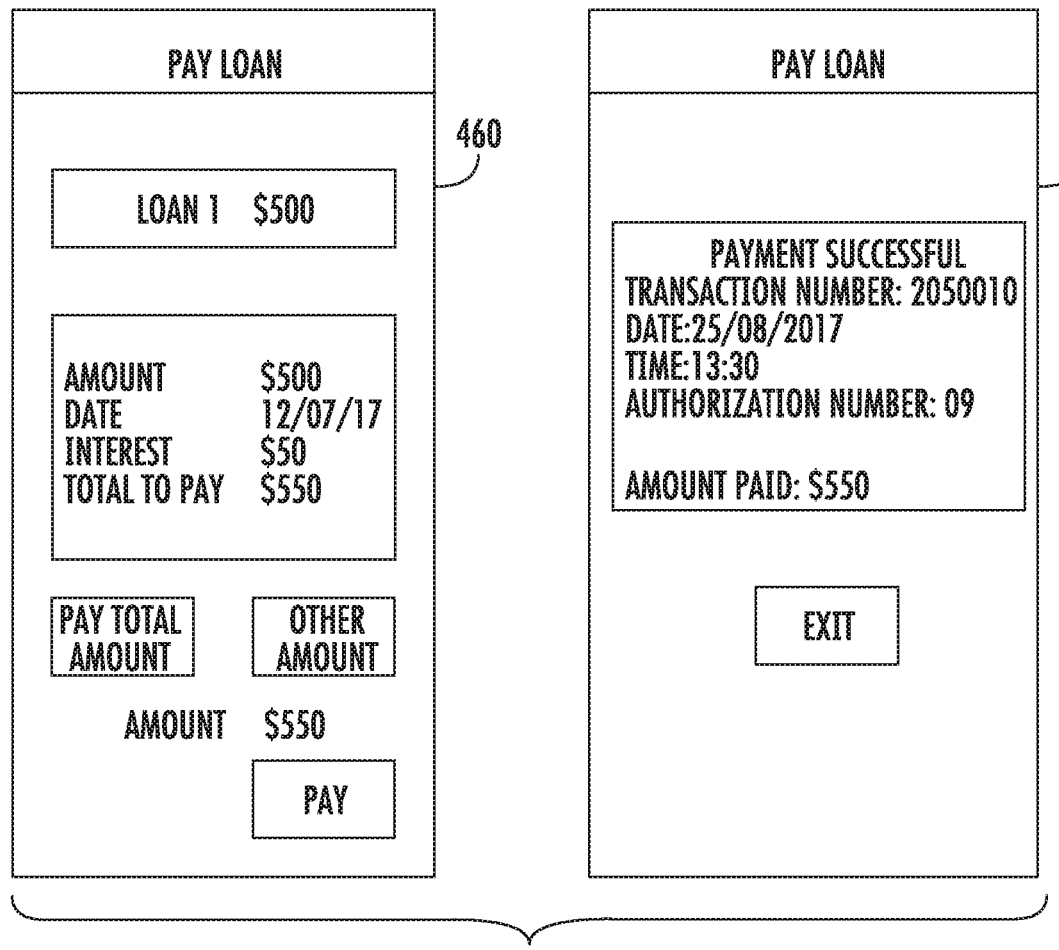
FIG. 18 are example wire frames of the application menu for paying a loan.

Referring now to FIGS. 17 and 18, the wire frames as potential screen shots are shown as paying the loan with the payment entry (Block 456) followed by the different loans shown as "my loans" with three different illustrated loans shown (Block 458). Loan 1 is shown (Block 460) in FIG. 18 with the amount, date, and the interest and the total to pay. Values can be entered for the amount to be paid with the successful payment (Block 462) shown and having a transaction number, date, time, and authorization number and reflecting the amount of the loan that has been paid.

Figure 19:
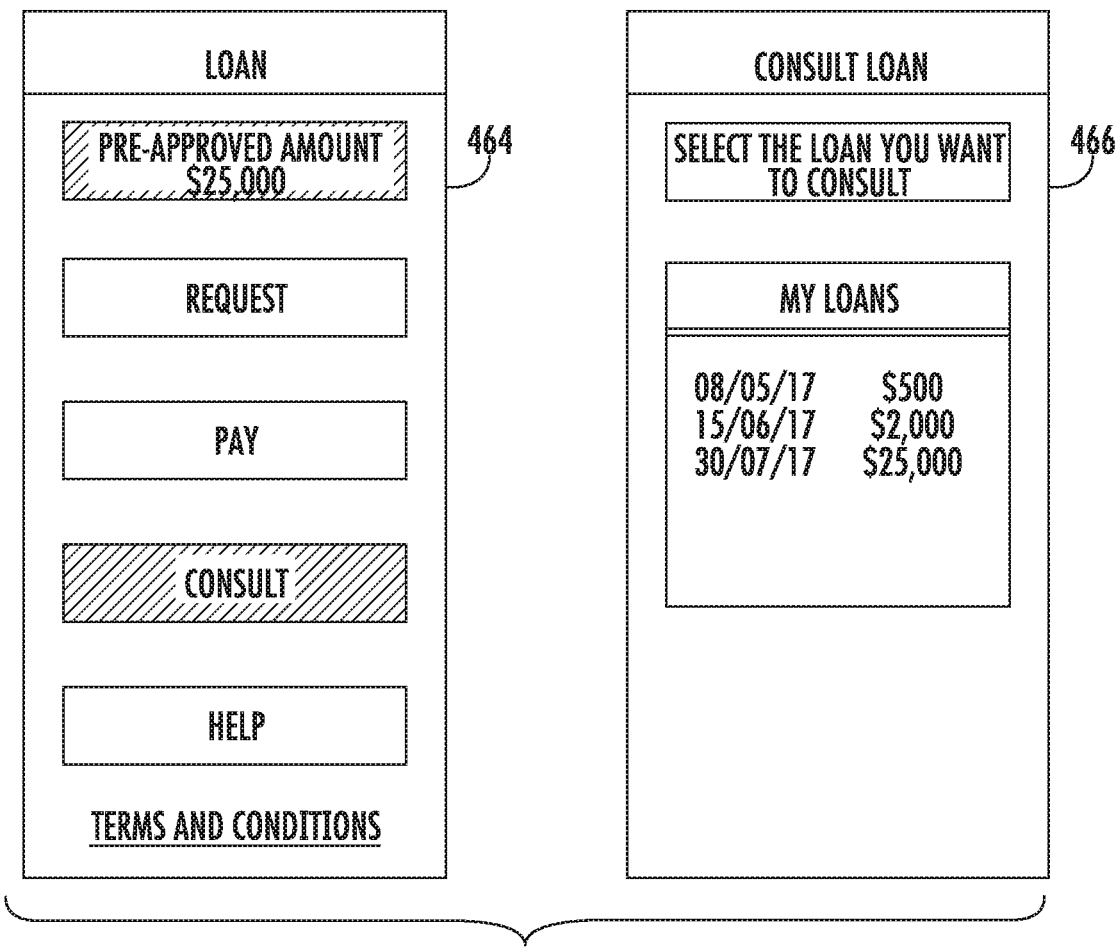
FIG. 19 are example wire frames of the application menu for consulting a loan.
Figure 20:
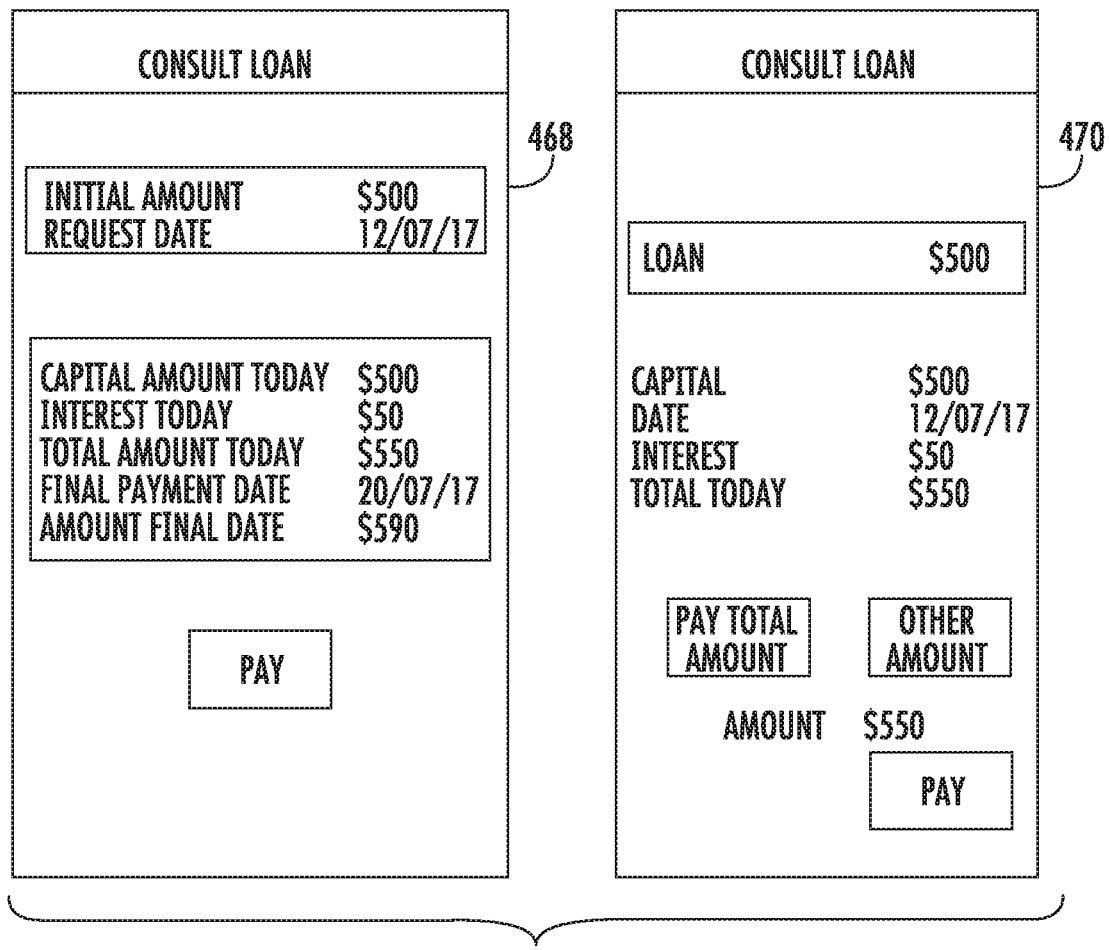
FIG. 20 are example wire frames of the application menu for consulting a loan.
Figure 21:
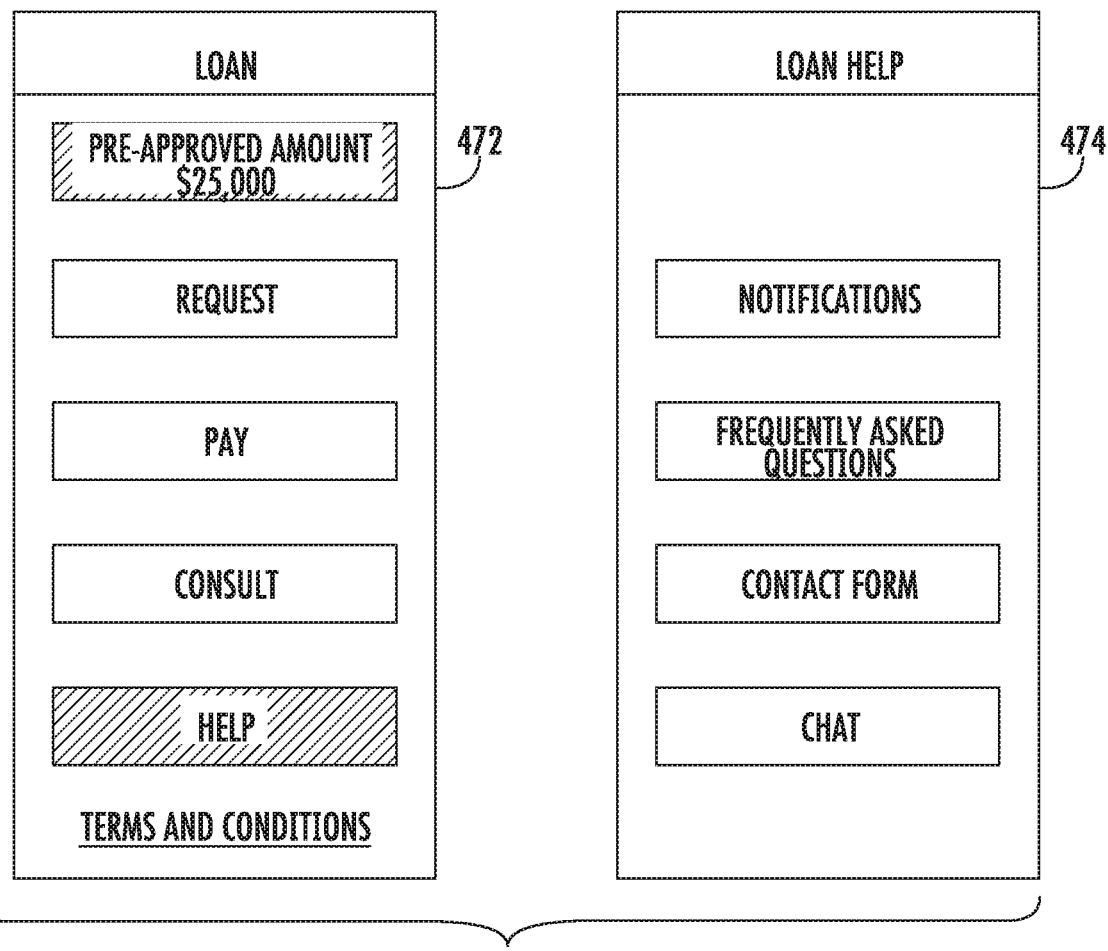
FIG. 21 are example wire frames of the application menu for obtaining help.

Referring now to FIGS. 19 and 20, there are shown example wire frames for consulting a loan with the consulting block chosen for the pre-approved amount (Block 464) followed by the loan to be consulted and showing the different loans as "my loans" (Block 466) and reflecting the initial amount and showing the capital amount, interest today, total amount today, and final payment date with the amount of the final date and a pay selection (Block 468). This may be followed by the loan and whether the total amount is paid or another amount in the selection should be made for paying (Block 470).

Figure 22:
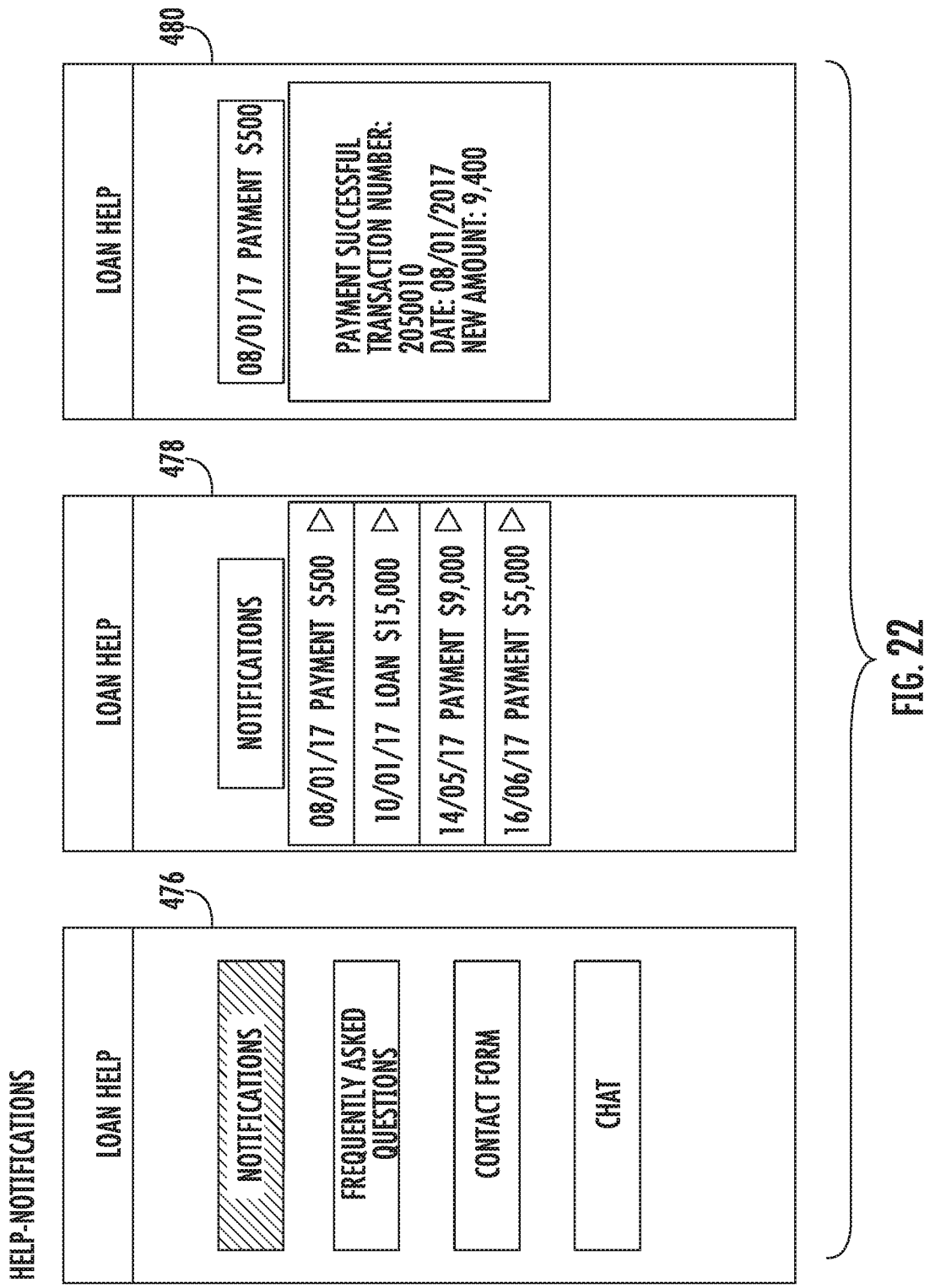
FIG. 22 are example wire frames of the application menu for notifications in a help menu.
Figure 23:
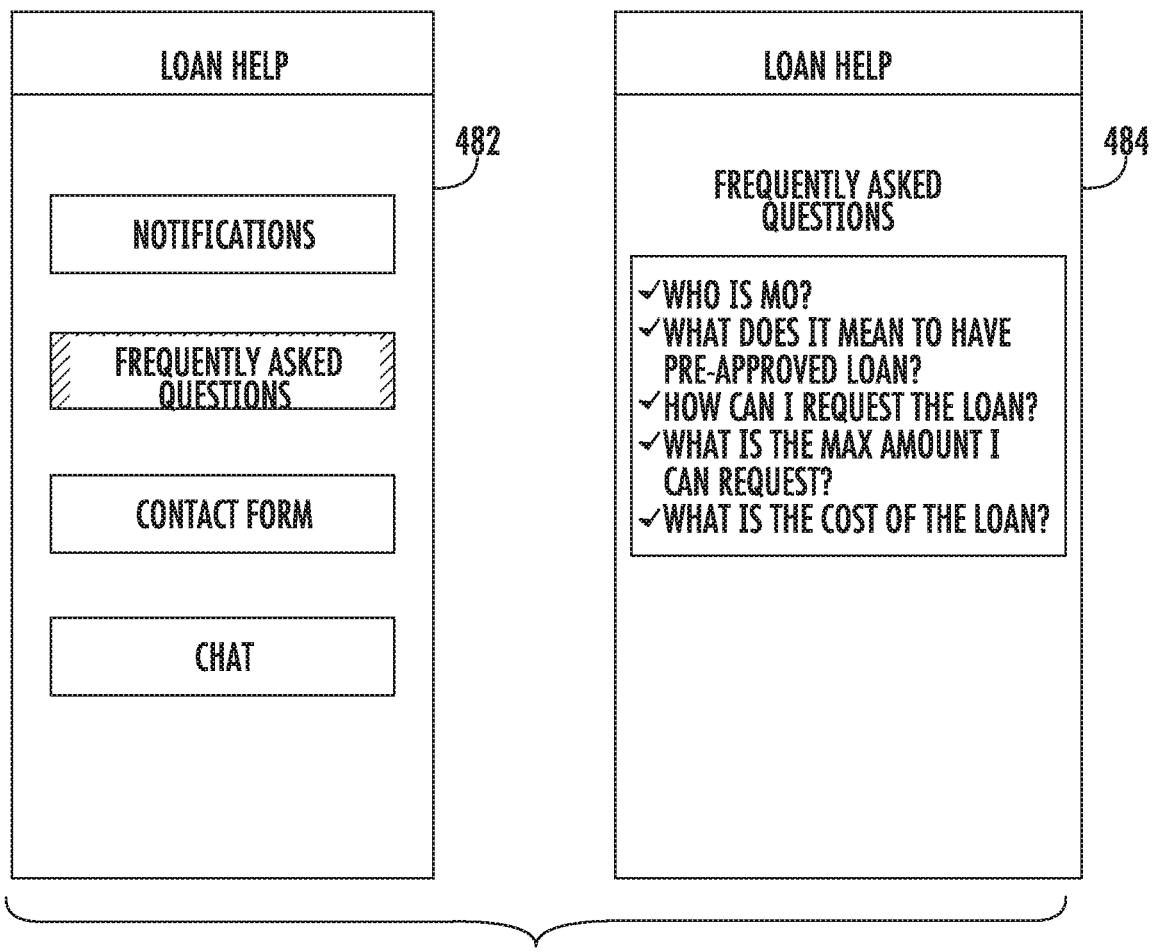
FIG. 23 are example wire frames of the application menu for frequently asked questions.
Figure 24:
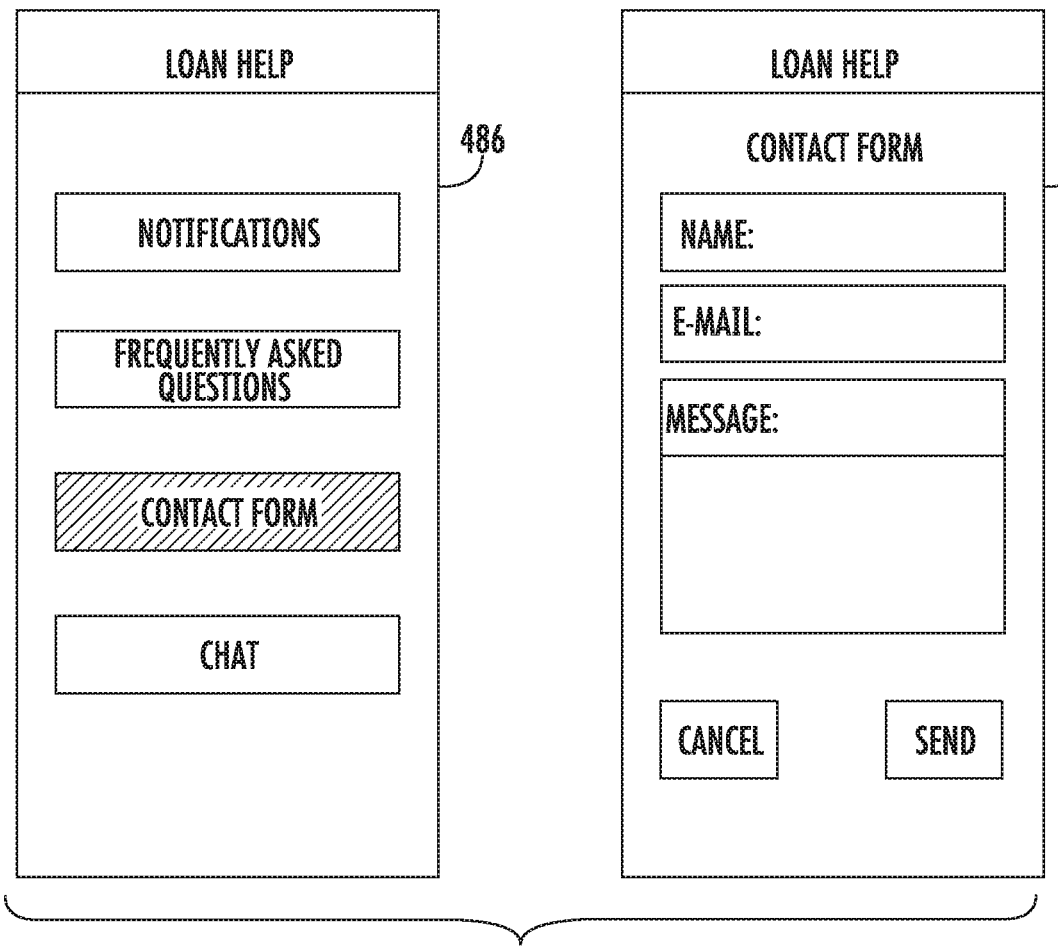
FIG. 24 are example wire frames of the application menu for a contact form.
Figure 25:
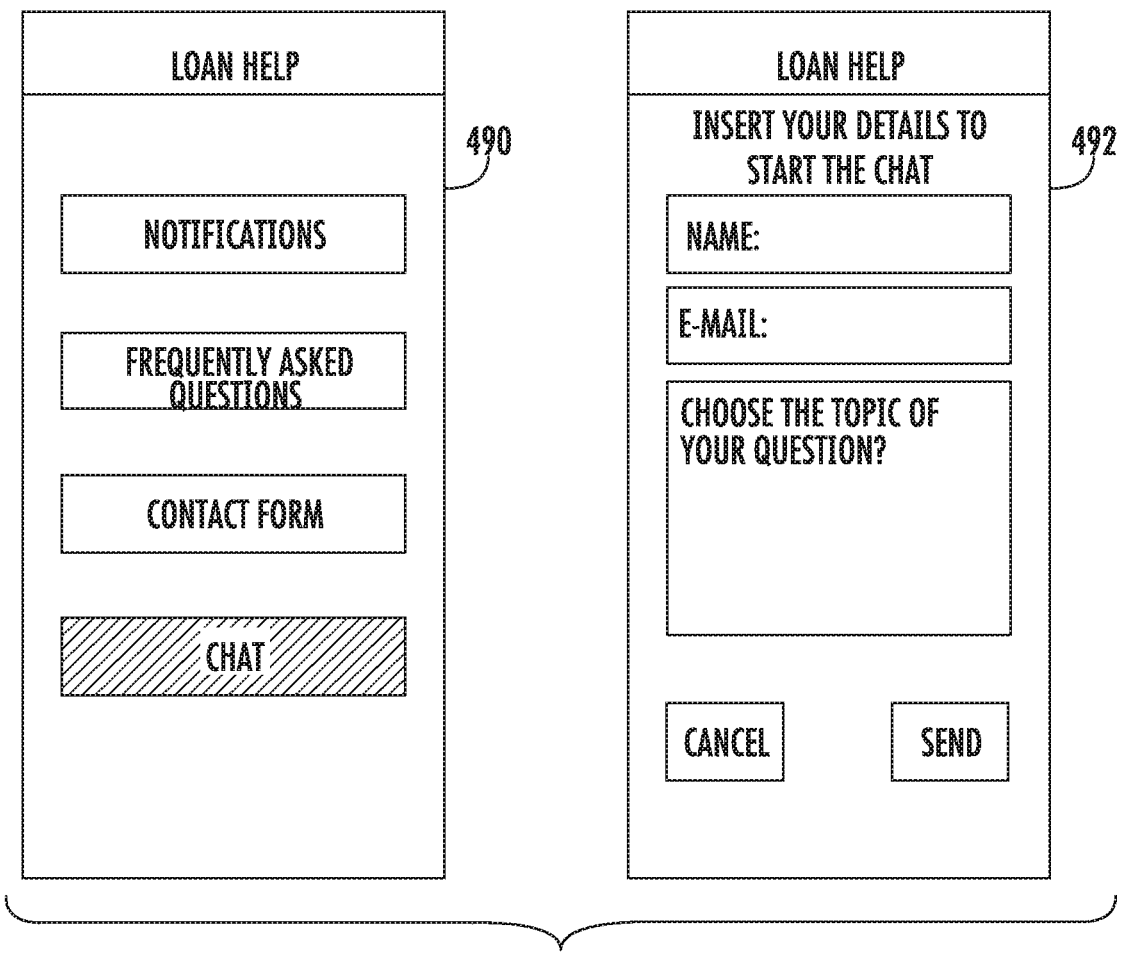
FIG. 25 are example wire frames of the application menu for a chat session.

Referring now to FIGS. 21-25, different wire frames for a help menu are illustrated with an initial menu (Block 472) followed by the loan help after the help button is selected (Block 472) and showing different notifications, frequently asked questions, a contact form and chat selections that a user can touch or select (Block 474). Different notifications are shown in FIG. 22 with an initial notification block selected (Block 476) and showing the different notifications for the different payments and loans (Block 478) and details about the first payment and its information and data (Block 480). Frequently asked questions are shown in FIG. 23 with the block selected (Block 482) and a selection of questions that can be selected (Block 484). The contact form is shown (Block 486) in FIG. 24 with the menu for contacting the MO system and its network administrator (Block 488). It is possible to chat with the network administrator by selecting the appropriate chat button in the help menu (Block 490) followed with information for chatting that can be entered by the user (Block 492).

Figure 26:
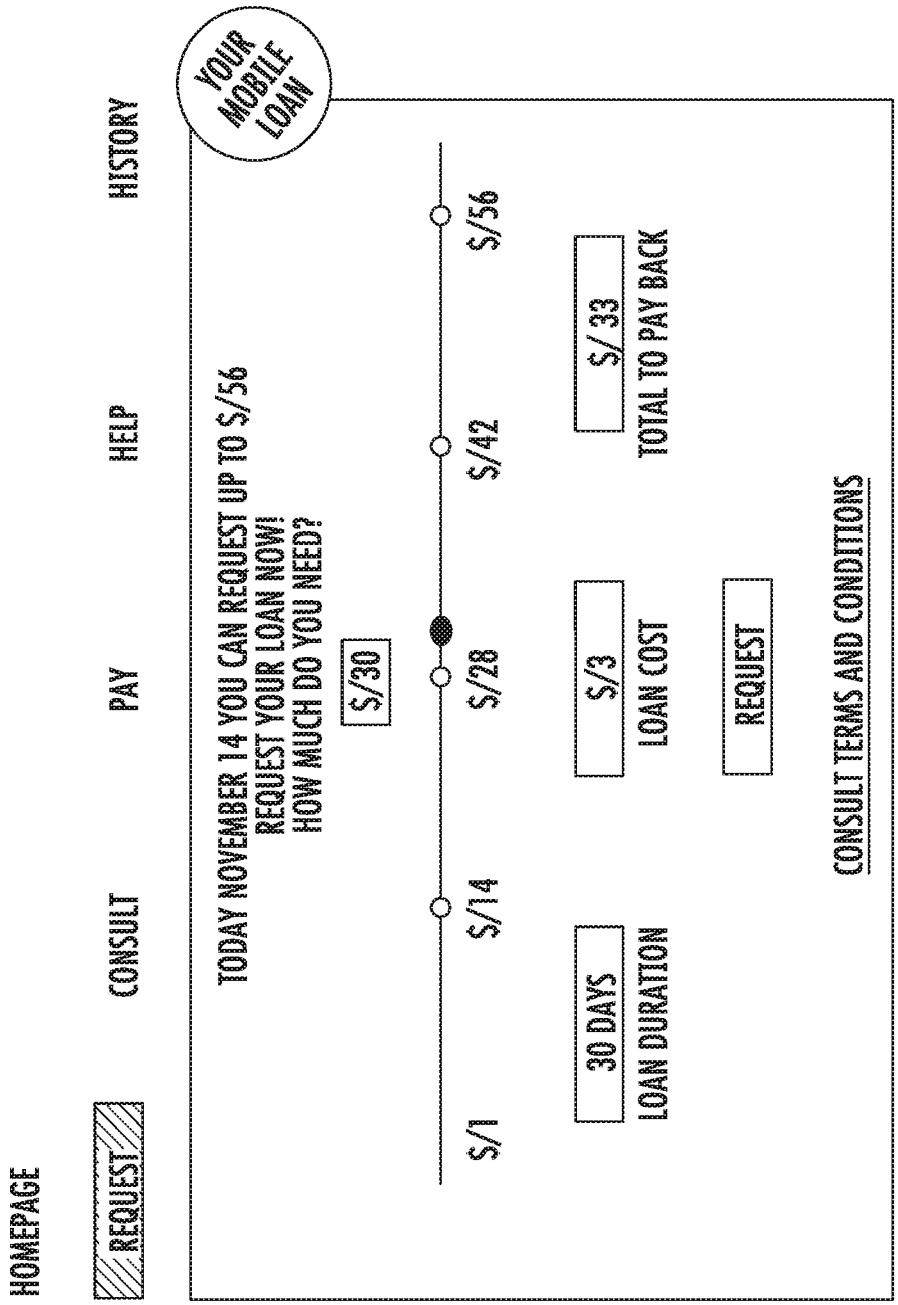
FIG. 26 is an example wire frame of the home page of a web portal using the loan issuance system of FIG. 1.
Figure 27:
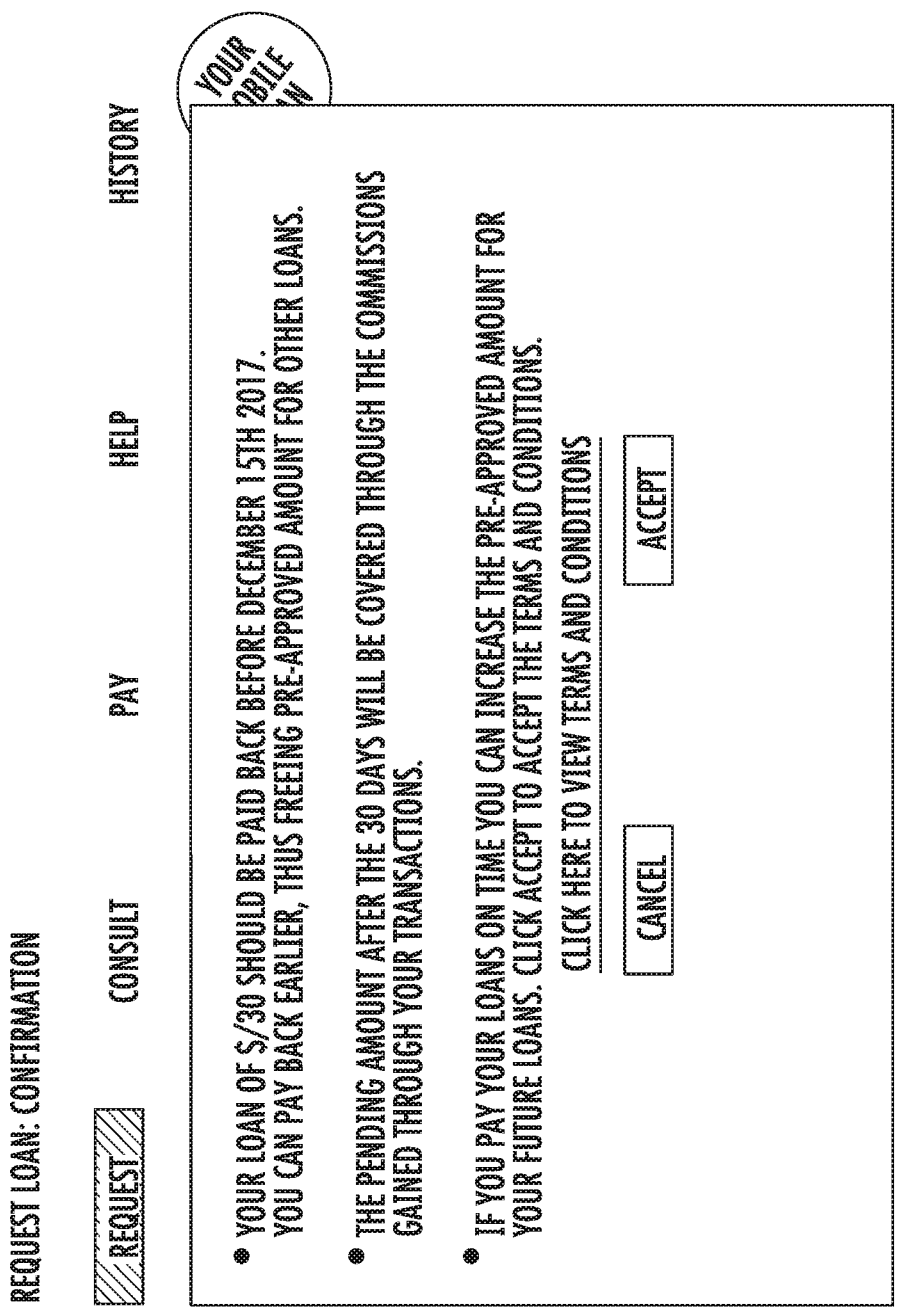
FIG. 27 is an example wire frame of the web portal for confirming a loan request.

Referring now FIGS. 26-39, there are illustrated wire frames for the potential screen shots for a web portal application such as for use on a personal computer via a conventional internet connection to the MO server operative as the MO system 101. Referring now to FIG. 26, there is shown an example home page with information regarding requesting a loan, how much is required, and the loan duration, cost and total to pay back and the request made. The confirmation of the loan request and information about pay back, information about late payments, and a requirement to accept the terms and conditions of potential increasing a pre-approved amount based on timely repayment is shown in FIG. 27.

Figure 28:
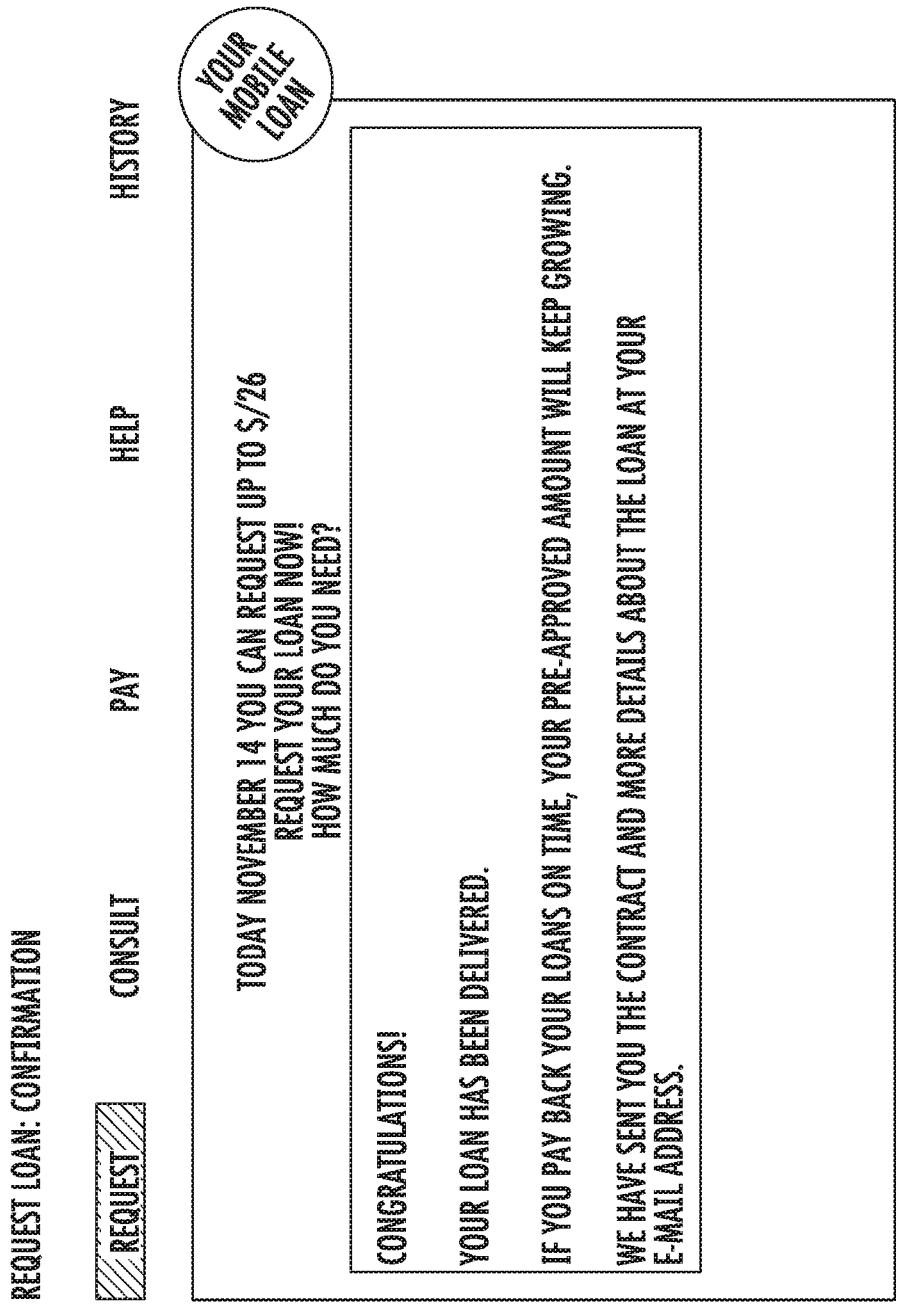
FIG. 28 is a further example wire frame of the web portal for confirming a loan request.
Figure 32:
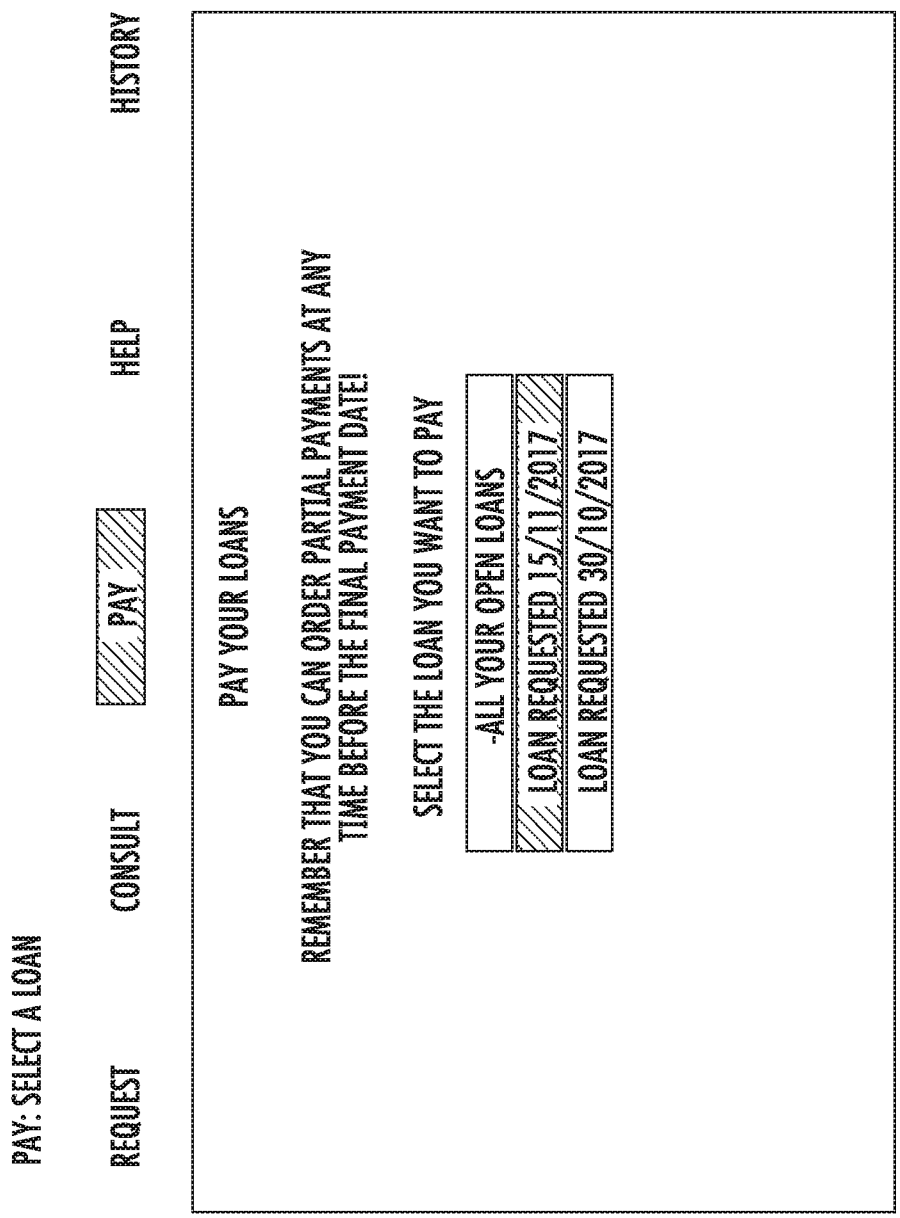
FIG. 32 is an example wire frame of the web portal for paying a selected loan.
Figure 33:
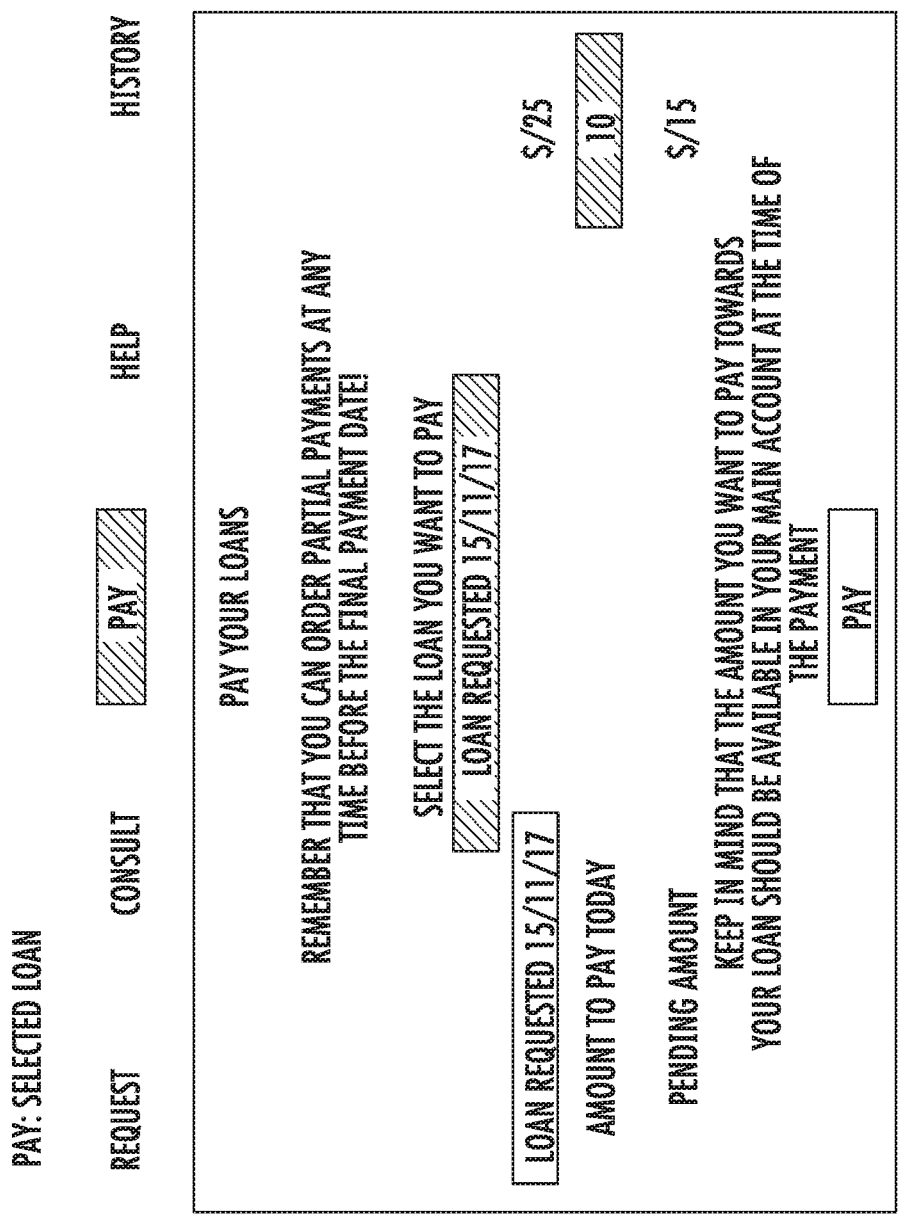
FIG. 33 is an example wire frame of the web portal for paying a selected loan.
Figure 34:
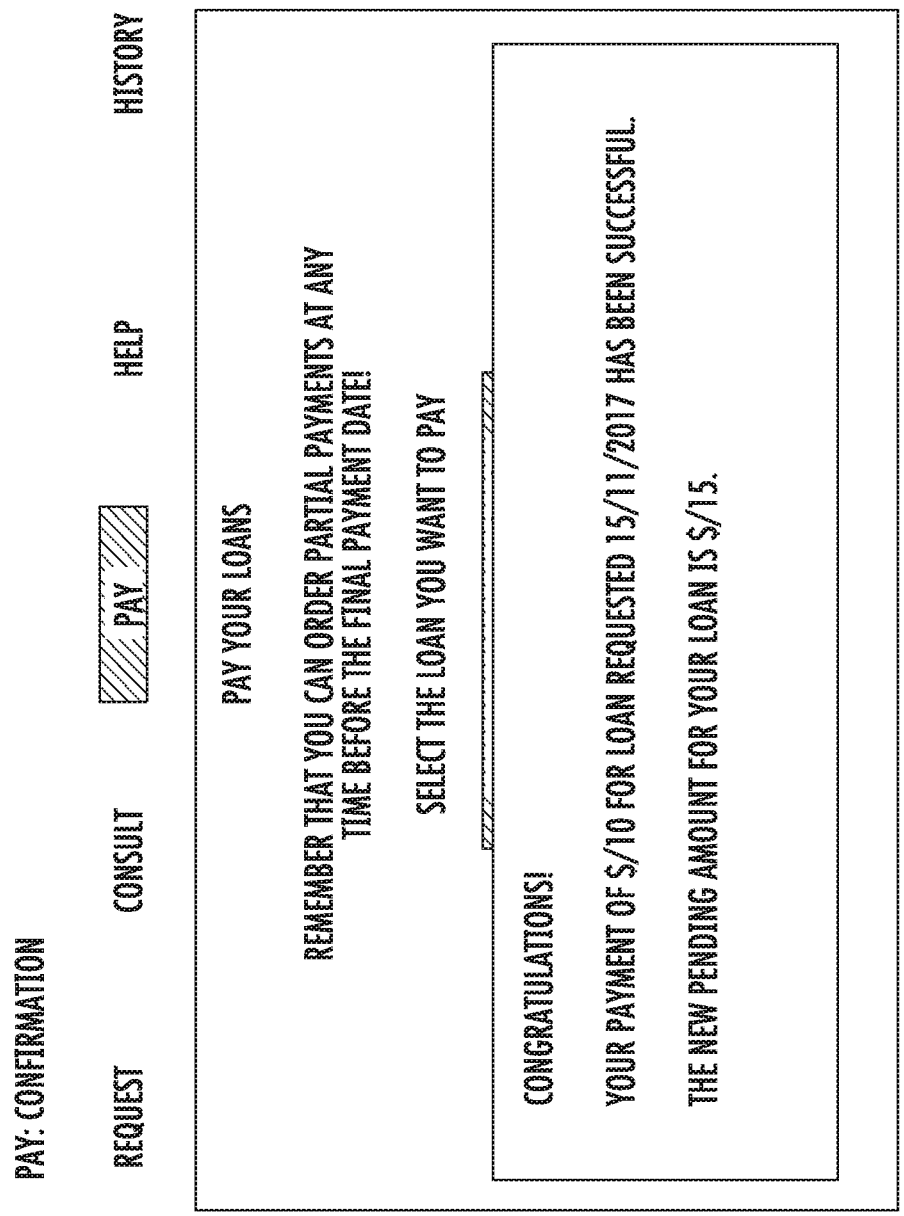
FIG. 34 is an example wire frame of the web portal for confirming the payment.
Figure 35:
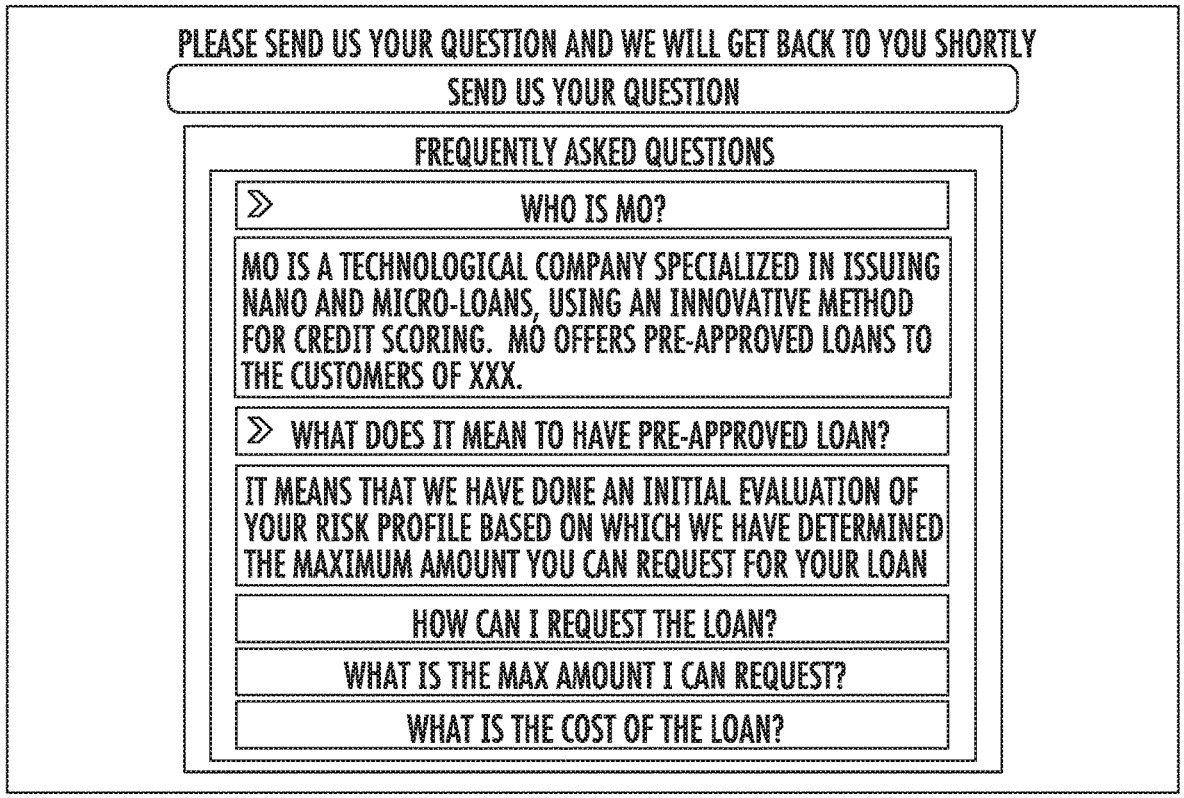
FIG. 35 is an example wire frame of the web portal for a help menu.
Figure 37:
FIG. 37 is an example wire frame of the web portal for showing a history menu.
Figure 39:
FIG. 39 is an example wire frame of the web portal for the history menu and requesting a certificate.

Confirmation is shown in FIG. 28 with the information about delivering the loan such as to an e-wallet with information about the contract and details of the loan. A wire frame for consulting all loans is shown in FIG. 29 with a wire frame for selecting a loan to consult shown in FIG. 30 and a status of open loans shown at FIG. 31 with information as to the date, payment, new pending amount, final payment date, and other data. The loan selection is shown with possible partial payments that are indicated at FIG. 32 and the loan selected to pay in an amount at FIG. 33 and with a confirmation of payment in FIG. 34. The help menu is shown at FIG. 35 with frequently asked questions and answers to what is the MO system by indicating nano and micro-loans. The help menu shown at FIG. 36 and the closed loans shown at FIG. 37. The loan to consult is shown at FIG. 38 and showing the request for a closed loan certificate as part of the history for the closed loan that will be sent to the email addressed on file and stored at the system shown at FIG. 39.

Figure 40:
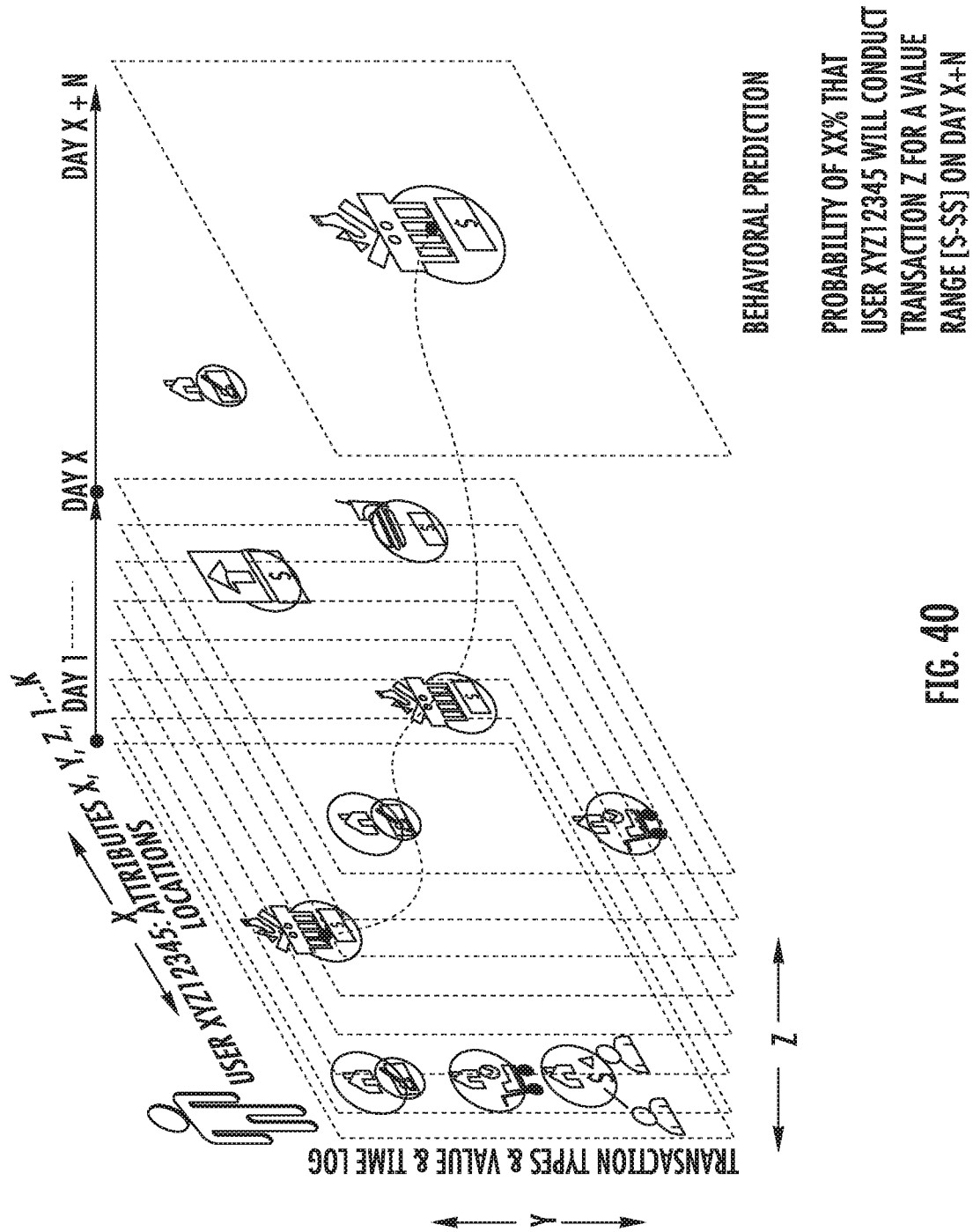
FIG. 40 is a fragmentary time graph for the behavioral prediction of a consumer using the loan issuance system of FIG. 1.

Referring now to FIG. 40, there is illustrated a time graph of behavioral prediction in accordance with a non-limiting example in which the system may generate a behavioral profile for the user based on the user check-ins to the e-wallet or transaction program that communicates with the MO system 101, server or processor having the rule engine. Based on the user location, the MO system 101 correlates the periodic location patterns to loan and transactional activities. The MO system 101 will match user location check-ins against, as an example, a known-locations database that includes data regarding stores, private locations, public places and other data, including transaction data, and correlate periodic location patterns to loan and transactional activities. Thus, the user profile and periodicity may be predicted for loan disbursement patterns, use of loans, loan repayments, and transaction activities.

In this three-dimensional time graph, the different attributes, including locations for a specific user, are shown along the X axis and the log of the transaction types and value and time are shown along the Y axis. Each day indicates the activities of the user along the Z axis so that known attributes, locations, transaction types, value and time are shown for each day up to day X. Thus each day would have certain types of transactions and the value of that particular transaction based on a store location with the user having basic attributes. These are correlated together.

Thus, it is possible to know the probability of a certain percentage that user XYZ12345 will conduct transaction Z for a monetary value range [$ to $$] on day X+N as shown in FIG. 40. Each day may include the user XYZ12345 visiting one or more specific stores, each at a specific location and conducting a specific transaction that is kept track of by the MO system. Based upon this information, it is possible to establish a behavioral prediction for the consumer as to a certain day and what type of transaction may occur at a possible store in a specific dollar range. Although this is only a probability of a certain percentage, the system allows this type of data and behavioral prediction to be used for each consumer, and thus, prediction patterns may be made for an individual consumer, sub-unit, or a large number of the consumers. This data could be provided to merchants and/or other large data vendors. Naturally, the consumer identity would be kept confidential as well as identifiers of mobile communication devices.

For example, the initial user profile generation and maximum credit determination as Phase I explained above permits the system to match the user attribute string to the user's database and apply the maximum credit for the user. The new user is recorded in the MO system data warehouse 108 and different attributes are profiled for a user such as the different loan activities. A record is kept of the transactional data from the e-wallet or transactional application via the API, which is imported once every few hours. The external data that is imported by a variety of public domain sources may be updated also and correlated to the different users.

Different transactional data may be recorded each day, such as each time the user uses the e-wallet or transactional application, such as the cash-in transactions with the type of cash-in, the location of the cash-in relative to a particular store, and the date and time. Cash-out transactions may also be kept as well as bill payment transactions, and more particularly, the purchase transactions with the amounts, type of purchase, location of purchase and the date and time. This is correlated with the log-in activities and sales transactions, including any money transfer transactions.

It is possible to use different types of behavioral prediction models and algorithms as learning methods that help generate the behavioral profiles to predict user profile and periodicity of the loan disbursement patterns, use of loans, loan repayments, and transaction activities. For example, it is possible to use Customer Conversation Modeling (CCM) that takes advantage of the consumer behavior data such as the buying trends, purchasing history, and including even social media activity that may be available publicly. It is possible to use a multi-threaded analysis of the consumer behavioral patterns such as customer churn, risk or acquisition prediction, and traditional tools that may include batch calculation of linear regression or classification models. A customer conversation modeling may enable the system to predict customer behavior before it happens and can focus on multi-threaded behavior such as trend detection for setting changes in behavior are more important than sustained behavior patterns, recognition of cyclical patterns that take into account the time and location, and the depth/breath of the historical interaction with the consumer in a multi-threaded pattern with alignment algorithms that track events across channels and align them in time and find correlation between multi-channel behavior.

It is possible to use fuzzy clustering, principal component analysis and discriminate analysis. Some techniques may include sequential pattern mining and association rule mining. It is also possible to use a weight factor and utility for effectual mining of significant association rules and even make use of a traditional Apriori algorithm to generate a set of association rules from a database and exploit the anti-monotone property of the Apriori algorithm. For a K-item set to be frequent, all (K−1) subsets of the item set may have to be frequent and a set of association rules may be mined and subjected to weight age (W-gain) and utility (U-gain) constraints. For every association rule that is mined, a combined utility weight score may be computed.

It is possible to use decision trees and other data mining techniques. Decision trees may split a large set of data into smaller classes and analyze where each level of the tree corresponds to a decision. The nodes and leaves may consist of a class of data that are similar to some target variables. There could be nominal (categorical and non-ordered), ordinal (categorical and ordered), and interval values (ordered values that can be averaged). The decision tree may have every leaf as a pure set and a tree may be split further until only pure sets are left as long as subsets do not become too small and give inaccurate results because of idiosyncrasies. One possible algorithm may be the ID3 or Iterative Dichotomiser 3 as a decision tree constructing algorithm that uses Entropy as a measure of how certain one can be that an element of a set is a certain type.

It is also possible to use different analytical techniques such as A/B/multivariate testing, visitor engagement and behavior targeting. Different advanced analytics may be applied such as customer segmentation that groups customers statistically together based on similar characteristics to help identify smaller and yet similar groups for targeted marketing opportunities. Basket segmentation would allow customer information to be provided through the contents of each transaction, while affinity and purchase path analysis would identify products that sell in conjunction with each other depending on promotional or seasonal basis and links between purchases over time. A marketing mix modeling would provide some response models from customer promotion campaigns and product propensity models and attrition models that predict customer behavior.

Other logistic regression and neural networks that include random force may use vector-based models that operate on feature vectors of fixed length as an input. The consumer histories are converted into a fixed set of features that may be crafted by domain experts and reflect indicators with a reliable set of features for prediction accuracy. Different iterations of empirical experiments may be used.

One possible technique would use recurrent neural networks (RNNs) to overcome vector-based methods that can be applied to a series of captured consumer actions and data that maintain a latent state that is updated with each action. One drawback of the vector-based machine learning similar to logistic regression is the requirement for domain knowledge and data-sign intuition and may include a necessary pre-processing that creates binary input vectors from original input data.

Signals that are encoded in the feature vector are picked up by the prediction model.

In contrast to vector-based methods, recurrent neural networks (RNNs) take sequences $X=(x_1, \ldots, x_T)$ of varying length T directly as inputs. RNNs may be built as connected sequences of computational cells. The cell at step t takes input $x_T$ and maintains a hidden state $h_t \in R^d$. This hidden state is computed from the input $x_T$ and the cell state at the previous time-step $h_{t-1}$ as $$h_t = \sigma(W_x x_t + W_h h_{t-1} + b),$$

where $W_x$ and $W_h$ are learned weight matrices, b is a learned bias vector and $\sigma$ is the sigmoid function. It is possible to use a hidden state $h_t$ that captures data from the input sequence $(x_1, \ldots, x_T)$ up to a current time-step t. It is possible to prepare over time the data from early inputs. The dimensionality d of the hidden state may be a hyperparameter that is chosen according to the complexity of the temporal dynamics of the scenario.

It is possible to use long short-term memory cells (LSTMs) that help preserve long-term dependencies and help maintain an additional cell state C for long-term memory. It would be possible to calculate any hidden and cell states ht and Ct using a cascade of gating operations:

$$ft = \sigma(Wf[ht-1, xt] + bf)$$

$$it = \sigma(Wi[ht-1, xt] + bi)$$

$$C't = \tan h(Wc[ht-1, xt] + bC)$$

$$Ct = ft \: Ct-1 + it \: C't$$

$$ot = \sigma(Wo[ht-1, xt] + bo)$$

$$ht = ot \tan h(Ct)$$

In this cascade, W and b may be learned weight matrices and bias vectors. The final hidden state hT may classify a sequence because hT may be input into a prediction network, which can be a simple linear layer or a sequence of non-linear layers.

There is a training period and the parameters W and b of the computational cells may be used to detect signals in the input sequences in order to help increase the prediction accuracy. Input sequences X are compressed by this process into suitable feature vectors hT. Often the compression process is viewed as feature learning from raw inputs and is the reason why work-intensive human feature engineering may not be required before applying the network. These models are complex and require a long processing time for the learning and predicting stages as compared to vector-based systems. Because there are more architectural choices and hyperparameters to tune, it may be more complex.

These are only non-limiting examples of a type of behavioral prediction analysis that may be accomplished using the system in accordance with a non-limiting example.

The system and method as described may also perform a bad debt analysis using the machine learning module as part of the MO server 101 shown in FIG. 1. Bad debt can increase significantly the revenue loss every year. By using predictive analytic methods, the system utilities can be improved by anticipating and avoiding bad debt losses. There may be key considerations the system 100 takes advantage of and the system includes methodology to predict and prevent bad debt. The system 100 uses a combination of analytical modeling in conjunction with machine learning techniques. The predictive model exploits patterns found in historical and transactional data of the clients as consumers to identify the risk of a client, i.e., consumer falling into bad debt. The model captures relationships among factors to allow assessment of bad debt risk or the potential of that consumer and associated with a particular set of conditions. This helps guide automatic decision-making in the system 100 so that the system determines when the consumer requires an increase in the maximum allowed credit and the risk involved with increasing the maximum allowed credit. Thresholds can be set of the model outcome.

The machine-learning model can construct and implement a bad debt forecast. The problem may be formulated as a supervised learning problem in which the system 100 has input variables as client transaction behavior and a label for each client is the fall into bad debt. The system 100 will process input data and find relationships and have the output data as the labels. Input data may be represented as a numerical vector such as relating to post consumer loan data and the output may be a probability between 0 and 1. This probability represents the probability that a client will fall into bad debt, for example, a value as a threshold greater than 0.6, which may be adjusted. There are various modeling steps including: (1) problem definition; (2) exploratory data analysis; (3) feature ranking; (4) model selection; and (5) model evaluation.

As to the problem definition, it is not always easy to derive a forecast of bad debts because it is difficult to anticipate the number of variables that impact the ability of a customer as a client or consumer to pay a debt. Typically, the approach is to train a model for each client and then identify an anomaly in credit variables related with default. This approach is very client centric, which makes this methodology difficult to apply to unknown clients or clients that do not have a history of many transactions. The system may use a generalized approach to determining the chance of a consumer falling into bad debt independent of the client and the system may explore transactional variables and generalize the patterns that anticipate a bad debt behavior. The system 100 may return a bad debt probability that is expected to be continued in order to be sensible to risk severity. This allows a follow-up of the client's risk and can lead to the use of client defined thresholds such as varying from 0.6 as an output threshold to make the system and method more flexible in time.

There are feature vectors that are analyzed. The system has an object to identify the statistically reliable relationships between input data features and a target variable using the machine-learning modeling. Different features may be used and these features may include transactional data from clients in time windows of six months as a non-limiting example and a target variable as a binary outcome that indicates whether a client is moving towards a bad debt region in the next seven days. The features may be extracted from a time series (client behavior measuring variables over time) and these values can help evaluate trends, seasonality or changes that can alert when a client is about to be in bad debt. The transactional variables may be measured over a time window of six months to smooth the input signal since a moving window technique that can be used has seven days of sampling. Based on the obtained smoothed time series, the system may extract the following statistics: mean, standard deviation, median, kurtosis, and skewness. Other variables may be added, including the ratios between time series and combination of different transactional variables.

Figure 41:
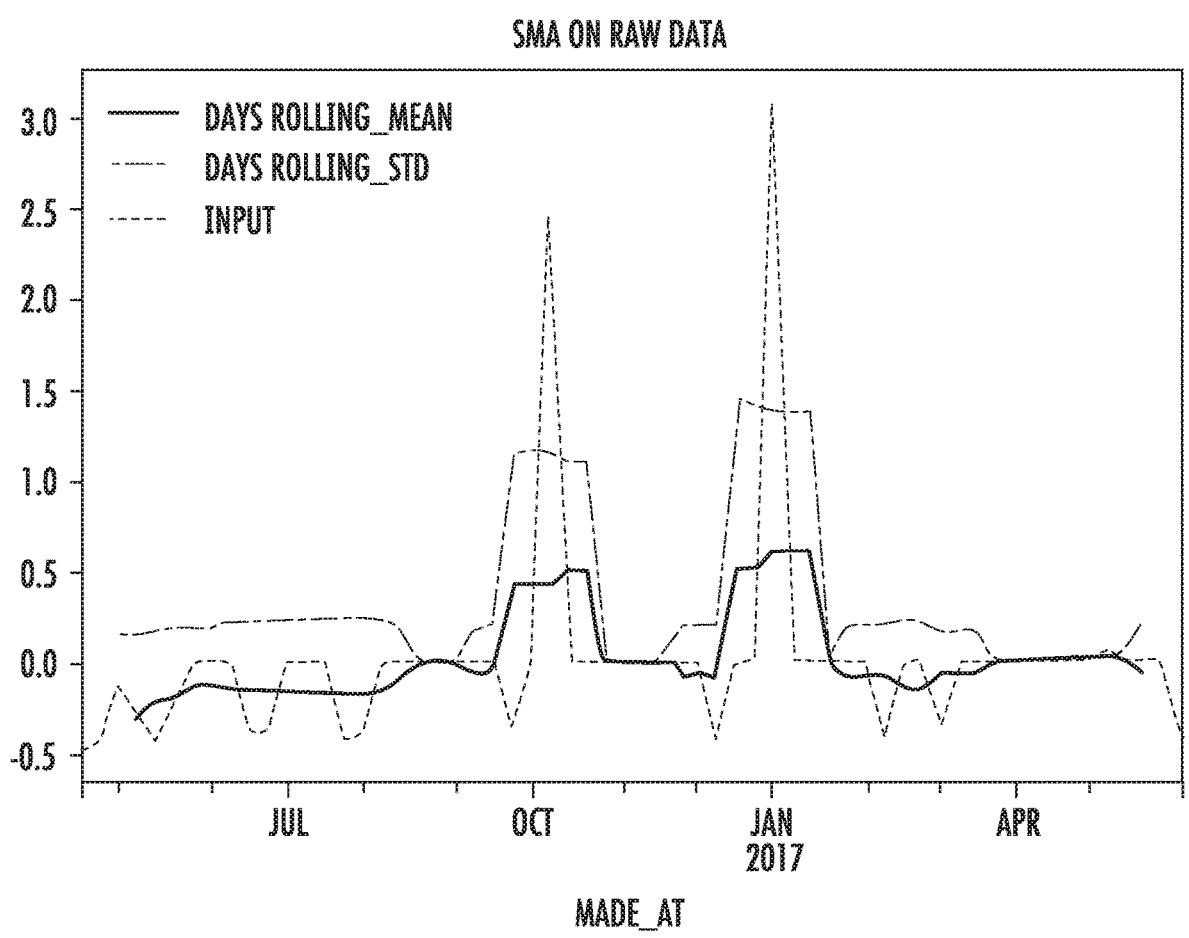
FIG. 41 is a graph showing a moving average for a time series for recharges made by a user.

FIG. 41 is an example of a time series and showing its moving average and moving standard deviation. Based on a hypothesis that the last points of the smoothed time series contains a historical component that resumes the whole time series, it is possible to use the 10 (ten) last points to create the input vector. There are two classes that a client can have based on bad debt risk: bad debt high probability clients (BAD) as a logical one (1) and good clients with low risk probability (GOOD) as a zero (0).

There are also modeling objectives. One objective is accuracy so that the bad debt prediction method has a good performance in both possible outputs and identifies bad debt clients and identifies good clients. There is also a continuous output objective that has a continuous output and this feature is important in order to follow-up the risk severity path of the client.

Figure 42:
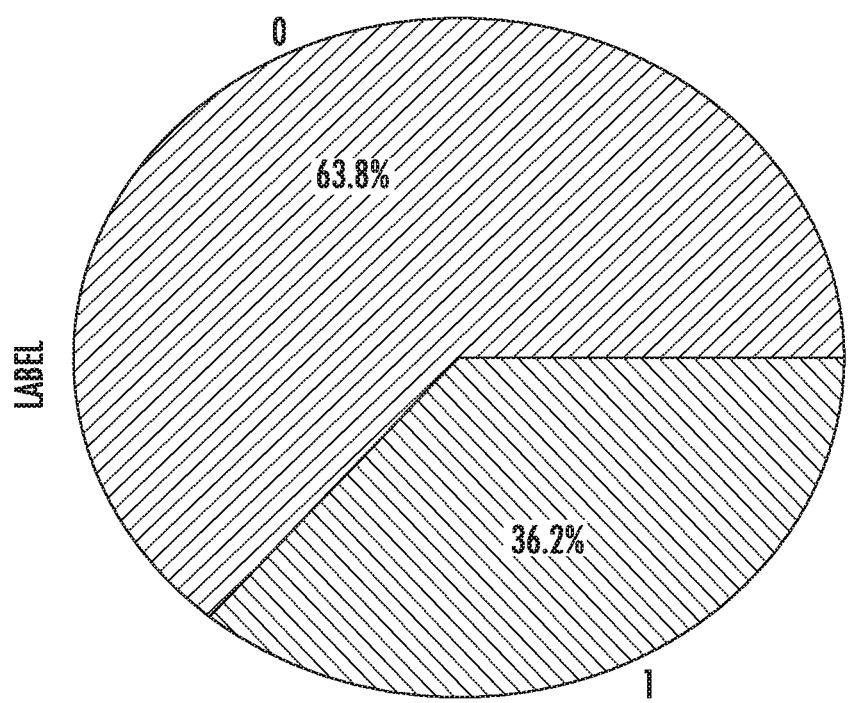
FIG. 42 is a pie chart showing a classed distribution on the data set.

The exploratory data analysis may be a next stage. This stage may drive the analysis of the transactional data set to summarize their main characteristics using visual methods and interpretation. Thus, the system 100 may make evident what the data can tell the system beyond the formal modeling. Based on this analysis, it is possible to formulate hypotheses that could lead to a precise and accurate experimental approach. The data set used as an example may include 318 clients with 203 "good" clients and 115 clients that had been in bad debt. A classed distribution on the data set is shown in FIG. 42 with those numbers corresponding to 63.8% and 36.2% and the label showing the bad debt and good debt. The system 100 may analyze the variables paired one by one and discriminates by the assigned label. With this initial approach, it is possible to determine that some variables are more correlated with default risk behavior. In this stage, the system makes assumptions and produces a hypothesis and selects the candidate variables to be used in the next stage as to future ranking.

In the feature ranking stage, the system may select the final subset of relevant features (variables, predictors) that the system uses. It is relevant for those four reasons: (1) model simplification; (2) low training time; (3) height generalization power; and (4) avoiding the curse of dimensionality.

The system automates the feature ranking to make use of a standard methodology to feed the model with the best predictor variables for the model to forecast the bad debt. According to a recursive feature elimination, the best features for bad debt discrimination from the most correlated to the least correlated are: (1) maximum moving window in kind series; (2) median moving window in time series; (3) skewness moving window in time series; (4) minimum moving window in time series; and (5) incomes/spending ratio.

Figures 44A, 44B, 44C:
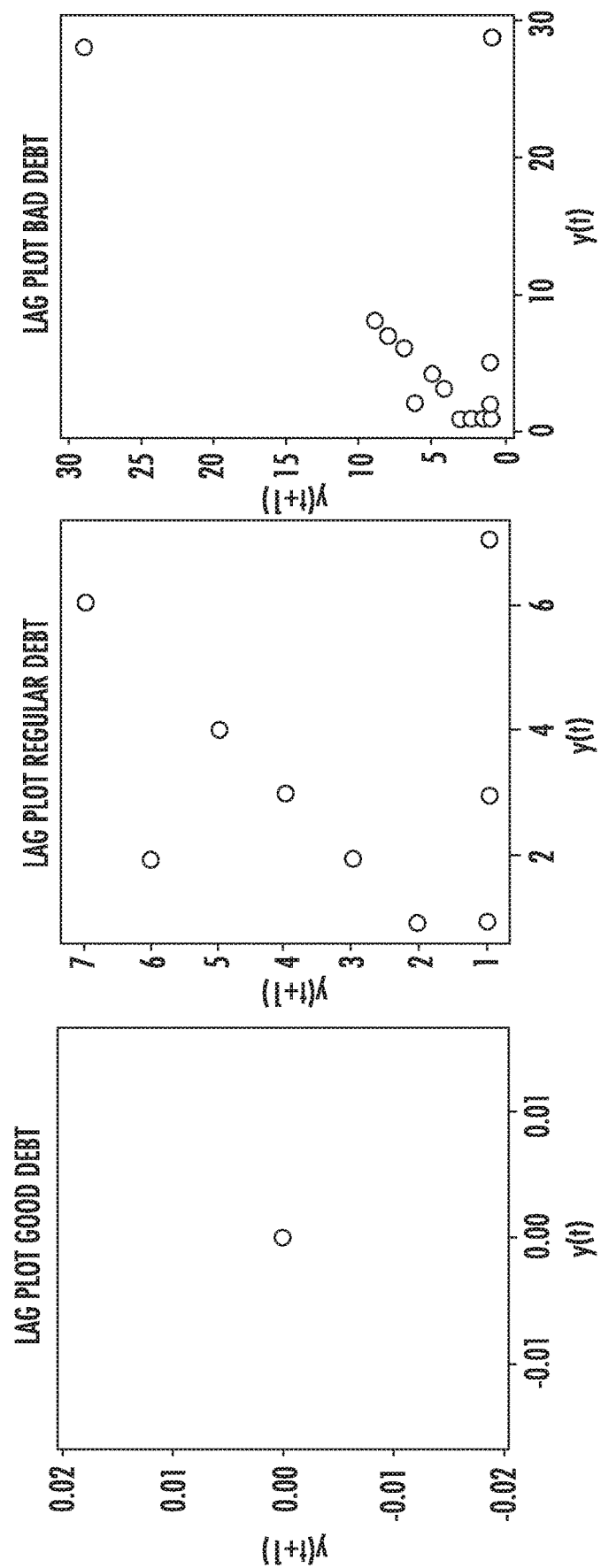
FIG. 44A is a graph showing the lag plot of good debt.
FIG. 44B is a graph showing the lag plot of regular debt.
FIG. 44C is a graph showing the lag plot of bad debt.

FIGS. 43A through 43P show different graphs as representative examples bar graphs and scatter plots for good debt and bad debt while FIGS. 44A through 44C show a lag plot for three client classes. The lag plot shows the tendency on good and bad clients. This type of behavior could be the relationship objective of the feature ranking method. The output of the method may be a score of information gained or prediction power of the feature.

The final scores may be based on an average of the following method scores:

ANOVA: analysis of variance;

Mutual information: information score between two random variables as a non-negative value, which measures the dependency between the variables;

Random Forest: random decision force are in ensemble learning method for classification;

Chi-square: it is a statistical test applied to the groups of categorical features to evaluate the likelihood of correlation or association between them using their frequency distribution.

Figure 45:
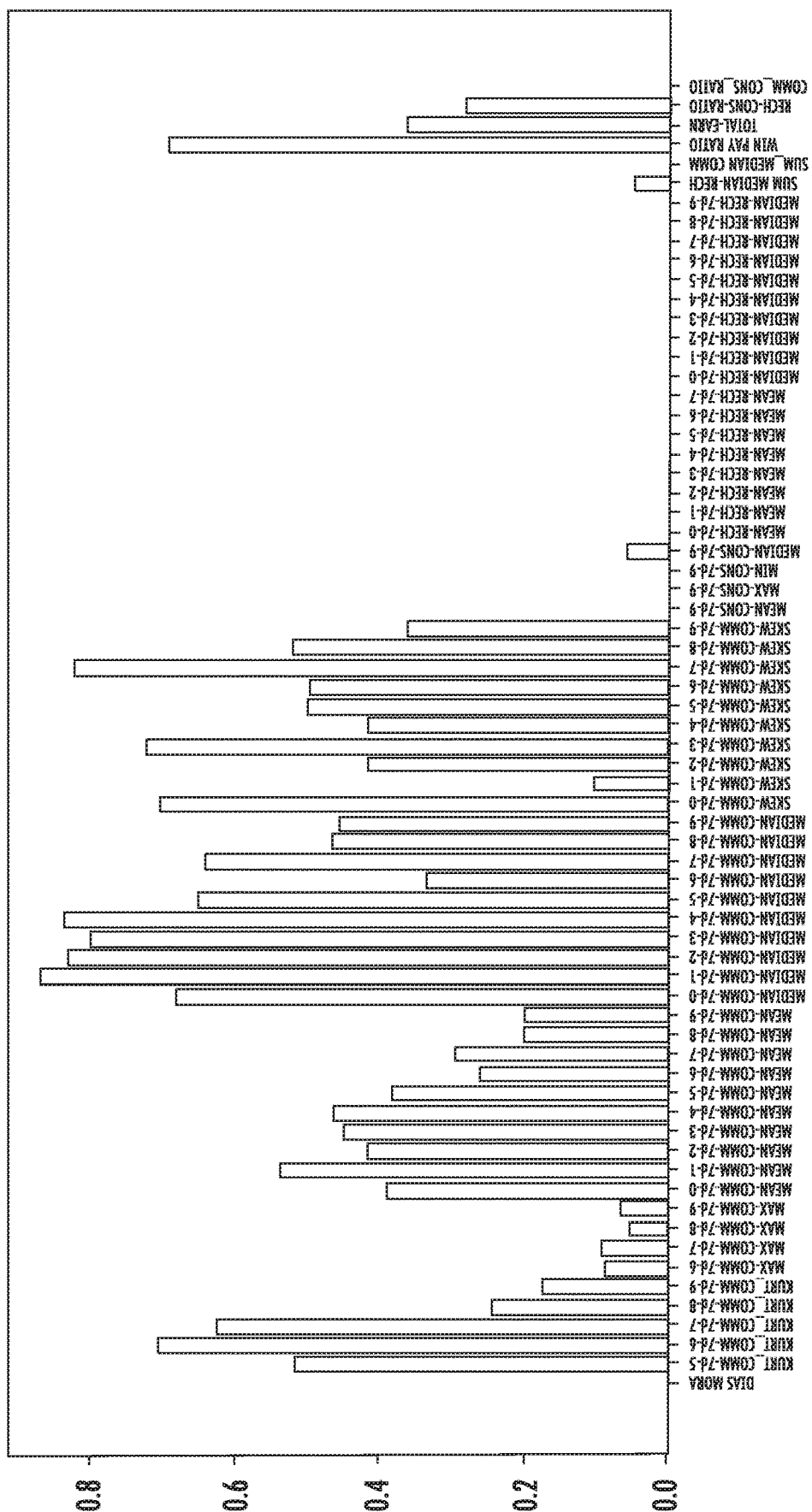
FIG. 45 is a bar chart showing the ranking of features.

The ranking for the input features may be presented as a plot as shown in FIG. 45 as a non-limiting example. There are shown the kurtosis (kurt), maximum (max), mean, median, skew commission, and other identifiers along the horizontal axis.

There now follows an example of the model selection. The system may select the model based on the statistical features extracted from the time series and ranked with the previous algorithms. It is possible to test the classification model to predict bad debt in the next seven days. The input variables have a different range based on the nature of the variable to reduce the inter space range variability that is scaled with the variables after an outlier removal. The system has an objective at this stage to test a range of methods and select the method with the best performance based on the defined metric (F1 score).

The following methods have been tested as: random force, logistic regression, extra trees, support vector machines, and KNN.

An example experimental set up takes into consideration the performance metric in which the system used the F1 score, which is a measure that considers both the precision "p" and the recall "r" of the test to compute the score. The precision "p" is the number of correct positive results divided by the number of all positive results returned by the classifier, and "r" is the number of correct positive results divided by the number of all relevant samples. In an example, the test partitioning may be trained and 70% of the clients have been used to fit the algorithm with cross validation. About 30% of the clients were reserved to test the algorithm with unseen data. As an output threshold, if the bad debt probability for a client is higher than 0.6, it was considered a high risk in this example for the threshold.

Figures 46, 47:
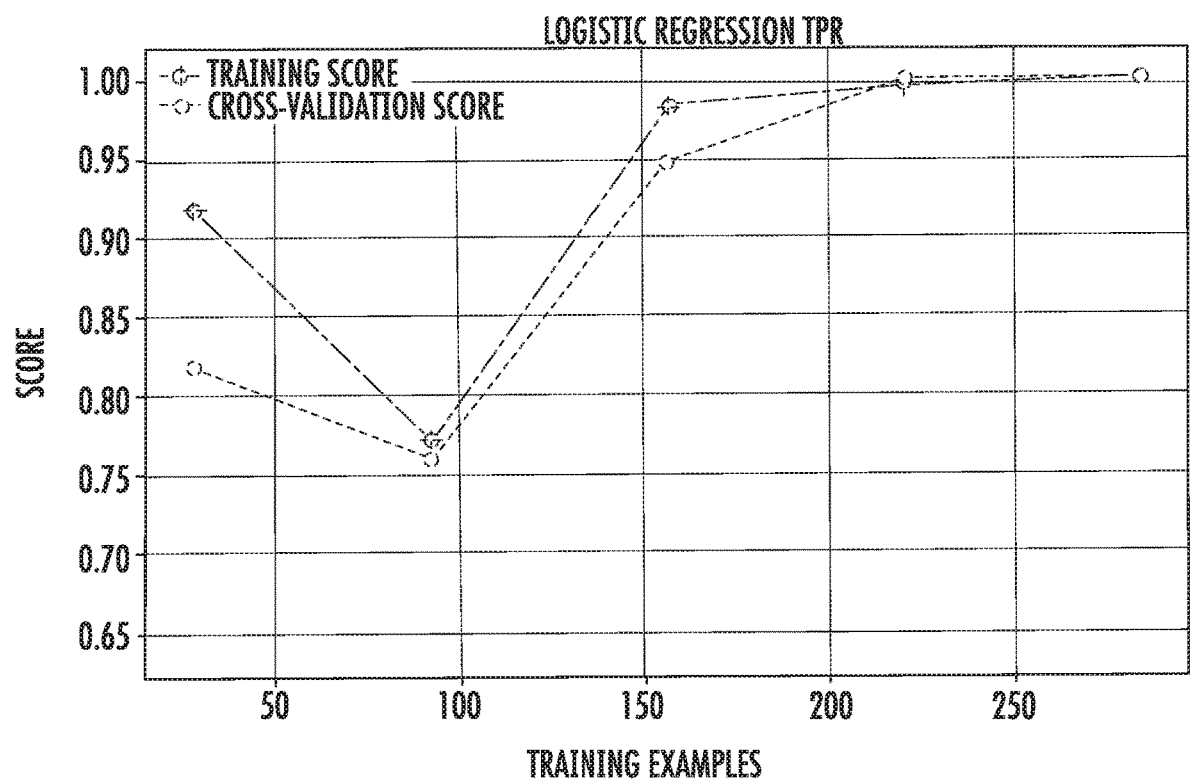
FIG. 46 is a graph showing the learning curve for a true positive rate (TPR) that increases when adding more training examples.
FIG. 47 is a chart showing performance metrics.

The rate of true positives (bad debt) that the model detects will improve with more data as shown in the graph of FIG. 46, which displays the learning curve and shows that the true positive rate (TPR) increases and adds more training examples as a logistic regression for the TPR and also shows the training score and cross-validation score. On test (unseen) examples, the performance metrics are shown in the example of FIG. 47.

There is also a model evaluation that the system accomplishes. In order to achieve the two modeling objectives, the system looks at a high F1 score and continuous output and with the proposed methods fits the objectives as a logistic regression model. There now follows greater description regarding the continuous output of the model using a continuous probability prediction.

Figure 48A:
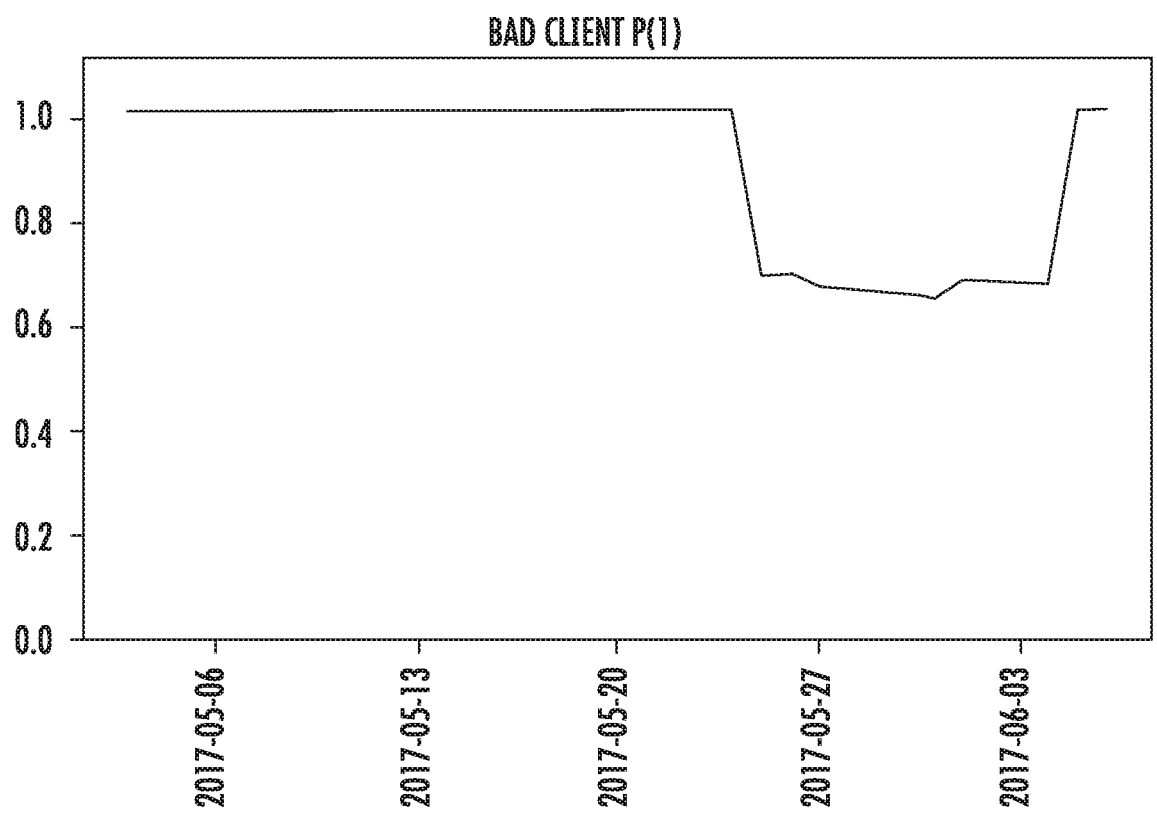
FIGS. 48A and 48B are graphs showing the probability P(1) for two clients that entered into a bad debt state.
Figure 48B:
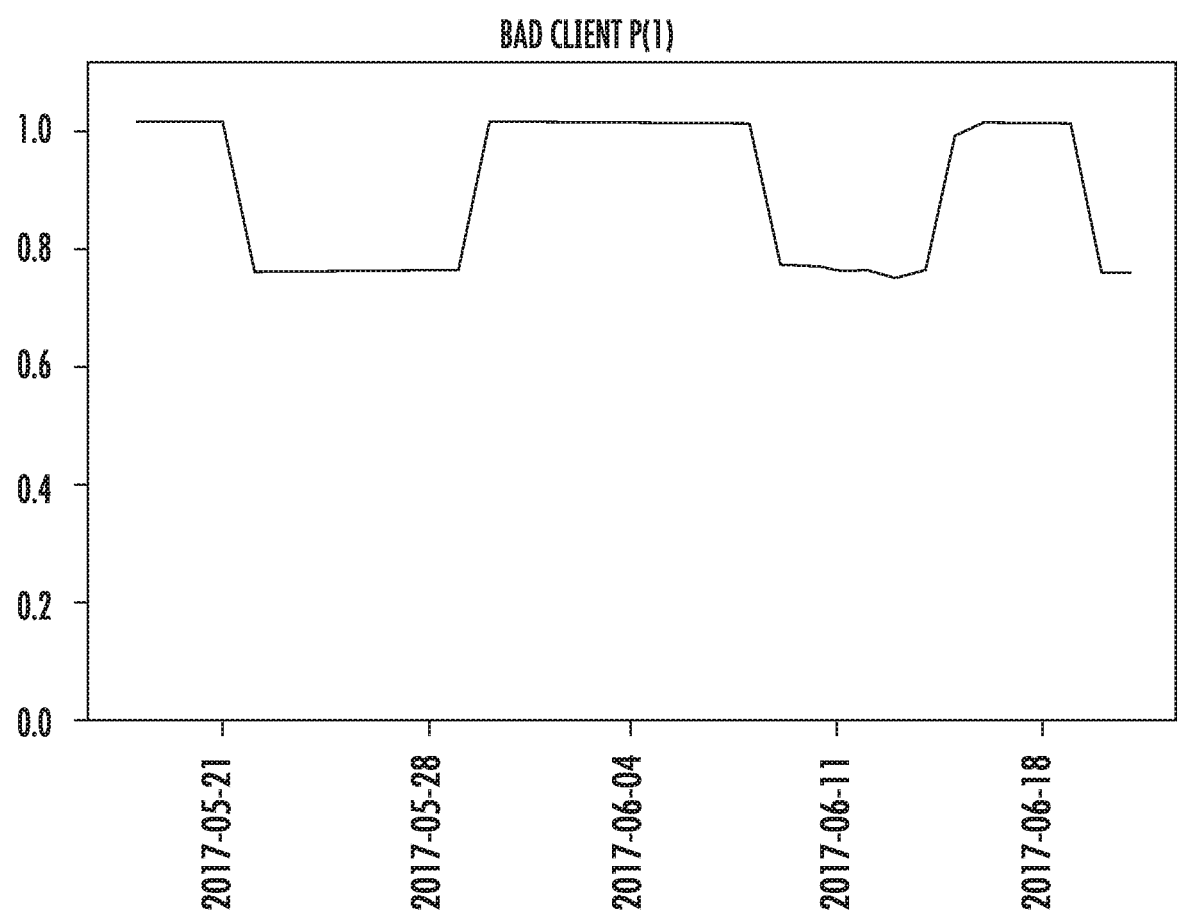
Figure 49A:
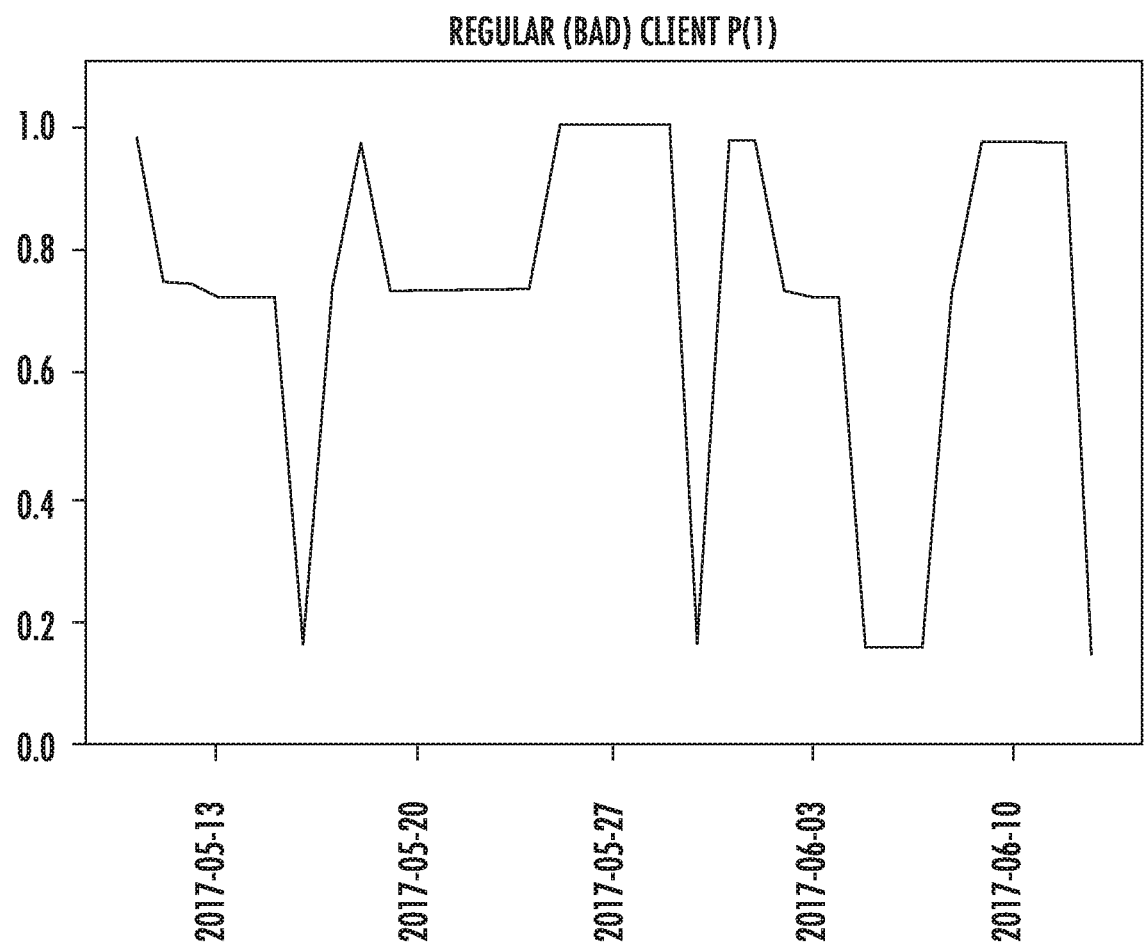
FIGS. 49A and 49B are graphs showing the probability P(1) for two regular bad clients that entered in a bad debt state.
Figure 49B:
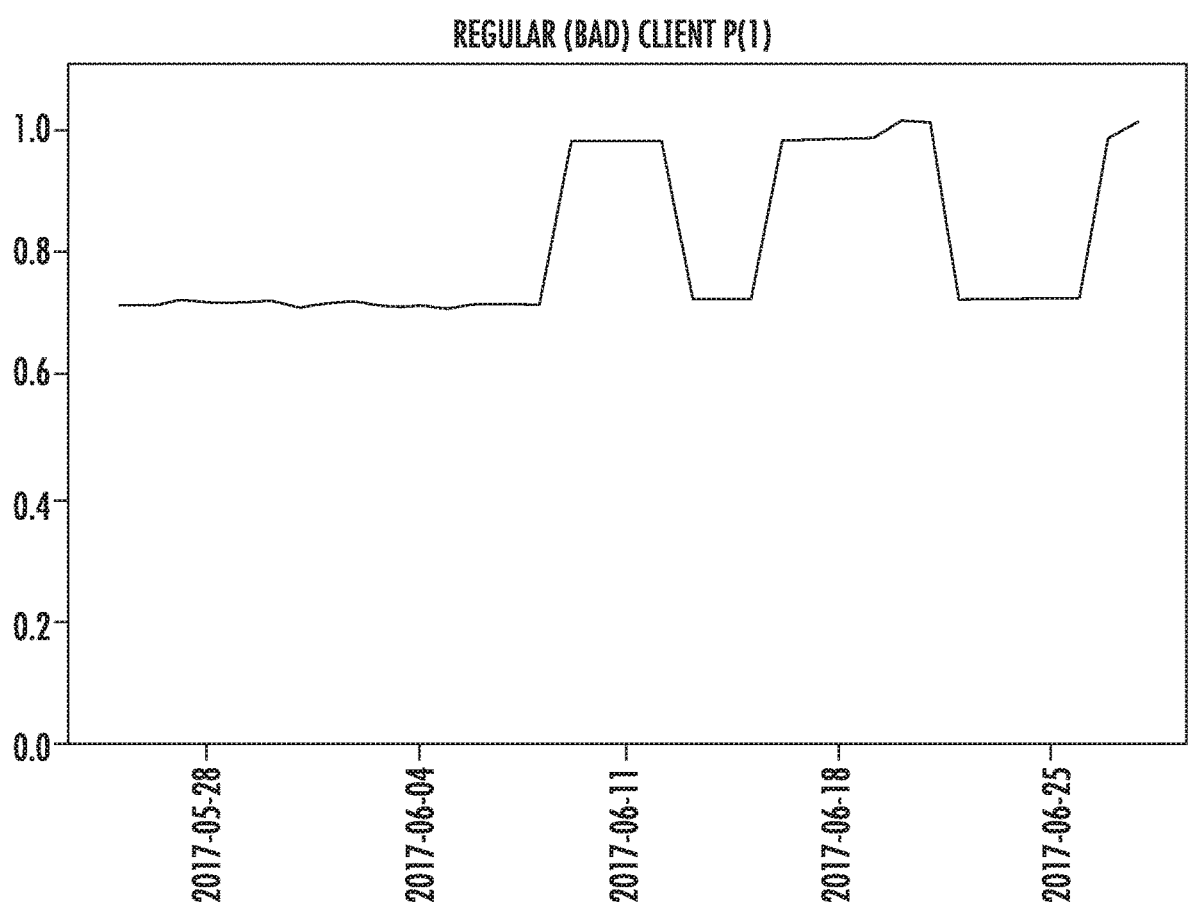

The score of a client may be a probability of a fall into bad debt. The system may "hypothesize" that a bad client that will fall in default or bad debt will have a continuous growth in the frecated or forecast probability when that client or consumer is moving closer to a high risk region. This behavior is very convenient to define a threshold when the high risk probability passes over the allowed limits. In an example, after the model was trained, the system as an example took six clients of different classes to prove how the client was classified in different periods. For each client (consumer), the bad debt score was computed during five weeks. For a potential bad debt client, the probability was rarely below 60%, while the good clients had a bad debt probability below 20% such as shown in FIGS. 48A and 48B, showing the probability P(1) for two clients that entered in a bad debt state and the probability P(1) for two regular (bad) clients that entered into a bad debt state as FIGS. 49A and 49B.

Figure 50A:
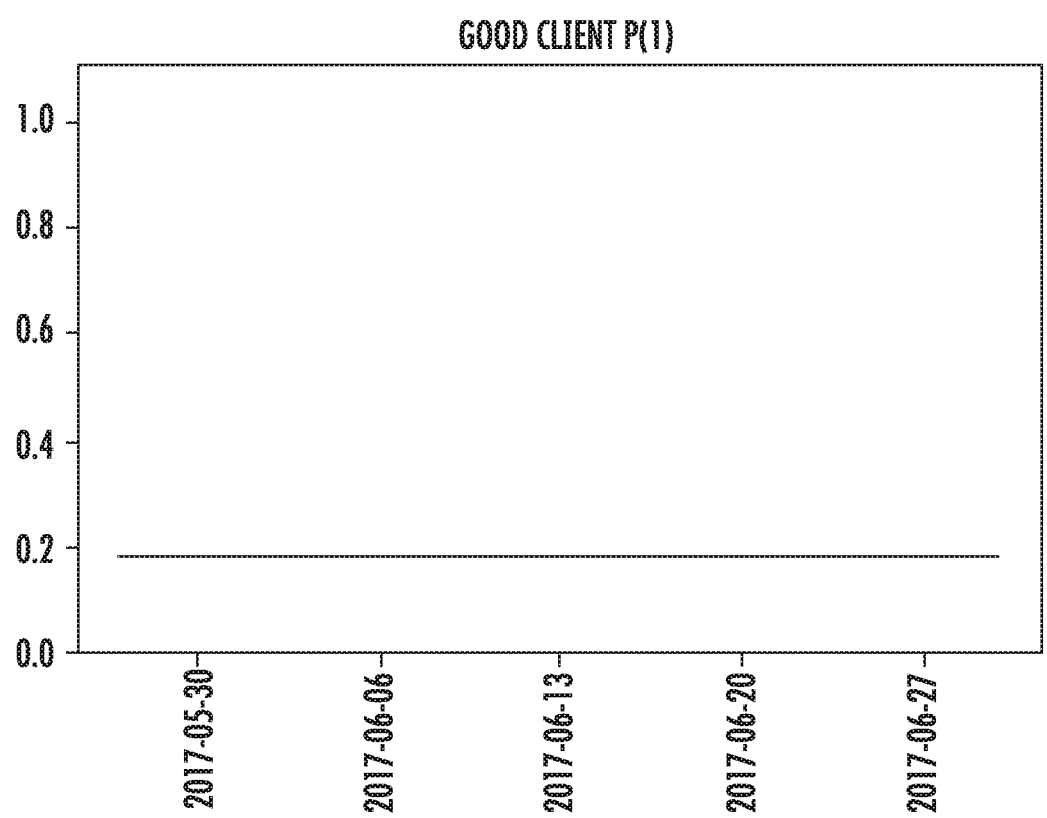
FIGS. 50A and 50B are graphs showing the probability P(1) for two clients from class 0.
Figure 50B:
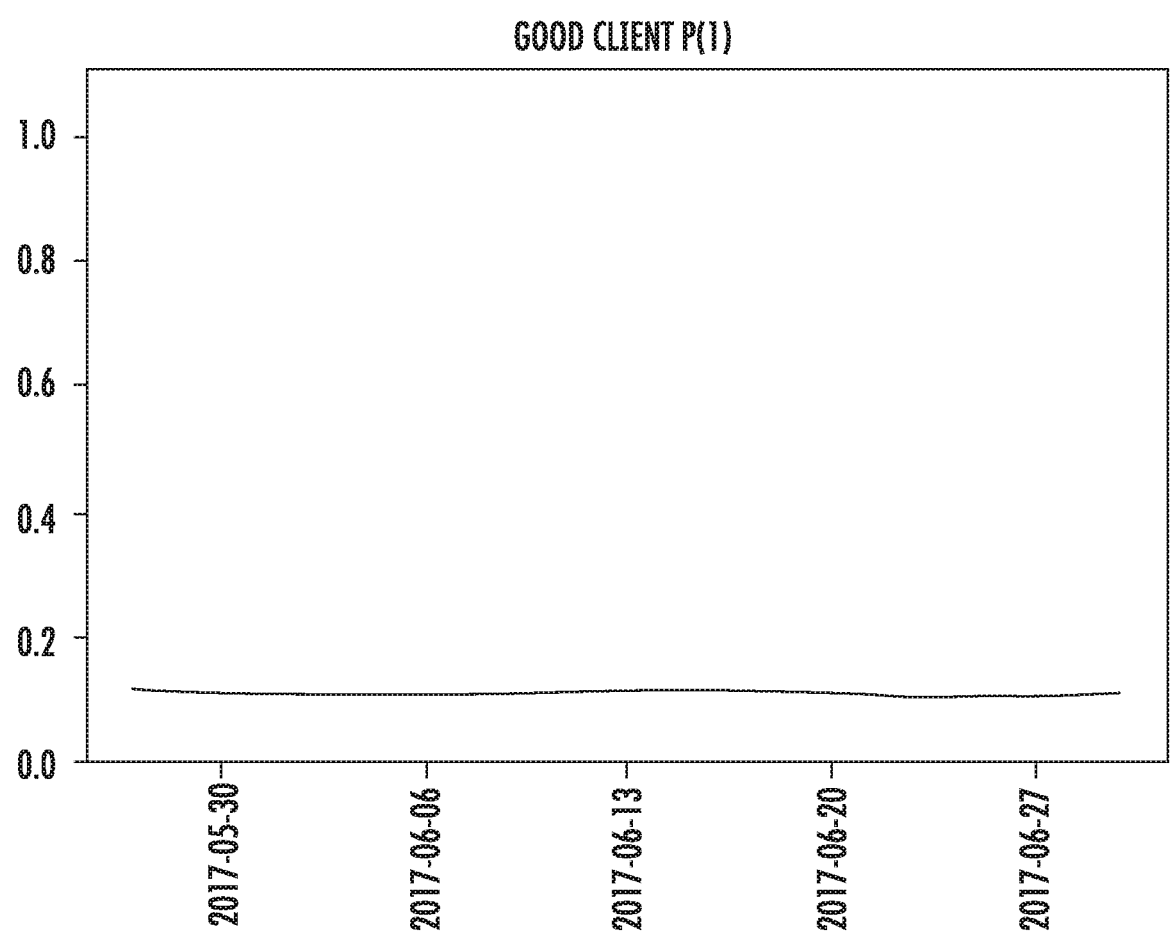

FIGS. 50A and 50B show graphs of the probability P(1) for two clients from class 0. These examples in FIGS. 48A, 48B, 49A, 49B, 50A and 50B show that the system can be used to follow-up the risk evolution of any client. It does not matter if the client or consumer is going from a high risk region to a low risk region or is leaving behind a high risk region to be a good client. Alarm thresholds may be provided.

The client as a consumer can calibrate the model in order to make it less or more sensible for bad risk prediction. One possible rule is to alarm only the 50% of the high risk clients so that the risk to move the threshold may be over 0.76. If the client needs to be more proactive with alarms, the system may move the threshold over 0.6 as another example.

Figure 51:
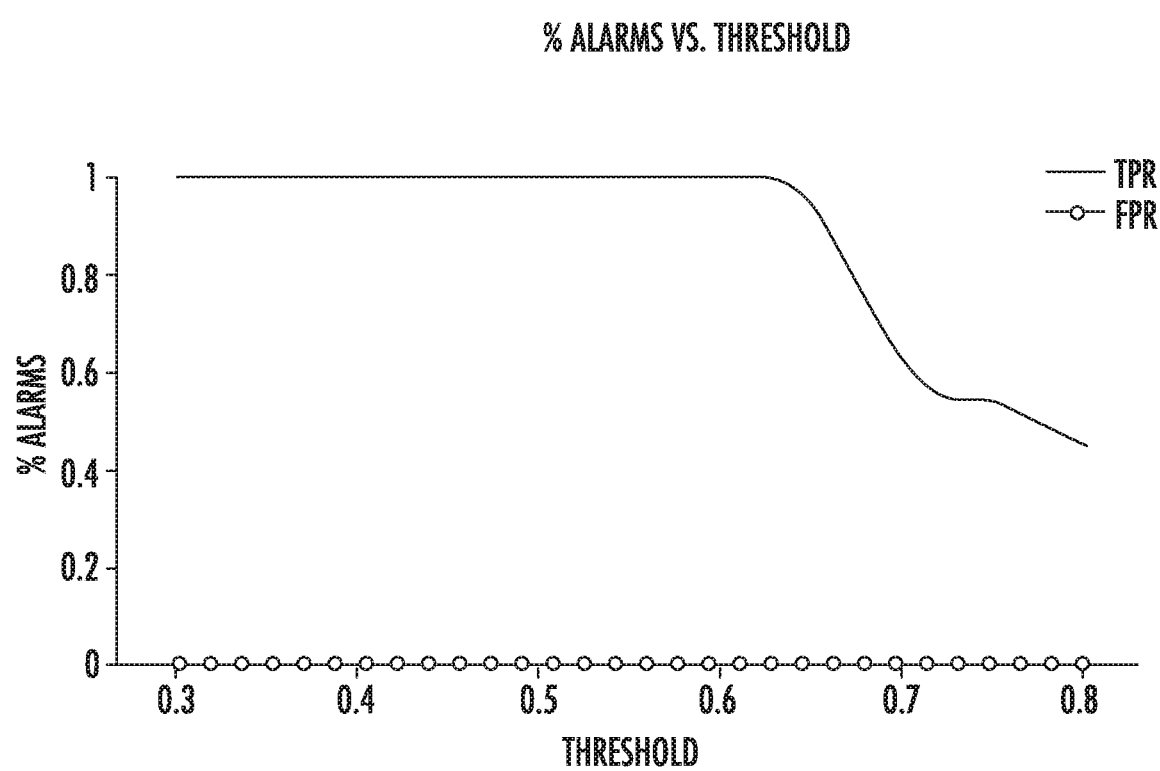
FIG. 51 is a graph showing the percentage of alarms versus the threshold and showing the true positive rate and false positive rate.

FIG. 51 is a graph showing the percentage of alarms versus the threshold and showing the TPR (True Positive Rate) and the FPR (False Positive Rate).

Figure 52:
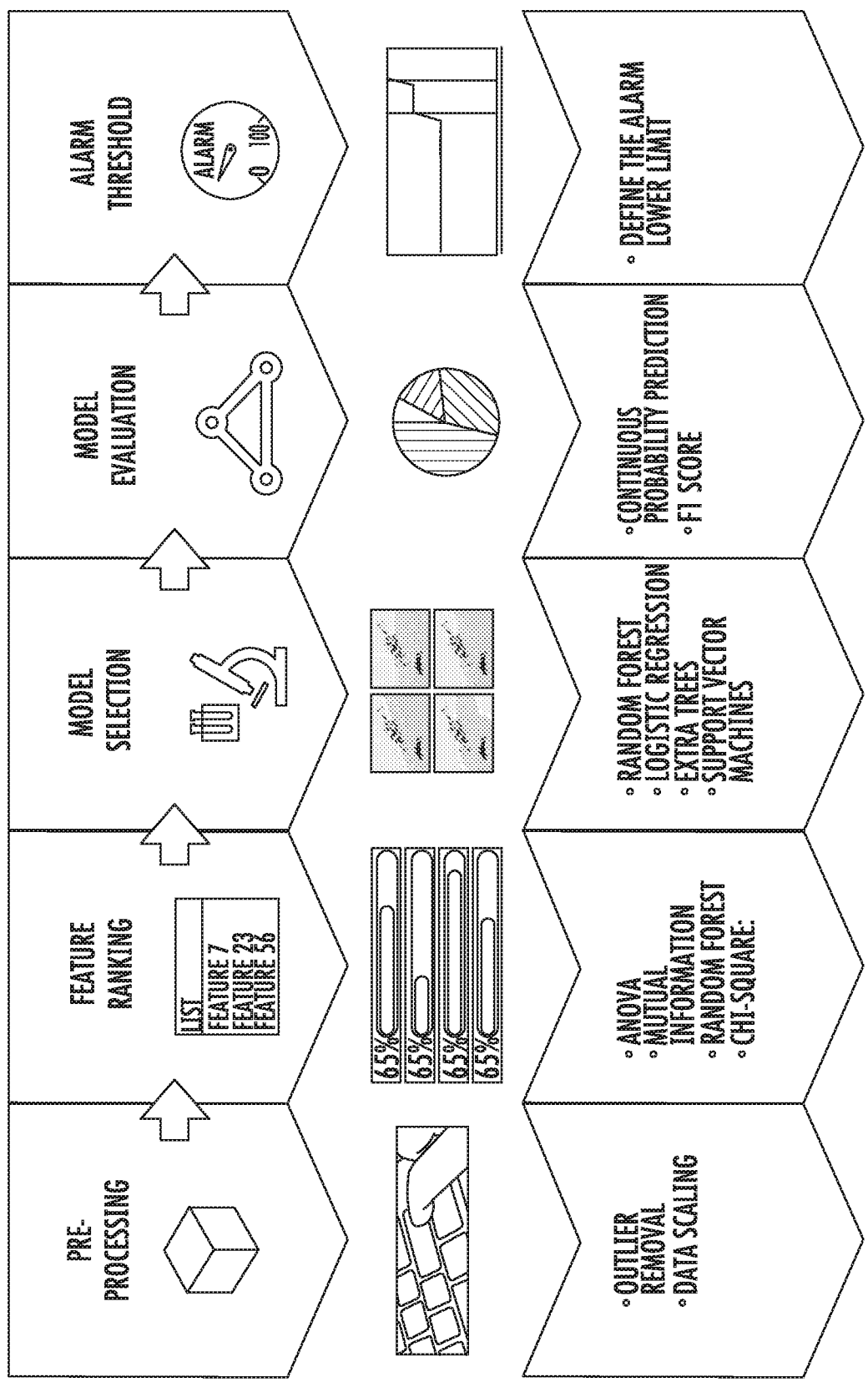
FIG. 52 is a graphical model of the architecture for the bad debt forecasting and credit risk protection.

A summary is shown in FIG. 52 as a model architecture for the credit risk prediction. Pre-processing may be a first step followed by outlier removal and data scaling. This may be followed by feature ranking with the list of different features and may include ANOVA, mutual information, random forest or Chi-squared. Model selection follows and may include random forest, logistic regression, extra trees, and support vector machines as examples. This may be followed by model evaluation with a continuous probability prediction and an F1 score. The final step in this model architecture includes the alarm threshold to define the alarm lower limit.

In accordance with a non-limiting example as noted before, it is possible to track transactions for 6 months and determine when a client requires more credit using a debt tracking algorithm as described below, but also reduce the risk of loaning the client more money and the risk of default. The system may use a combination of two variables with the first related to the good behavior of the client and the second related to the bad behavior of the client and making a linear combination of those two variables and identifying when the client needs more money without any risk for the lender or business.

As noted before, features are extracted from a time series (client behavior variable over time) and these values help evaluate trends, seasonality or changes that can alert when a client is about to move into a bad debt situation. In an example, a moving window of seven points as days is used to smooth input signals. In this moving window, the statistics used include: mean, standard deviation, median, kurtosis, and skewness. Other variables may be added and may include the ratios between consignations and commissions and recharges and commissions. The time series such as shown in the graph of FIG. 41 may be for recharges that are shown by the user with the dotted line and the days of the moving average by the solid line and the moving standard deviation by the dashed line.

As noted before, it should be understood that the moving window points includes the measurements such as the mean, standard deviation, and median in which these are a measure of the central tendency of a value of a data set with the mean (average) as the sum of all data entries divided by the number of entries, and the median as the value that lies in the middle of the data when the data set is ordered. When the data set has an odd number of entries, the median may be the middle data entry, and if the data has an even number of entries, then the median may be obtained by adding the two numbers in the middle and dividing the result by two (2). There are some outliers that are not the greatest and least values but different from the pattern established by the rest of the data and affect the mean, and thus, the median can accommodate as a measure of the central tendency. There are measures of the variation that the standard deviation takes into effect to measure the variability and consistency of the sample or population. The variance and standard deviation will give an idea of how far the data is spread apart. When the data lies close to the mean, then the standard deviation is small, but when the data is spread out over a large range of values, the standard deviation "S" is large and the outliers increase the standard deviation.

By measuring the skewness and kurtosis and using those variables, it is possible to characterize the location and variability of the data set with skewness as a measure of symmetry or the lack of symmetry such that asymmetric data set is the same to the left and right of the center point. Kurtosis measures whether the data are heavy-tailed or light-tailed relative to a normal distribution. Thus, those data sets with high kurtosis tend to have heavy tails or outliers and those data sets with low kurtosis tend to have light tails or lack of outliers. One formula that may be used for skewness may be the Fisher-Pearson coefficient of skewness. It should be understood that the skewness for a normal distribution may be zero (0) and any symmetric data should have a skewness near zero (0). The negative values for skewness indicate data that are skewed left and positive values for skewness indicate data that are skewed right. Thus, skewed left the left tail is long relative to the right tail.

The probability as noted before for a user being in a "bad debt" state or not is computed through a logistic regression model that may use a regression analysis to conduct when a dependent variable is dichotomous (binary). In an example, it is a predictive analysis and describes data and explains the relationship between one dependent binary variable and one or more nominal, ordinal, interval, or ratio-level independent variables. Also, the regression models may be defined such that the dependent variable is categorical and the algorithm may use the binary dependent variable where the output can take two values "0" and "1" that represent the outcomes. Thus, it is possible to indicate that the presence of a risk factor increases the odds of a given outcome by a specific factor as a direct probability model.

With supervised learning, the system operates with machine learning a function that maps an input to an output based on example input-output pairs and infers a function from labeled training data as a set of training examples. Each example may be a pair as an input object such as a vector and a desired output value as a supervisory signal. The training data may be analyzed and an inferred function produced, which can be used for mapping new examples. Generally, the training examples may be determined and the type of data to be used as a training set may be determined and the training set gathered. The input feature representation of a learned function may be determined and the structure of the learned function in corresponding learning algorithm.

It should be understood that the recursive feature elimination (RFE) may repeatedly construct a model, for example, a regression model or SVM and choose either the best or worst performing feature such as based on coefficients and setting the feature aside and repeating the process with the rest of the features. This can be applied until all features in the data set are exhausted and features may be ranked according to when they were eliminated. With a linear correlation, each feature may be evaluated independently.

As to the moving window also known as a rolling window in a time series, it is possible to assess the model stability over time. Thus, it is possible to compute parameter estimates over a rolling window of a fixed size through a sample. The rolling estimates may capture the instability. It is possible to use back testing where historical data is initially split into an estimation sample and a prediction sample and the model fit using the estimation sample and H-step ahead predictions made for the prediction sample. Thus, the system as a rolling regression with the rolling time window may have the system conduct regressions over and over with sub-examples of the original full sample. It is possible then to receive a time series of regression coefficients that can be analyzed.

Referring again to FIGS. 44A through 44C, for clients with bad debt, there may be a linear relation. The lag plot may be a scatter plot with two variables (x,y) "lagged" where the "lagged" is a fixed amount of passing time where one set of observations in a time series is plotted "lagged" against a second, later set of data. The $K^{th}$ lag may be a time period that happened "k" time points before time i and most commonly used lag is 1 as a first-order lag plot. Thus the lag plots may allow the system to check for model suitability, outliers as those data points with extremely high or low values, any randomness showing the data without a pattern, a serial correlation where the error terms in a time series transfer from one period to another, and seasonality where periodic fluctuations in time series data that happened at regular periods can be shown. Based upon the example shown in FIGS. 44A through 44C, it is evident that the system may group into two groups as good and bad.

Referring again to FIG. 46, there is shown the learning curve where the true positive rate increases with adding more training examples. The training examples are shown with the score and the logistic regression (TPR) as true positive rate. This allows the sensitivity and specificity as statistical measures of the performance of a binary classification test with the sensitivity as the true positive rate, the recall or probability of detection as also termed to measure the proportion of positives that are correctly identified while the specificity as the true negative rate measures the proportion of negatives that are correctly identified as such.

In one example of a bad debt prediction applied to a financial problem, the system may begin with an exploratory data analysis where the system identifies the variables that have discrimination power based on the defined problem. It is important to transform the most important variables identified in the previous description into a low dimensional and continuous space and measure the representativeness of the identified "most important variables" in the obtained feature space. A first step may analyze a correlation between variables and two methods can achieve the objective.

It is possible to use a multiple correspondence analysis feature correlation. In this data analysis technique for nominal categorical data, the underlying structures in a data set may be detected and represented where the data as points are represented in the low-dimensional Euclidian space. This is an analytical challenge in multi variate data analysis and predictive modeling to include identifying redundant and irrelevant variables and to address the redundancy the groups of variables that may be identified that are correlated as possible among themselves as uncorrelated as possible with other variable groups in the same data set. The multiple correspondence analysis uses the multi variate data analysis and data mining for finding and constructing a low-dimensional visual representation of variable associations among groups of categorical variables. The MCA feature correlation and data can be extrapolated for insights and determine how close input variables are to the target variable and to each other.

The system may validate the variable space correlations such as using a Pearson correlation or a Spearman correlation. Correlation may allow the system to determine a broad class of statistical relationships involving dependents and determine how close variables are to having a linear relationship with each other. The correlations may indicate a predictive relationship. The more familiar measurement of dependents between two quantities is the Pearson product-moment correlation coefficient where the covariance of the two variables may be divided by the product of their standard deviations. A Spearman rank correlation coefficient may be a rank correlation coefficient and may measure the extent to which, as one variable increases, the other variable tends to increase, without requiring that increase to be represented by a linear relationship. Thus, the correlation coefficient will measure the extent to which two variables tend to change together and describe both the strength and direction of that relationship.

A Pearson product moment correlation will evaluate the linear relationship between two continuous variables and it is linear when a change in one variable is associated with the proportional change in the other variable. The Spearman rank-order correlation may evaluate the monotonic relationship between two continuous or ordinal variables. In the monotonic relationship, the variables tend to change together, but not necessarily at a constant rate. The relationship between variables is often examined with the scatter plot where the correlation coefficients only measure linear (Pearson) or monotonic (Spearman) relationships. Both Pearson and Spearman correlation coefficients can range in value from −1 to +1 and the Pearson correlation coefficient may be +1 when one variable increases and the other variable increases by a consistent amount to form a line. The Spearman correlation coefficient is also +1 in that case.

When a relationship occurs that one variable increases when the other increases, but the amount is not consistent, the Pearson correlation coefficient is positive, but less than +1 and the Spearman coefficient still equals +1. When a relationship is random or non-existent, then both correlation coefficients are almost 0. If the relationship is a perfect line for decreasing relationship, the correlation coefficients are −1. If the relationship is that one variable decreases and the other increases, but the amount is not consistent, then the Pearson correlation coefficient is negative but greater than −1 and the Spearman coefficients still equals −1. As noted before, correlation values of −1 or 1 imply an exact linear relationship such as between a circle's radius and circumference. When two variables are correlated, it often forms a regression analysis to describe the type of relationship.

Once an analysis is completed, the system may make hypotheses and conclusions. In an example, relevant variables may be: (1) the number of blocks; (2) the number transfers; and (3) the average I and D. Correlated variables may include: (1) consignments, I&D, transfer and commission; and (2) credit line, consignments, I&D and commissions. The type of relation between variables are generally not linear.

It is possible to identify the features that are used in the model and that are defined as transformation, combinations and ratios between variables that provide more information than they can have alone for future ranking. In order to make more informative the features, it is possible to group the variables based on the frequencies that clients generate. After the feature redefinition, it may be possible to rank them in order to input the algorithm with only the most informative features. To achieve this objective, it is possible to implement a combination of feature important ranking methods such as decision trees, Chi-squared, and relief.

A decision tree may be used with various groups such as average recharges, number block and average consignment and different transfers with the gini coefficient as sometimes expressed as a gini ratio or normalized gini that is a measure of statistical dispersion that shows the inequality among values of frequency distribution.

It should also be understood that the system may use a Chi-squared test as a statistical hypothesis test where the sampling distribution of the test statistic is a Chi-squared distribution when the null hypothesis is true. The random decision force may be used as an ensemble learning method or classification, regression and constructs decision trees at training time outputting the class that is the mode of the classes. Mutual information of two random variables may be used as a measure of the mutual dependence between two variables. The analysis of variance (ANOVA) may be used as a collection of statistical models and procedures as a variation among or between groups. The observed variance in a particular variable may be petitioned into components attributable to different sources of variation. There may be some advantages of one or the other of the logistic regression over decision trees. Both are fast methodologies, but logistic regression may work better if there is a single decision boundary not necessarily parallel to the axis and decision trees may be applied to those situations where there is not just one underlying decision boundary, but many.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of determining the creditworthiness and issuing a micro- or nano loan to a consumer and forecasting a bad debt probability of that consumer, comprising:

a consumer selecting and connecting a mobile wireless communications device of the consumer via a wireless communications network to a server having a communications module, a controller, transactional database connected thereto, and an application programming interface (API) operative to allow interaction between the server and the mobile wireless communications device, in response to the consumer's selecting and connecting to the server, the controller initiates via the API a user interface on a display of the mobile wireless communications device, the user interface displaying a first menu item as a button selection on a portion of the display for requesting a micro- or nano loan, wherein the consumer selects the first menu item and initiates an API call as a request for a micro- or nano loan;

in response to the consumer selecting the first menu item and initiating the loan request, the server extracts N attributes about the consumer from external public data sources, wherein the N attributes have no personal identification data and confidential information about the consumer and comprise anonymous consumer transaction data extracted from transactional platforms and data extracted from one or more of a) gender, b) age, c) cellular operator, phone model, and usage, d) consumer geolocation, e) home values by geolocation, f) average income by: geolocation, gender and age groups, g) education by: geolocation and gender, h) public transport options by geolocation, i) social media activities by: geolocation, gender and age groups, j) infrastructure and services available by geolocation, and k) criminal records by geolocation, wherein the attributes are extracted from the external public data sources without obtaining a full name, a credit card number, a passport number, or a government issued ID number and other data that allows identification of the consumer;

processing the N attributes at the server by applying a features construction model and transforming the N attributes into a user attribute string associated with the consumer;

matching the user attribute string associated with the consumer with user attribute strings stored within the transactional database and associated with other consumers, wherein a match to another user attribute string stored within the transactional database is indicative of the micro- or nano loan amount as a maximum credit limit that is loaned to the consumer initially requesting the loan;

transmitting to the mobile wireless communications device via the communications module of the server a loan approval code, and in response to receiving the loan approval code at the mobile wireless communications device, displaying on the user interface a second menu item as button selections for confirming and selecting a micro- or nano loan amount up to the maximum credit allowed for the consumer and how the loan is to be dispersed as either crediting an electronic wallet of the consumer or paying all or part of a bill associated with an account of the consumer in the value of the loan;

in response to the consumer selecting the second menu item and confirming and selecting a micro- or nano loan amount up to the maximum credit allowed for the consumer and how the loan is to be dispersed, the server credits the electronic wallet of the consumer or pays all or part of a bill associated with an account of the consumer in the value of the loan based upon the consumer's selection at the second menu item, wherein the micro- or nano loan is approved on an average in under 20 seconds and with no more than three selectings entered by the consumer on the mobile wireless communications device;

generating a user ID associated with the user attribute string of the consumer and storing the user ID and user attribute string within the transactional database;

acquiring additional attributes linked to transactions made by the consumer over a plurality of weeks;

linking the additional attributes to the consumer's user attribute string stored in the transactional database; and applying a bad debt prediction model to the additional attributes and user attribute string to generate a bad debt prediction for the consumer as a numerical indicia, and if the numerical indicia is below a threshold value, raising the credit limit for the consumer.

2. The method according to claim 1, wherein the additional attributes include data associated with previous purchasing transactions of the consumer over the plurality of weeks, wherein the bad debt prediction model comprises a regression model having a moving window that takes into account mean, standard deviation, median, kurtosis and skewness.

3. The method according to claim 2, wherein the controller is configured to input past input/output data to the bad debt prediction model, wherein the past input/output data comprises a vector for the input relating to past consumer loan data and an output relating to a probability between 0 and 1 that indicates whether a consumer will fall into bad debt.

4. The method according to claim 3, wherein a probability greater than 0.6 from the bad debt prediction model is indicative of a high risk that a consumer will fall into bad debt.

5. The method according to claim 3, wherein a target variable outcome from the bad debt prediction model comprises a binary outcome that indicates whether a consumer will be a risk of bad debt within seven days.

6. The method according to claim 3, wherein the controller is configured to collect consumer loan data over a period of six months and classify consumers in two classes as 1) a bad client having a high risk probability of falling into bad debt, and 2) a good client having a low risk probability of falling into bad debt.

7. The method according to claim 1, wherein the controller is configured to generate a behavioral prediction of the consumer and match consumer location and check-ins to at least one of the electronic wallet and the location of the consumer against a known-locations database incorporated within the transactional database and comprising data regarding stores, private locations, public places, and transaction data and correlate periodic location patterns to loan and transactional activities by consumer profile and periodicity;

loan disbursement patterns;
use of loans;
loan repayments; and
transaction activities.

8. The method according to claim 7, wherein the controller is configured to generate the behavioral prediction based on consumer segmentation with consumer information provided via the contents of each transaction, and using affinity and purchase path analysis to identify products that sell in conjunction with each other depending on promotional and seasonal basis and linking between purchases over time.

9. A system of determining the creditworthiness and issuing a micro- or nano loan to a consumer and forecasting a bad debt probability of that consumer, comprising:

a mobile wireless communications device of the consumer;

a server having a communications module, controller, a transactional database connected thereto, and an application programming interface (API);

a wireless communications network connected to said server and mobile wireless communications device, wherein said API of said server is operative to allow interaction between the server and the mobile wireless communications device, wherein said controller and communications module are operative to communicate with the consumer operating the mobile wireless communications device via the wireless communications network and in response to the consumer's selecting and connecting to the server, the server initiates via the API a user interface on a display of the mobile wireless communications device, the user interface displaying a first menu item as a button selection on a portion of the display for requesting a micro- or nano loan via the first menu item and initiating an API call as a request for a micro- or nano loan;

in response to the consumer selecting the first menu item and initiating the loan request, the server is configured to extract N attributes about the consumer from external public data sources, wherein the N attributes have no personal identification data and confidential information about the consumer and comprises anonymous consumer transaction data extracted from transactional platforms and data extracted from one or more of a) gender, b) age, c) cellular operator, phone model, and usage, d) consumer geolocation, e) home values by geolocation, f) average income by: geolocation, gender and age groups, g) education by: geolocation and gender, h) public transport options by geolocation, i) social media activities by: geolocation, gender and age groups, j) infrastructure and services available by geolocation, and k) criminal records by geolocation, wherein the N attributes are extracted from the external public data sources without obtaining a full name, a credit card number, a passport number, or a government issued ID number and other data that allows identification of the consumer, wherein the server is configured to:

process the N attributes at the server and apply a features construction model and transform the N attributes into a user attribute string associated with the consumer;

match the user attribute string associated with the consumer with user attribute strings stored within the transactional database and associated with other consumers, wherein a match to another user attribute string stored within the transactional database is indicative of the micro- or nano loan amount as a maximum credit limit that is loaned to the consumer initially requesting the loan;

transmit to the mobile wireless communications device via the communications module of the server a loan approval code, and in response to receiving the loan approval code at the mobile wireless communications device, the mobile wireless communications device displays on the user interface a second menu item as button selections for confirming and selecting a micro- or nano loan amount up to the maximum credit allowed for the consumer and how the loan is to be dispersed as either crediting an electronic wallet of the consumer or paying all or part of a bill associated with an account of the consumer in the value of the loan;

in response to the consumer selecting the second menu item and confirming and selecting a micro- or nano loan amount up to the maximum credit allowed for the consumer and how the loan is to be dispersed, the server credits the electronic wallet of the consumer or pays all or part of a bill associated with an account of the consumer in the value of the loan based upon the consumer's selection at the second menu item, wherein the micro-or nano loan is approved on an average in under 20 seconds and with no more than three selectings entered by the consumer on the mobile wireless communications device;

and wherein the controller is configured to:

generate a user ID associated with the user attribute string of the consumer and store the user ID and user attribute string within the transactional database;

acquire additional attributes linked to the transactions made by the consumer over a plurality of weeks;

link the additional attributes to the consumer's user attribute string stored in the transactional database; and apply a bad debt prediction model to the additional attributes and user attribute string to generate a bad debt prediction for the consumer as a numerical indicia, and if the numerical indicia is below a threshold value, the credit limit is raised for the consumer.

10. The system according to claim 9, wherein the additional attributes include data associated with previous purchasing transactions of the consumer over the plurality of weeks, and wherein the bad debt prediction model comprises a regression model having a moving window that takes into account mean, standard deviation, median, kurtosis and skewness.

11. The system according to claim 10, wherein said controller is configured to input past input/output data about the additional attributes to the bad debt prediction model, wherein the past input/output data comprises a vector for the input relating to past consumer loan data and an output relating to a probability between 0 and 1 that indicates whether a consumer will fall into bad debt.

12. The system according to claim 11, wherein a probability greater than 0.6 is indicative of a high risk that a consumer will fall into bad debt.

13. The system according to claim 12, wherein a target variable outcome from the bad debt prediction model comprises a binary outcome that indicates whether a consumer will be a risk of bad debt within seven days.

14. The system according to claim 9, wherein said controller is configured to collect the additional attributes over a period of six months and classify consumers in two classes as 1) a bad client having a high risk probability of falling into bad debt, and 2) a good client having a low risk probability of falling into bad debt.

15. The system according to claim 9, wherein said controller is configured to generate a behavioral prediction of the consumer and match consumer location and check-ins to at least one of the electronic wallet and the location of the consumer against a known-locations database incorporated within the transactional database and comprising data regarding stores, private locations, public places, and transaction data and correlate periodic location patterns to loan and transactional activities and predict by consumer profile and periodicity;

loan disbursement patterns;
    use of loans;
    loan repayments; and
    transaction activities.

16. The system according to claim 9, wherein said controller is configured to generate the behavioral prediction based on consumer segmentation with consumer information provided via the contents of each transaction and use affinity and purchase path analysis to identify products that sell in conjunction with each other depending on promotional and seasonal basis and linking between purchases over time.

\* \* \* \* \*